US012548218B2

(12) United States Patent
Wang et al.

(10) Patent No.: US 12,548,218 B2
(45) Date of Patent: Feb. 10, 2026

(54) AUTOMATED BUILDING INFORMATION DETERMINATIONS FROM FLOOR PLAN STRUCTURAL ANALYSIS

(71) Applicant: MFTB Holdco, Inc., Seattle, WA (US)

(72) Inventors: Lichen Wang, Bellevue, WA (US); Naji Khosravan, Seattle, WA (US); Sai Sateesh Gudapati, Mayfield Heights, OH (US)

(73) Assignee: MFTB Holdco, Inc., Seattle, WA (US)

( * ) Notice: Subject to any disclaimer, the term of this patent is extended or adjusted under 35 U.S.C. 154(b) by 166 days.

(21) Appl. No.: 18/511,980

(22) Filed: Nov. 16, 2023

(65) Prior Publication Data

US 2025/0166256 A1    May 22, 2025

(51) Int. Cl.
*G06T 11/60*         (2006.01)
*G06T 7/55*          (2017.01)
(Continued)

(52) U.S. Cl.
CPC ............... *G06T 11/60* (2013.01); *G06T 7/55* (2017.01); *G06T 7/60* (2013.01); *G06T 7/74* (2017.01);
(Continued)

(58) Field of Classification Search
CPC ... G06T 11/60; G06T 7/74; G06T 7/60; G06T 7/55; G06T 2210/04; G06T 2207/20081;
(Continued)

(56) References Cited

U.S. PATENT DOCUMENTS 5,140,352 A    8/1992    Moore et al.
6,031,540 A    2/2000    Golin et al.
(Continued)

FOREIGN PATENT DOCUMENTS

EP    2413097 A2    2/2012
EP    2505961 A2    10/2012
(Continued)

OTHER PUBLICATIONS

Grasso et al., "Strategies to Evaluate the Visibility Along an Indoor Path in a Point Cloud Representation", ISPRS Annals of the Photogrammetry, Remote Sensing and Spatial Information Sciences, vol. IV-2/W4, 2017, pp. 311-317 (7 pages).

(Continued)

*Primary Examiner* — Phi Hoang
(74) *Attorney, Agent, or Firm* — VLP Law Group LLP; James A. D. White

(57) ABSTRACT

Techniques are described for using computing devices to perform automated operations for determining matching buildings and using corresponding information in further automated manners, such as by determining buildings having similarities to an indicated target building based at least in part on building floor plans and/or other attributes, and by automatically determining building modifications to implement for the target building based at least in part on differences with the similar buildings and/or building features that are prioritized or deprioritized from analysis of user activity data of one or more types, optionally in combination with one or more other specified criteria. Information about such determined buildings may be used in various automated manners, including for controlling device navigation (e.g., autonomous vehicles), for display on client devices in corresponding graphical user interfaces, for further analysis to identify shared and/or aggregate characteristics, etc.

26 Claims, 19 Drawing Sheets

(6 of 19 Drawing Sheet(s) Filed in Color)

(51) Int. Cl.
  *G06T 7/60* (2017.01)
  *G06T 7/73* (2017.01)
  *G06V 10/75* (2022.01)
  *G06V 10/77* (2022.01)
  *G06V 10/86* (2022.01)
  *G06V 20/50* (2022.01)

(52) U.S. Cl.
  CPC ............ *G06V 10/751* (2022.01); *G06V 10/77* (2022.01); *G06V 10/86* (2022.01); *G06V 20/50* (2022.01); *G06T 2207/20081* (2013.01); *G06T 2210/04* (2013.01); *G06T 2210/32* (2013.01)

(58) Field of Classification Search
  CPC .. G06T 2210/32; G06V 10/77; G06V 10/751; G06V 20/50; G06V 10/86; G06F 30/13; G01C 21/206
  See application file for complete search history.

(56) References Cited

U.S. PATENT DOCUMENTS

| | | | |
|---|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,809,066 B2 | 10/2020 | Colburn et al. |
| 10,825,247 B1 | 11/2020 | Vincent et al. |
| 10,834,317 B2 | 11/2020 | Boyadzhiev et al. |
| 11,055,531 B1 | 7/2021 | Maestas |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,200,421 B1 | 12/2021 | Chavez et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 11,480,433 B2 | 10/2022 | Colburn et al. |
| 11,481,925 B1 | 10/2022 | Li et al. |
| 11,494,973 B2 | 11/2022 | Boyadzhiev et al. |
| 11,501,492 B1 | 11/2022 | Li et al. |
| 11,514,674 B2 | 11/2022 | Moulon et al. |
| 11,592,969 B2 | 2/2023 | Li et al. |
| 11,632,516 B2 | 4/2023 | Boyadzhiev et al. |
| 11,632,602 B2 | 4/2023 | Cier et al. |
| 11,638,069 B2 | 4/2023 | Guan et al. |
| 11,645,781 B2 | 5/2023 | Li et al. |
| 11,676,344 B2 | 6/2023 | Li et al. |
| 11,790,648 B2 | 10/2023 | Stoeva et al. |
| 11,797,159 B2 | 10/2023 | Li et al. |
| 11,823,325 B2 | 11/2023 | Vincent et al. |
| 11,830,135 B1 | 11/2023 | Khosravan et al. |

(56) References Cited

U.S. PATENT DOCUMENTS

| | | |
|---|---|---|
| 11,836,973 B2 | 12/2023 | Wixson et al. |
| 2006/0256109 A1 | 11/2006 | Acker et al. |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0109338 A1 | 4/2015 | McKinnon et al. |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2021/0065271 A1 | 3/2021 | Benkreira et al. |
| 2022/0076491 A1 | 3/2022 | Zellner et al. |
| 2022/0092227 A1 | 3/2022 | Yin et al. |
| 2022/0114291 A1* | 4/2022 | Li .................... G06T 19/00 |
| 2022/0164493 A1 | 5/2022 | Li et al. |
| 2022/0188488 A1* | 6/2022 | Patrick ............... G06F 30/13 |
| 2022/0357161 A1* | 11/2022 | DeLuca ................ G06T 7/90 |
| 2023/0071446 A1 | 3/2023 | Narayana et al. |
| 2023/0095173 A1 | 3/2023 | Khosravan et al. |
| 2023/0125295 A1 | 4/2023 | Min et al. |
| 2023/0138762 A1 | 5/2023 | Lambert et al. |
| 2023/0196684 A1 | 6/2023 | Li et al. |
| 2023/0206393 A1 | 6/2023 | Hutchcroft et al. |
| 2024/0078359 A1* | 3/2024 | Sheehan ............. G06F 30/27 |
| 2024/0329484 A1* | 10/2024 | Trikha ................ G02F 1/15 |
| 2024/0371080 A1* | 11/2024 | Piga .................. G06T 15/20 |

FOREIGN PATENT DOCUMENTS

| | | |
|---|---|---|
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019058266 A1 | 3/2019 |
| WO | 2019083832 A1 | 5/2019 |
| WO | 2019104049 A1 | 5/2019 |
| WO | 2019118599 A2 | 6/2019 |
| WO | 2020068177 A1 | 4/2020 |
| WO | 2022053888 A1 | 3/2022 |

OTHER PUBLICATIONS

Usman et al., "Interactive spatial analytics for human-aware building design", Proceedings of the Seventeenth European Conference on Computer Systems, Acmpub27, MIG '18, Nov. 8-10, 2018, 12 pages.

CubiCasa | From video to floor plan in under 5 minutes, retrieved on Mar. 26, 2019, from https://www.cubi.casa/, 6 pages.

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGUIDE: 3D Virtual Tours, retrieved on Mar. 26, 2019, from https://goiguide.com/, 6 pages.

Immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform for Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

(56) References Cited

OTHER PUBLICATIONS

GeoCV, retrieved on Mar. 28, 2019, from https://geocv.com/, 4 pages.
Biersdorfer, J.D., "How to Make a 3-D Model of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.
Pintore et al., "AtlantaNet: Inferring the 3D Indoor Layout from a Single 360 Image beyond the Manhattan World Assumption", ECCV 2020, 16 pages.
Cowles, Jeremy, "Differentiable Rendering", Aug. 19, 2018, accessed Dec. 7, 2020 at https://towardsdatascience.com/differentiable-rendering-d00a4b0f14be, 3 pages.
Yang et al., "DuLa-Net: A Dual-Projection Network for Estimating Room Layouts from a Single RGB Panorama", in arXiv:1811.11977[cs.v2], submitted Apr. 2, 2019, 14 pages.
Sun et al., "HoHoNet: 360 Indoor Holistic Understanding with Latent Horizontal Features", in arXiv:2011.11498[cs.v2], submitted Nov. 24, 2020, 15 pages.
Nguyen-Phuoc et al., "RenderNet: A deep convolutional network for differentiable rendering from 3D shapes", in arXiv:1806.06575[cs.v3], submitted Apr. 1, 2019, 17 pages.
Convolutional neural network, Wikipedia, retrieved from https://en.wikipedia.org/wiki/Convolutional_neural_network, on Dec. 7, 2020, 25 pages.
Hamilton et al., "Inductive Representation Learning on Large Graphs", in 31st Conference on Neural Information Processing Systems (NIPS 2017), 2017, 19 pages.
Kipf et al., "Variational Graph Auto-Encoders", in arXiv:1611.07308v1 [stat.ML], submitted Nov. 21, 2016, 3 pages.
Cao et al., "MolGAN: An Implicit Generative Model for Small Molecular Graphs", in arXiv:1805.11973v1 [stat.ML], submitted May 30, 2018, 11 pages.
Chen et al., "Intelligent Home 3D: Automatic 3D-House Design from Linguistic Descriptions Only", in arXiv:2003.00397v1 [cs.CV], submitted Mar. 1, 2020, 14 pages.
Cucurull et al., "Context-Aware Visual Compatibility Prediction", in arXiv:1902.03646v2 [cs.CV], submitted Feb. 12, 2019, 10 pages.
Fan et al., "Labeled Graph Generative Adversarial Networks", in arXiv:1906.03220v1 [cs.LG], submitted Jun. 7, 2019, 14 pages.
Gong et al., "Exploiting Edge Features in Graph Neural Networks", in arXiv:1809.02709v2 [cs.LG], submitted Jan. 28, 2019, 10 pages.
Genghis Goodman, "A Machine Learning Approach to Artificial Floorplan Generation", University of Kentucky Theses and Dissertations—Computer Science, 2019, accessible at https://uknowledge.uky.edu/cs_etds/89, 40 pages.
Grover et al., "node2vec: Scalable Feature Learning for Networks", in arXiv:1607.00653v1 [cs.SI], submitted Jul. 3, 2016, 10 pages.
Nauata et al., "House-GAN: Relational Generative Adversarial Networks for Graph-constrained House Layout Generation", in arXiv:2003.06988v1 [cs.CV], submitted Mar. 16, 2020, 17 pages.
Kang et al., "A Review of Techniques for 3D Reconstruction of Indoor Environments", in ISPRS International Journal of Geo-Information 2020, May 19, 2020, 31 pages.
Kipf et al., "Semi-Supervised Classification With Graph Convolutional Networks", in arXiv:1609.02907v4 [cs.LG], submitted Feb. 22, 2017, 14 pages.
Li et al., "Graph Matching Networks for Learning the Similarity of Graph Structured Objects", in Proceedings of the 36th International Conference on Machine Learning (PMLR 97), 2019, 18 pages.
Liu et al., "Hyperbolic Graph Neural Networks", in 33rd Conference on Neural Information Processing Systems (NeurIPS 2019), 2019, 12 pages.
Merrell et al., "Computer-Generated Residential Building Layouts", in ACM Transactions on Graphics, Dec. 2010, 13 pages.

\* cited by examiner

US 12,548,218 B2

AUTOMATED BUILDING INFORMATION DETERMINATIONS FROM FLOOR PLAN STRUCTURAL ANALYSIS

TECHNICAL FIELD

The following disclosure relates generally to techniques for automatically determining and using information about buildings' structural characteristics and other attributes from analysis of building floor plans and other building information and for subsequently using the determined information in one or more automated manners, such as to determine room connectivity and visibility/roominess and accessibility information for a building (e.g., for indicated types of users, such as users in wheelchairs) and to provide corresponding navigational data for the building in accordance with the determined information.

BACKGROUND

In various circumstances, such as architectural analysis, property inspection, real estate acquisition and development, general contracting, improvement cost estimation, etc., it may be desirable to know the interior of a house or other building without physically traveling to and entering the building. However, it can be difficult to effectively capture, represent and use such building interior information, including to identify buildings that satisfy criteria of interest, and to display visual information captured within building interiors to users at remote locations (e.g., to enable a user to understand the layout and other details of the interior, including to control the display in user-selected manners). Also, even if a user is present at a building, it can be difficult to effectively navigate the building and determine information about the building that is not readily apparent. While a floor plan of a building may provide some information about layout and other details of a building interior, such use of floor plans has some drawbacks, including that floor plans can be difficult to construct and maintain, to accurately scale and populate with information about room interiors, to visualize and otherwise use, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
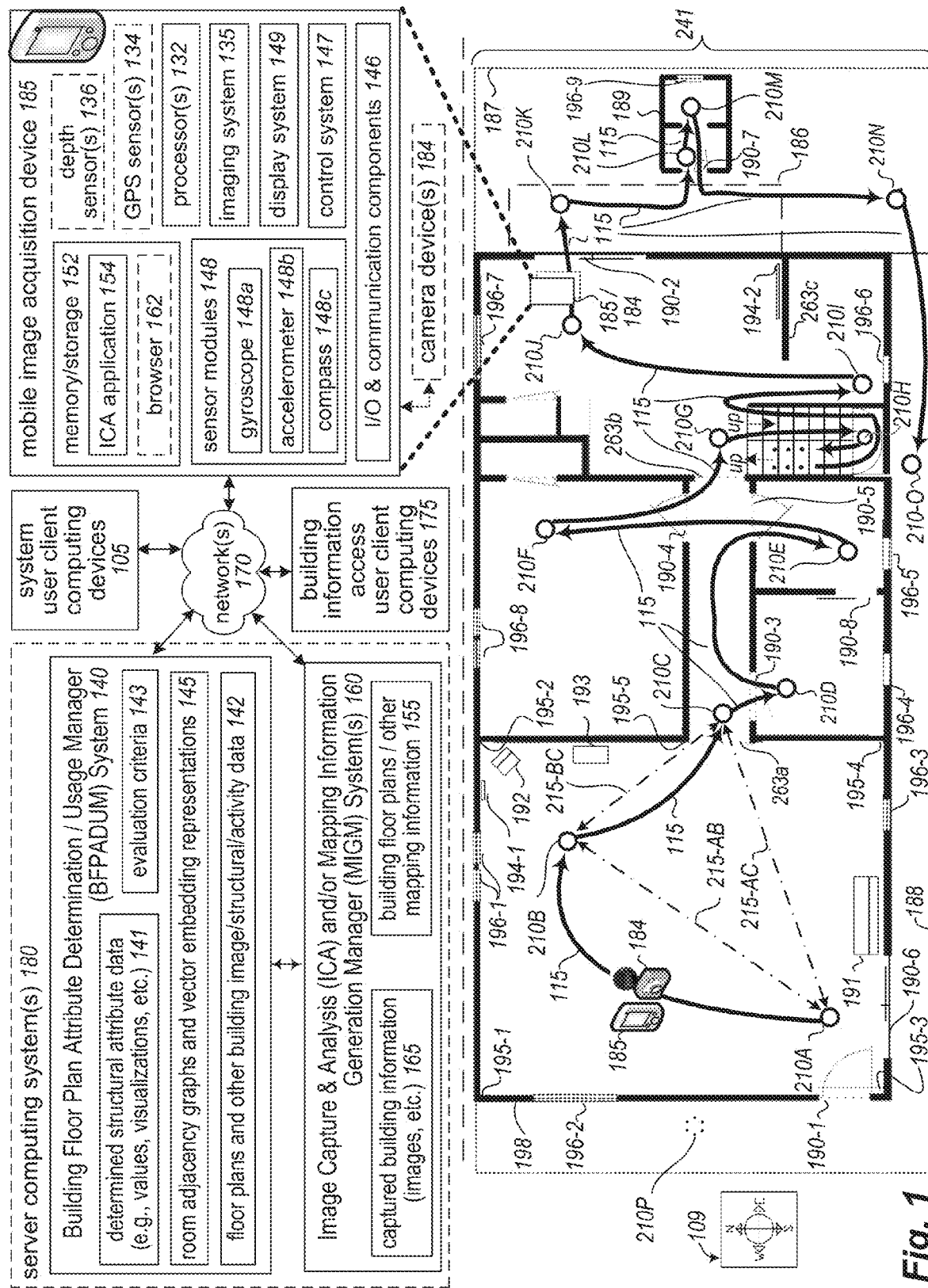
FIG. 1 includes diagrams depicting an exemplary building interior environment and computing system(s) for use in embodiments of the present disclosure, including to generate and present information representing an interior of the building, and/or to determine and further use information about building structural attribute assessments from analysis of buildings' floor plans.

The present disclosure describes techniques for using computing devices to perform automated operations related to automatically determining information about a target building's structural characteristics and other attributes from analysis of existing building information, and for using the determined building information in various manners (e.g., providing corresponding updated navigational data for that target building, such as for use in controlling navigation of autonomous vehicles or other mobile devices in the target building). The automated determination of information about a building's structural characteristics and other attributes may in some embodiments and situations be based in part or in whole from analyzing a floor plan for the building-such a floor plan may, in at least some embodiments, be for an as-built multi-room building (e.g., a house, office building, etc.) and include at least two-dimensional (2D) room shapes positioned relative to each other that are generated from or otherwise associated with panorama images or other images (e.g., rectilinear perspective images) acquired at acquisition locations in and around the building (e.g., without having or using information from any depth sensors or other distance-measuring devices about distances from an image's acquisition location to walls or other objects in the surrounding building). In at least some embodiments, such determination of building attribute information for a target building includes one or more of the following: determining one or more values for one or more accessibility attributes for each of multiple positions in the building based at least in part on structural characteristics of the building, such as with respect to an indicated type of user (e.g., a user in a wheelchair, other types of wheeled or tracked vehicles, a user not in a wheelchair but with limited mobility, etc.); determining one or more values for one or more connectivity attributes for each of multiple positions in the building that reflect inter-room connectivity and optionally other room adjacency information based at least in part on structural characteristics of the building, such as between particular rooms (e.g., from room centers, or room doorways or other room positions) or other positions; determining one or more values for one or more isovist attributes for each of multiple positions in the building that reflect at least one of visibility and/or roominess based at least in part on structural characteristics of the building; etc. In addition, such determined building attribute information for a target building may be used in various manners in various embodiments, such as to assist with navigation of the building, for display or other presentation to one or more users on one or more client devices in corresponding GUIs (graphical user interfaces) to enable virtual navigation of the target building, etc. Additional details are included below regarding automated operations for automatically and using determining information about a target building's structural characteristics and other attributes, and some or all techniques described herein may, in at least some embodiments, be performed via automated operations of a Building Floor Plan Attribute Determination/Usage Manager ("BFPADUM") system, as discussed further below.

As noted above, automated operations of the BFPADUM system may, in at least some embodiments and situations, include determining one or more values for one or more accessibility attributes for each of multiple positions in the building based at least in part on structural characteristics of the building, such as with respect to an indicated type of user (e.g., a user in a wheelchair, other types of wheeled or tracked vehicles, a user not in a wheelchair but with limited mobility, etc.). The determining of the one or more accessibility attributes' associated values for a building may include analyzing at least a floor plan for the building (and optionally additional building information, such as images captured at the building) to assess various structural characteristics of the building, such as widths of doorways and other non-doorway wall openings, lengths and/or heights of various structural elements (e.g., walls, countertops, cabinets, appliances, fixtures, etc.), elevation changes and associated structural elements (e.g., stairways, ramps, etc.), locations of doors and other movable components when being opened or otherwise moved, etc., and using the structural characteristics to assess accessibility for each of a plurality of positions throughout some or all of the building (e.g., for each position in a grid of positions throughout the floor plan and optionally throughout a surrounding property on which the building is located, such as with each grid cell having a size of one or more inches and/or one or more feet or other distance measure for each side of the cell). As one non-exclusive example, the assessment of accessibility for a position with respect to a user in a wheelchair and/or another wheeled or tracked vehicle may include assessing any structural impediments to entering the building (e.g., stairs, underlying surfaces for travel paths that are not paved or otherwise sufficiently hard to support a weight of the wheelchair or other vehicle when loaded, widths of external doorways, etc.), assessing any structural impediments of the building to travel between a building entrance and that position, assessing at least one of lengths or heights of one or more structural elements of the building (e.g., walls) in a defined area around that position (e.g., within a defined radius) and of distances to the element(s) from that position, etc., and combining information from multiple such assessments (e.g., in a weighted manner) to determine an accessibility score or other accessibility value for that position that reflects a degree of accessibility for the wheelchair or other vehicle in reaching that position from outside the building and/or for interacting from that wheelchair or other vehicle with other nearby building objects or other elements from that position—an assessment of at least one accessibility attribute for this user type and/or other type of user (e.g., a walking user with limited mobility) may further include using one or more other factors (e.g., factors specific to that type of user), such as a measurement of travel distances and/or elevation changes from that position to other building locations (e.g., to a bathroom or kitchen or bedroom), the presence or absence of assistive installed items (e.g., grab bars, handrails, seating, elevators, etc.), etc.

In addition, such a determined accessibility score or other accessibility value for a building position may be represented in various manners, such as one of multiple enumerated accessibility values, as a percentage or other value on a continuous scale, etc. Furthermore, the accessibility values for multiple positions may be grouped or otherwise aggregated in various manners, such as for each room and/or other area, for each story or other group of rooms (e.g., rooms of a same type or function), for the building as a whole and/or other structures (e.g. outbuildings) on the property, for the property as a whole, etc., and with the aggregated accessibility value for one or more rooms or other areas able to be represented in various manners, such as an absolute value (e.g., a measurement or other quantity of sub-areas within the room(s) or other area(s) that satisfy one or more defined criteria, such as an amount of square feet or other area measurement of positions that have associated accessibility values above or below a defined accessibility value threshold), a ratio or other relative value (e.g., a ratio of an amount of sub-areas within the room(s) or other area(s) that satisfy one or more defined criteria and expressed relative to an entire amount of the room(s) or other area(s)), etc.—as non-exclusive examples, such aggregated accessibility values may include a quantity or number of inaccessible rooms within the building (or other room grouping, such as for a story), a ratio of such a quantity of inaccessible rooms to a total quantity of rooms in the building (or other room grouping, such as for a story), an amount of inaccessible area (e.g., square feet) within the building (or other room grouping or defined area, such as for a story or an entire property), a percentage of one or more such inaccessible areas to a total amount of that type of area, etc., and with an 'inaccessible' position or group of positions in this example having associated accessibility values below a defined accessibility threshold. In addition, the determined accessibility values for a group or other aggregation of positions may be presented or otherwise provided in various manners, such as in textual and/or numeric form (e.g., with an indication of the associated position, such as shown on a display of a floor plan or property), as a displayed heatmap (e.g., with each position given one of multiple enumerated visual attributes corresponding to that position's accessibility value, and optionally overlaid on a visual representation of the floor plan and/or property boundaries, or otherwise displayed in a manner associated with the positions on the floor plan and/or property), etc. Additional details are included below regarding automated operations for determining and using values of one or more accessibility attributes for positions in a building, including with respect to the examples of FIGS. 2E-2F.

As noted above, automated operations of the BFPADUM system may, in at least some embodiments and situations, include determining one or more values for one or more connectivity attributes for each of multiple positions in the building that reflect inter-room connectivity and optionally other room adjacency information based at least in part on structural characteristics of the building. The determining of the one or more connectivity attributes' values may include analyzing at least a floor plan for the building (and optionally additional building information, such as images captured at the building) to determine information about inter-room connections between rooms (e.g., doorways, non-doorway wall openings, etc.), and optionally about other adjacent rooms that are not directly connected (e.g., with a travel path between the rooms including one or more intermediate rooms, such as hallways, staircases, other rooms, etc.). One or more assessments of connectivity may then include determining, for each of one or more positions in a room (e.g., a center of the room, a doorway or other wall opening, etc.), one or more measurements of that position's connectivity to one or more other positions in the building and/or on the property, such as one or more of the following:

an actual travel distance to each of one or more other defined positions (e.g., a center or other position of other defined rooms or other areas, such as the kitchen, bathroom, bedroom, family room, etc.) via intermediate room(s) if any; a quantity of other directly connected and/or adjacent rooms or other areas for that position; the presence or absence of structural impediments (e.g., stairs) between the position and each of one or more other rooms or other areas or other positions; etc. In at least some embodiments and situations, the determining of the one or more connectivity attributes' values for a target building includes generating an adjacency graph that represents inter-room connections and optionally other room adjacencies and that further stores other attributes of the target building, and optionally further generating one or more vector-based embeddings to concisely represent information of the adjacency graph and target building attributes, such as for use in comparison of the target building and other buildings using such information-additional details are included below regarding the generation and use of such adjacency graphs and vector-based embeddings.

In addition, such a determined connectivity score or other connectivity value for one or more building positions (e.g., a room or other area) may be represented in various manners, such as one of multiple enumerated connectivity values, as a percentage or other value on a continuous scale, etc.—as non-exclusive examples, such connectivity assessments may include a distance (e.g., in feet or other distance measurement, in a quantity of inter-room connections and/or intervening rooms or other areas, etc.) between two positions, a quantity of directly connected and/or adjacent rooms or other areas for a position, etc. In addition, the determined connectivity values may be presented or otherwise provided in various manners, such as in textual and/or numeric form (e.g., with an indication of the associated position, such as shown on a display of a floor plan or property), as a displayed adjacency graph (e.g., overlaid on a visual representation of the floor plan and/or property boundaries, or otherwise displayed in a manner associated with the positions on the floor plan and/or property) and optionally with particular graph nodes (e.g. corresponding to rooms or other areas) and/or graph edges (e.g., corresponding to interconnectivity and/or adjacency between two rooms or other areas) highlighted (e.g., to correspond to a travel path between two rooms or other areas) and/or with associated textual information shown (e.g., distances), as displayed travel paths separate from an adjacency graph, etc. Additional details are included below regarding automated operations for determining and using values for one or more connectivity attributes for positions in a building, including with respect to the examples of FIG. 2I.

As noted above, automated operations of the BFPADUM system may, in at least some embodiments and situations, include determining one or more values for one or more isovist attributes for positions in the building that reflect at least one of visibility and/or roominess from those positions (e.g., a 2D area of space and/or 3D, or three dimensional, volume of space visible from a position, optionally including lines of sight available through doorways and/or past other movable structural elements when positioned to increase visibility) based at least in part on structural characteristics of the building. The determining of the one or more isovist attributes' values for a building may include analyzing at least a floor plan for the building (and optionally additional building information, such as images captured at the building) to assess lines of sight in light of structural characteristics of the building in at least a 2D plane and optionally in 3D space, and determining an assessment of the visibility and/or roominess for each of a plurality of positions throughout some or all of the building (e.g., for each position in a grid of positions throughout the floor plan and optionally throughout a surrounding property on which the building is located, such as with each grid cell having a size of one or more inches and/or one or more feet or other distance measure for each side).

In addition, such a determined isovist score or other isovist value for a building position may be represented in various manners, such as one of multiple enumerated isovist values, as a percentage or other value on a continuous scale, etc. Furthermore, the isovist values for multiple positions may be grouped or otherwise aggregated in various manners, such as for each room and/or other area, for each story or other group of rooms (e.g., rooms of a same type or function), for the building as a whole and/or one or more other structures (e.g. outbuildings) on a property, for the property as a whole (e.g., to include multiple structures on the property), etc., and with the aggregated isovist value for one or more rooms or other areas able to be represented in various manners, such as an absolute value (e.g., a measurement or other quantity of sub-areas within the room(s) or other area(s) that satisfy one or more defined criteria, such as an amount of square feet that have associated isovist values above or below a defined isovist value threshold), a ratio or other relative value (e.g., a ratio of an amount of sub-areas within the room(s) or other area(s) that satisfy one or more defined criteria and expressed relative to an entire amount of the room(s) or other area(s)), etc.—as non-exclusive examples, such aggregated isovist values may include a size of one or more sub-areas within a defined area (e.g., one or more rooms, the building as a whole, etc.) that have isovist values above a defined threshold, a ratio of such sub-area size(s) to a total size of the area, an amount of such sub-area size(s) (e.g., square feet) within an area (e.g., one or more rooms, the building, a story, the total property, etc.), a percentage of one or more such sub-area sizes to a total size of the area, etc. In addition, the determined isovist values for one or more positions may be presented or otherwise provided in various manners, such as in textual and/or numeric form (e.g., with an indication of the associated position, such as shown on a display of a floor plan or property), as a displayed heatmap (e.g., with each position given one of multiple enumerated visual attributes corresponding to that position's isovist value, and optionally overlaid on a visual representation of the floor plan and/or property boundaries, or otherwise displayed in a manner associated with the positions on the floor plan and/or property), etc. Additional details are included below regarding automated operations for determining and using values for one or more isovist attribute(s) for positions throughout a building, including with respect to the examples of FIGS. 2G-2H.

The determining of the values for the accessibility attribute(s) and/or connectivity attribute(s) and/or isovist attribute(s) may be performed in various manners in various embodiments, including in some embodiments to use one or more machine learning models that are trained to determine one or more such types of attribute values from an input floor plan and optionally additional input building information (e.g., building images)—in some embodiments, computer vision techniques are used to determine one or more such types of attribute values from visual analysis of a floor plan and optionally additional building information (e.g., building images), such as instead of or in addition to using one or more trained machine learning models. In addition, in at least some embodiments, machine learning techniques may be used to learn particular accessibility attribute(s) and/or connectivity attribute(s) and/or isovist attribute(s) that are associated with particular types of users, such as by assessing data about a plurality of interactions involving a plurality of users of multiple types and a plurality of buildings, with the plurality of interactions include at least one of acquisition interactions by at least some of the plurality of users of at least some of the plurality of buildings, or remodeling interactions by at least some of the plurality of users involving at least some of the plurality of buildings, or browsing interactions by at least some of the plurality of users with online information about at least some of the plurality of buildings. In addition, such determined building information for a target building may be used in various manners in various embodiments, such as to assist with navigation of the building, for presentation to one or more users, to determine if the target building satisfies one or more defined criteria (e.g., search criteria), to identify other buildings similar to the target building, as part of an evaluation of a value or other characteristic of the target building, as part of personalizing information about the target building for a user or otherwise providing user-specific information about one or more buildings that include the target building (e.g., information about buildings and/or building areas that have determined values or other assessments for one or more of an accessibility attribute or a connectivity attribute or an isovist attribute, by using user-specific thresholds for determining areas that are sufficiently accessible or connected or have isovist visibility, etc.), to generate recommendations that include the target building and/or other buildings similar to the target building, to generate a textual description of the target building, etc.

The described techniques provide various benefits in various embodiments, including to allow floor plans of multi-room buildings and other structures to be identified and used more efficiently and rapidly and in manners not previously available, including to automatically determine one or more types of building attributes (e.g., accessibility attribute(s), connectivity attribute(s), isovist attribute(s), etc.) from analysis of building floor plans and optionally other building information (e.g., building images captured at the building). In addition, such automated techniques allow such determination of building attributes to be performed using information acquired from the actual building environment (rather than from plans on how the building should theoretically be constructed), as well as enabling the capture of changes to structural elements and/or visual appearance elements that occur after a building is initially constructed. Such described techniques further provide benefits in allowing improved automated navigation of a building by mobile devices (e.g., semi-autonomous or fully autonomous vehicles), based at least in part on the identification of building floor plans that match specified criteria, including to significantly reduce computing power and time used to attempt to otherwise learn a building's layout. In addition, in some embodiments the described techniques may be used to provide an improved GUI in which a user may more accurately and quickly identify one or more building floor plans matching specified criteria, and obtain information about one or more such buildings (e.g., for use in navigating an interior of the one or more buildings), including in response to search requests, as part of providing personalized information to the user, as part of providing value estimates and/or other information about a building to a user (e.g., after analysis of information about one or more target building floor plans that are similar to one or more initial floor plans or that otherwise match specified criteria), etc. Various other benefits are also provided by the described techniques, some of which are further described elsewhere herein.

As noted above, automated operations of a BFPADUM system may include generating and using an adjacency graph for a building floor plan in at least some embodiments, while otherwise generating building adjacency information in other formats in other embodiments. Such a floor plan of a building may include a 2D (two-dimensional) representation of various information about the building (e.g., the rooms, doorways between rooms and other inter-room connections, exterior doorways, windows, etc.), and may be further associated with various types of supplemental or otherwise additional information (about the building (e.g., data for a plurality of other building-related attributes)—such additional building information may, for example, include one or more of the following: a 3D, or three-dimensional, model of the building that includes height information (e.g., for building walls and other vertical areas); a 2.5D, or two-and-a-half dimensional, model of the building that when rendered includes visual representations of walls and/or other vertical surfaces without explicitly modeling measured heights of those walls and/or other vertical surfaces; images and/or other types of data captured in rooms of the building, including panoramic images (e.g., 360° panorama images); etc., as discussed in greater detail below. Such an adjacency graph may store or otherwise include some or all such data for the building, such as with at least some such data stored in or otherwise associated with nodes of the adjacency graph that represent some or all rooms of the floor plan (e.g., with each node containing information about attributes of the room represented by the node), and/or with at least some such attribute data stored in or otherwise associated with edges between nodes that represent connections between adjacent rooms via doorways or other inter-room wall openings, or in some situations further represent adjacent rooms that share at least a portion of at least one wall and optionally a full wall without any direct inter-room opening connecting those two rooms (e.g., with each edge containing information about connectivity status between the rooms represented by the nodes that the edge inter-connects, such as whether an inter-room opening exists between the two rooms, and/or a type of inter-room opening or other type of adjacency between the two rooms such as without any direct inter-room wall opening connection). In some embodiments and situations, the adjacency graph may further represent at least some information external to the building, such as exterior areas adjacent to doorways or other wall openings between the building and the exterior and/or other accessory structures on the same property as the building (e.g., a garage, shed, pool house, separate guest quarters, mother-in-law unit or other accessory dwelling unit, pool, patio, deck, sidewalk, garden, yard, etc.), or more generally some or all external areas of a property that includes one or more buildings (e.g., a house and one or more outbuildings or other accessory structures)—such exterior areas and/or other structures may be represented in various manners in the adjacency graph, such as via separate nodes for each such exterior area or other structure, or instead as attribute information associated with corresponding nodes or edges or instead with the adjacency graph as a whole (for the building as a whole). The adjacency graph may further have associated attribute information for the corresponding rooms and inter-room connections in at least some embodiments, such as to represent within the adjacency graph some or all of the information available on a floor plan and otherwise associated with the floor plan (or in some embodiments and situations, information in and associated with a 3D model of the building)—for example, if there are images associated with particular rooms of the floor plan or other associated areas (e.g., external areas), corresponding visual attributes may be included within the adjacency graph, whether as part of the associated rooms or other areas, or instead as a separate layer of nodes within the graph that represent the images. In embodiments with adjacency information in a form other than an adjacency graph, some or all of the above-indicated types of information may be stored in or otherwise associated with the adjacency information, including information about rooms, about adjacencies between rooms, about connectivity status between adjacent rooms, about attributes of the building, etc. Additional details are included below regarding the generation and use of adjacency graphs, including with respect to the examples of FIG. 2I and its associated description.

As is also noted above, automated operations of a BFPADUM system may further include generating and using one or more vector-based embeddings (also referred to herein as a "vector embedding") to concisely represent information in an adjacency graph for a floor plan of a building, such as to summarize the semantic meaning and spatial relationships of the floor plan in a manner that enables reconstruction of some or all of the floor plan from the vector embedding. Such a vector embedding may be generated in various manners in various embodiments, such as via the use of representation learning and one or more trained machine learning models, and in at least some such embodiments may be encoded in a format that is not easily discernible to a human reader. Non-exclusive examples of techniques for generating such vector embeddings are included in the following documents, which are incorporated herein by reference in their entirety: "Symmetric Graph Convolution Autoencoder For Unsupervised Graph Representation Learning" by Jiwoong Park et al., 2019 International Conference On Computer Vision, Aug. 7, 2019; "Inductive Representation Learning On Large Graphs" by William L Hamilton et al., $31^{st}$ Conference On Neural Information Processing Systems 2017 Jun. 7, 2017; and "Variational Graph Auto-Encoders" by Thomas N. Kipf et al., $30^{th}$ Conference On Neural Information Processing Systems 2017 (Bayesian Deep Learning Workshop), Nov. 21, 2016. Additional details are included below regarding the generation and use of vector embeddings, including with respect to the examples of FIG. 2I and its description.

In addition, as noted above, a floor plan may have various information that is associated with individual rooms and/or with inter-room connections and/or with a corresponding building and/or encompassing property as a whole, and the corresponding adjacency graph and/or vector embedding(s) for such a floor plan may include some or all such associated information (e.g., represented as attributes of nodes for rooms in an adjacency graph and/or attributes of edges for inter-room connections in an adjacency graph and/or represented as attributes of the adjacency graph as a whole, such as in a node representing the overall building, and with corresponding information encoded in the associated vector embedding(s)). Such associated information may include a variety of types of data, including information about one or more of the following non-exclusive examples: room types, room dimensions, locations of windows and doors and other inter-room openings in a room, room shape, a view type for each exterior window, information about and/or copies of images taken in a room, information about and/or copies of audio or other data captured in a room, information of various types about features of one or more rooms (e.g., as automatically identified from analysis of images, as supplied by operator users of the BFPADUM system and/or by end-users viewing information about the floor plan and/or by operator users of ICA and/or MIGM systems as part of capturing information about a building and generating a floor plan for the building, etc.), attributes of structures and objects (e.g., colors, shapes, materials, age, condition, quality, etc.), types of inter-room connections, dimensions of inter-room connections, etc. Furthermore, in at least some embodiments, one or more additional subjective attributes may be determined for and associated with the floor plan, such as via analysis of the floor plan information (e.g., an adjacency graph for the floor plan) by one or more trained machine learning models (e.g., classification neural network models) to identify floor plan characteristics for a building as a whole or a particular building floor (e.g., an open floor plan; a typical/normal versus atypical/odd/unusual floor plan; a standard versus nonstandard floor plan; a floor plan that is accessibility friendly, such as by being accessible with respect to one or more characteristics such as disability and/or advanced age; etc.)—in at least some such embodiments, the one or more classification neural network models are part of the BFPADUM system and are trained via supervised learning using labeled data that identifies floor plans having each of the possible characteristics, while in other embodiments such classification neural network models may instead use unsupervised clustering. Additional details are included below regarding the determination and use of attribute information for floor plans.

After attribute information is determined for one or more accessibility attributes and/or one or more connectivity attributes and/or one or more isovist attributes for a building from its floor plan (optionally including an adjacency graph and one or more vector embeddings), that determined information (optionally in combination with other determined building attributes) may be used by the BFPADUM system as specified criteria to automatically determine one or more other similar or otherwise matching floor plans of other buildings in various manners in various embodiments. For example, in some embodiments, an initial floor plan is identified, and one or more corresponding vector embeddings for the initial floor plan are generated (with details about the determined attribute information) and compared to generated vector embeddings for other candidate floor plans in order to determine a difference between the initial floor plan's vector embedding(s) and the vector embeddings of some or all of the candidate floor plans, with smaller differences between two vector embeddings corresponding to higher degrees of similarity between the building information represented by those vector embeddings. Differences between two such vector embeddings may be determined in various manners in various embodiments, including, as non-exclusive examples, by using one or more of the following distance metrics: Euclidean distance, cosine distance, graph edit distance, a custom distance measure specified by a user, etc.; and/or otherwise determining similarity without use of such a distance metrics. In at least some embodiments, multiple such initial floor plans may be identified and used in the described manner to determine a combined distance between a group of vector embeddings for the multiple initial floor plans and the vector embeddings for each of multiple other candidate floor plans, such as by determining individual distances for each of the initial floor plans to a given other candidate floor plan and by combining the multiple individual determined distances in one or more manners (e.g., a mean or other average, a cumulative total, etc.) to generate the combined distance for the group of vector embeddings of the multiple initial floor plans to that given other candidate floor plan. Additional details are included below regarding comparing vector embeddings for floor plans to determine floor plan similarities.

In addition, in some embodiments, one or more target floor plans are identified that are similar to specified criteria associated with a particular end-user (e.g., based on one or more initial target floor plans that are selected by the end-user and/or are identified as previously being of interest to the end-user, whether based on explicit and/or implicit activities of the end-user to specify such floor plans; based on one or more search criteria specified by the end-user, whether explicitly and/or implicitly; etc.) based at least in part on one or more determined accessibility attributes and/or connectivity attributes and/or isovist attributes, and are used in further automated activities to personalize interactions with the end-user. Such further automated personalized interactions may be of various types in various embodiments, and in some embodiments may include displaying or otherwise presenting information to the end-user about the target floor plan(s) and/or additional information associated with those floor plans. Additional details are included below regarding the use of one or more identified target floor plans for further end-user personalization and/or presentation.

In addition, in at least some embodiments and situations, some or all of the images acquired for a building and associated with the building's floor plan may be panorama images that are each acquired at one of multiple acquisition locations in or around the building, such as to generate a panorama image at each such acquisition location from one or more of a video at that acquisition location (e.g., a 360° video taken from a smartphone or other mobile device held by a user turning at that acquisition location), or multiple images acquired in multiple directions from the acquisition location (e.g., from a smartphone or other mobile device held by a user turning at that acquisition location), or a simultaneous capture of all the image information (e.g., using one or more fisheye lenses), etc. Such images may include visual data, and in at least some embodiments and situations, acquisition metadata regarding the acquisition of such panorama images may be obtained and used in various manners, such as data acquired from IMU (inertial measurement unit) sensors or other sensors of a mobile device as it is carried by a user or otherwise moved between acquisition locations (e.g., compass heading data, GPS location data, etc.). It will be appreciated that such a panorama image may in some situations be represented in a spherical coordinate system and provide up to 360° coverage around horizontal and/or vertical axes, such that a user viewing a starting panorama image may move the viewing direction within the starting panorama image to different orientations to cause different images (or "views") to be rendered within the starting panorama image (including, if the panorama image is represented in a spherical coordinate system, to convert the image being rendered into a planar coordinate system). Additional details are included below related to acquisition and use of panorama images or other images for a building.

In at least some embodiments, a BFPADUM system may operate in conjunction with one or more separate ICA (Image Capture and Analysis) systems and/or with one or more separate MIGM (Mapping Information and Generation Manager) systems, such as to obtain and use floor plan and other associated information for buildings from the ICA and/or MIGM systems, while in other embodiments such an BFPADUM system may incorporate some or all functionality of such ICA and/or MIGM systems as part of the BFPADUM system. In yet other embodiments, the BFPADUM system may operate without using some or all functionality of the ICA and/or MIGM systems, such as if the BFPADUM system obtains information about building floor plans and associated information from other sources (e.g., from manual creation or provision of such building floor plans and/or associated information by one or more users).

With respect to functionality of such an ICA system, it may perform automated operations in at least some embodiments to acquire images (e.g., panorama images) at various acquisition locations associated with a building (e.g., in the interior of multiple rooms of the building), and optionally further acquire metadata related to the image acquisition process (e.g., compass heading data, GPS location data, etc.) and/or to movement of a capture device between acquisition locations—in at least some embodiments, such acquisition and subsequent use of acquired information may occur without having or using information from depth sensors or other distance-measuring devices about distances from images' acquisition locations to walls or other objects in a surrounding building or other structure. For example, in at least some such embodiments, such techniques may include using one or more mobile devices (e.g., a camera having one or more fisheye lenses and mounted on a rotatable tripod or otherwise having an automated rotation mechanism; a camera having one or more fisheye lenses sufficient to capture 360 degrees horizontally without rotation; a smart phone held and moved by a user, such as to rotate the user's body and held smart phone in a 360° circle around a vertical axis; a camera held by or mounted on a user or the user's clothing; a camera mounted on an aerial and/or ground-based drone or other robotic device; etc.) to capture visual data from a sequence of multiple acquisition locations within multiple rooms of a house (or other building). Additional details are included elsewhere herein regarding operations of device(s) implementing an ICA system, such as to perform such automated operations, and in some cases to further interact with one or more ICA system operator user(s) in one or more manners to provide further functionality.

With respect to functionality of such an MIGM system, it may perform automated operations in at least some embodiments to analyze multiple 360° panorama images (and optionally other images) that have been acquired for a building interior (and optionally an exterior of the building), and determine room shapes and locations of passages connecting rooms for some or all of those panorama images, as well as to determine wall elements and other elements of some or all rooms of the building in at least some embodiments and situations. The types of connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular attributes (e.g., a color and/or material type and/or other characteristics of particular features or other elements, such as a floor, wall, ceiling, countertop, furniture, fixture, appliance, cabinet, island, fireplace, etc.; the presence and/or absence of particular features or other elements; etc.), or to otherwise determine relevant attributes (e.g., directions that building features or other elements face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

For illustrative purposes, some embodiments are described below in which specific types of information are acquired, used and/or presented in specific ways for specific types of structures and by using specific types of devices-however, it will be understood that the described techniques may be used in other manners in other embodiments, and that the invention is thus not limited to the exemplary details provided. As one non-exclusive example, while specific types of data structures (e.g., floor plans, adjacency graphs, vector embeddings, etc.) are generated and used in specific manners in some embodiments, it will be appreciated that other types of information to describe floor plans and other associated information may be similarly generated and used in other embodiments, including for buildings (or other structures or layouts) separate from houses, and that floor plans identified as matching specified criteria may be used in other manners in other embodiments. In addition, the term "building" refers herein to any partially or fully enclosed structure, typically but not necessarily encompassing one or more rooms that visually or otherwise divide the interior space of the structure-non-limiting examples of such buildings include houses, apartment buildings or individual apartments therein, condominiums, office buildings, commercial buildings or other wholesale and retail structures (e.g., shopping malls, department stores, warehouses, etc.), supplemental structures on a property with another main building (e.g., a detached garage or shed on a property with a house), etc. The term "acquire" or "capture" as used herein with reference to a building interior, acquisition location, or other location (unless context clearly indicates otherwise) may refer to any recording, storage, or logging of media, sensor data, and/or other information related to spatial characteristics and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction. The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

FIG. 1 includes an example block diagram of various computing devices and systems that may participate in the described techniques in some embodiments, such as with respect to the example building 198 (in this example, a house) and the example Building Floor Plan Attribute Determination/Usage Manager ("BFPADUM") system 140 executing on one or more server computing systems 180 in this example embodiment. An Interior Capture and Analysis ("ICA") system (e.g., an ICA system 160 executing on the one or more server computing systems 180, such as part of the BFPADUM system; an ICA system application 154 executing on a mobile image acquisition device 185; etc.) may first capture information 165 with respect to one or more buildings or other structures (e.g., by capturing one or more 360° panorama images and/or other images for multiple acquisition locations 210 in an example house 198), and a MIGM (Mapping Information Generation Manager) system 160 executing on the one or more server computing systems 180 (e.g., as part of the BFPADUM system) may further use that captured building information and optionally additional supporting information (e.g., supplied by system operator users via computing devices 105 over intervening computer network(s) 170) to generate and provide building floor plans 155 and/or other mapping-related information (not shown) for the building(s) or other structure(s). Additional details related to the automated operation of the ICA and MIGM systems are included elsewhere herein, including with respect to FIGS. 2A-2D and with respect to FIGS. 5 and 6A-6B, respectively.

In the illustrated embodiment, the ICA and MIGM systems 160 are operating as part of the BFPADUM system 140 that analyzes building information 142 (e.g., images 165 acquired by the ICA system, floor plans 155 generated by the MIGM system, etc.) and determines building structural attribute information 141 (e.g., building attributes and their associated values, associated visualizations for subsequent presentation and/or other use, etc.) and optionally additional corresponding building information 145 (e.g., adjacency graphs, hierarchical vector embeddings, etc.), optionally using supporting information supplied by system operator users via computing devices 105 over intervening computer network(s) 170. The BFPADUM system 140 in the illustrated embodiment may further optionally use one or more evaluation criteria 143 as part of the determining of the building structural attribute values and/or associated visualizations (e.g., to specify thresholds for what qualifies as 'accessible' or 'inaccessible' for an accessibility attribute, to specify thresholds for what qualifies as high or low isovist values for an isovist attribute, to specify thresholds for what types of inter-room connections and/or paths qualify as being connected for a connectivity attribute, etc.), including in some embodiments and situations to use user-specific criteria (e.g., to personalize information presented or otherwise provided to a user based on preferences of that user, to determine and provide attribute values and/or visualizations to a type of user using types of information associated with that user type, etc.). In addition, the BFPADUM system 140 in the illustrated embodiment may further include one or more trained machine learning models 144 (e.g., one or more trained neural networks) and use the trained machine learning model(s) in various manners, including in some embodiments as part of the analysis of the building information and determination of the building structural attribute information, to generate an adjacency graph and vector embedding for a building, to learn associations between particular building structural attributes and types of users, etc. Furthermore, in at least some embodiments and situations, one or more users of BFPADUM client computing devices 105 may further interact over the network(s) 170 with the BFPADUM system 140, such as to assist with some of the automated operations of the BFPADUM system for determining building structural attribute information and for subsequent use of the determined building structural attribute information in one or more further automated manners. Additional details related to the automated operation of the BFPADUM system are included elsewhere herein, including with respect to FIGS. 2D-2J and FIGS. 4A-4B.

While the ICA and MIGM systems 160 are illustrated in this example embodiment as executing on the same server computing system(s) 180 as the BFPADUM system (e.g., with all systems being operated by a single entity or otherwise being executed in coordination with each other, such as with some or all functionality of all the systems integrated together), in other embodiments the ICA system 160 and/or MIGM system 160 and/or BFPADUM system 140 may operate on one or more other systems separate from the system(s) 180 (e.g., on mobile device 185; one or more other computing systems, not shown; etc.), whether instead of or in addition to the copies of those systems executing on the system(s) 180 (e.g., to have a copy of the MIGM system 160 executing on the device 185 to incrementally generate at least partial building floor plans as building images are acquired by the ICA system 160 executing on the device 185 and/or by that copy of the MIGM system, while another copy of the MIGM system optionally executes on one or more server computing systems to generate a final complete building floor plan after all images are acquired), and in yet other embodiments the BFPADUM may instead operate without an ICA system and/or MIGM system and instead obtain panorama images (or other images) and/or building floor plans from one or more external sources.

Various components of the mobile computing device 185 are also illustrated in FIG. 1, including one or more hardware processors 132 (e.g., CPUs, GPUs, etc.) that execute software (e.g., ICA application 154, optional browser 162, etc.) using executable instructions stored and/or loaded on one or more memory/storage components 152 of the device 185, and optionally one or more imaging systems 135 of one or more types to acquire visual data of one or more panorama images 165 and/or other images (not shown, such as rectilinear perspective images)—some or all such images may in some embodiments be supplied by one or more separate associated camera devices 184 (e.g., via a wired/cabled connection, via Bluetooth or other inter-device wireless communications, etc.), whether in addition to or instead of images captured by the mobile device 185. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), one or more control systems 147 managing I/O (input/output) and/or communications and/or networking for the device 185 (e.g., to receive instructions from and present information to the user) such as for other device I/O and communication components 146 (e.g., network interfaces or other connections, keyboards, mice or other pointing devices, microphones, speakers, GPS receivers, etc.), a display system 149 (e.g., with a touch-sensitive screen), optionally one or more depth-sensing sensors or other distance-measuring components 136 of one or more types, optionally a GPS (or Global Positioning System) sensor 134 or other position determination sensor (not shown in this example), etc. Other computing devices/systems 105, 175 and 180 and/or camera devices 184 may include various hardware components and stored information in a manner analogous to mobile device 185, which are not shown in this example for the sake of brevity, and as discussed in greater detail below with respect to FIG. 3.

One or more users (not shown) of one or more client computing devices 175 may further interact over one or more computer networks 170 with the BFPADUM system 140 (and optionally the ICA system 160 and/or MIGM system 160), such as to assist in determining building structural attribute information and in subsequently using the determined building structural attribute information in one or more further automated manners-such interactions by the user(s) may include, for example, specifying target criteria to use in searching for corresponding floor plans or otherwise providing information about target criteria of interest to the users, or obtaining and optionally interacting with one or more particular identified floor plans and/or with additional associated information (e.g., to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed, etc.). In addition, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering of the building, etc. Also, while not illustrated in FIG. 1, in some embodiments the client computing devices 175 (or other devices, not shown) may receive and use information about identified floor plans and/or other mapping-related information in additional manners, such as to control or assist automated navigation activities by those devices (e.g., by autonomous vehicles or other devices), whether instead of or in addition to display of the identified information.

In the depicted computing environment of FIG. 1, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1, the ICA system may perform automated operations involved in generating multiple 360° panorama images at multiple associated acquisition locations (e.g., in multiple rooms or other locations within a building or other structure and optionally around some or all of the exterior of the building or other structure), such as using visual data acquired via the mobile device(s) 185 and/or associated camera devices 184, and for use in generating and providing a representation of an interior of the building or other structure. For example, in at least some such embodiments, such techniques may include using one or more mobile devices (e.g., a camera having one or more fisheye lenses and mounted on a rotatable tripod or otherwise having an automated rotation mechanism, a camera having sufficient fisheye lenses to capture 360° horizontally without rotation, a smart phone held and moved by a user, a camera held by or mounted on a user or the user's clothing, etc.) to capture data from a sequence of multiple acquisition locations within multiple rooms of a house (or other building), and to optionally further capture data involved in movement of the acquisition device (e.g., movement at an acquisition location, such as rotation; movement between some or all of the acquisition locations, such as for use in linking the multiple acquisition locations together; etc.), in at least some cases without having distances between the acquisition locations being measured or having other measured depth information to objects in an environment around the acquisition locations (e.g., without using any depth-sensing sensors). After an acquisition location's information is captured, the techniques may include producing a 360° panorama image from that acquisition location with 360 degrees of horizontal information around a vertical axis (e.g., a 360° panorama image that shows the surrounding room in an equirectangular format), and then providing the panorama images for subsequent use by the MIGM and/or BFPADUM systems. Additional details related to embodiments of a system providing at least some such functionality of an ICA system are included in U.S. Non-Provisional patent application Ser. No. 16/693,286, filed Nov. 23, 2019 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 16/236,187, filed Dec. 28, 2018 and entitled "Automated Control Of Image Acquisition Via Use Of Acquisition Device Sensors" (which includes disclosure of an example ICA system that is generally directed to obtaining and using panorama images from within one or more buildings or other structures); and in U.S. Non-Provisional patent application Ser. No. 16/190,162, filed Nov. 14, 2018 and entitled "Automated Mapping Information Generation From Inter-Connected Images"; each of which is incorporated herein by reference in its entirety.

Figure 7A:
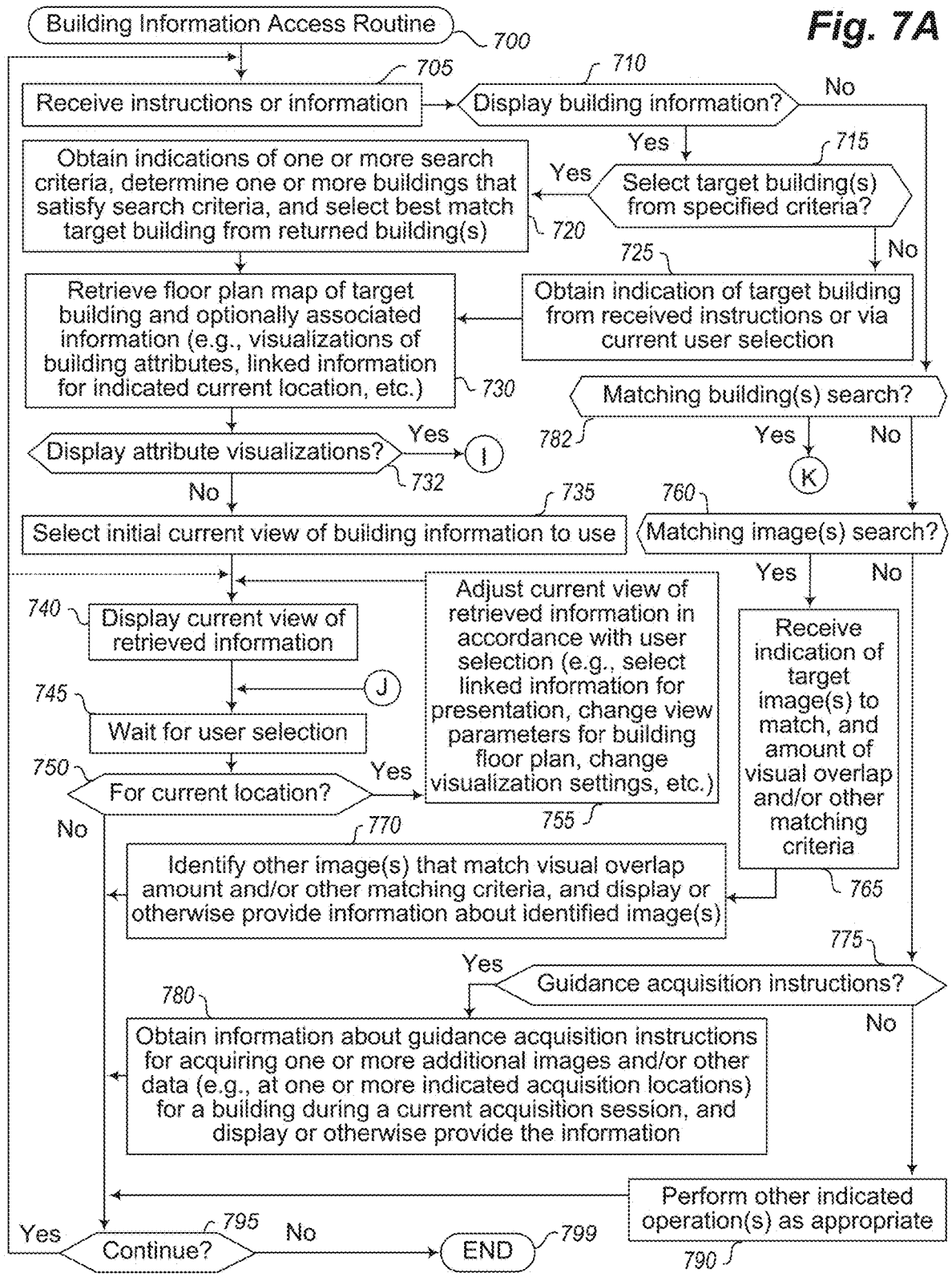
FIGS. 7A-7B illustrate an example embodiment of a flow diagram for a Building Information Access system routine in accordance with an embodiment of the present disclosure.
Figure 7B:
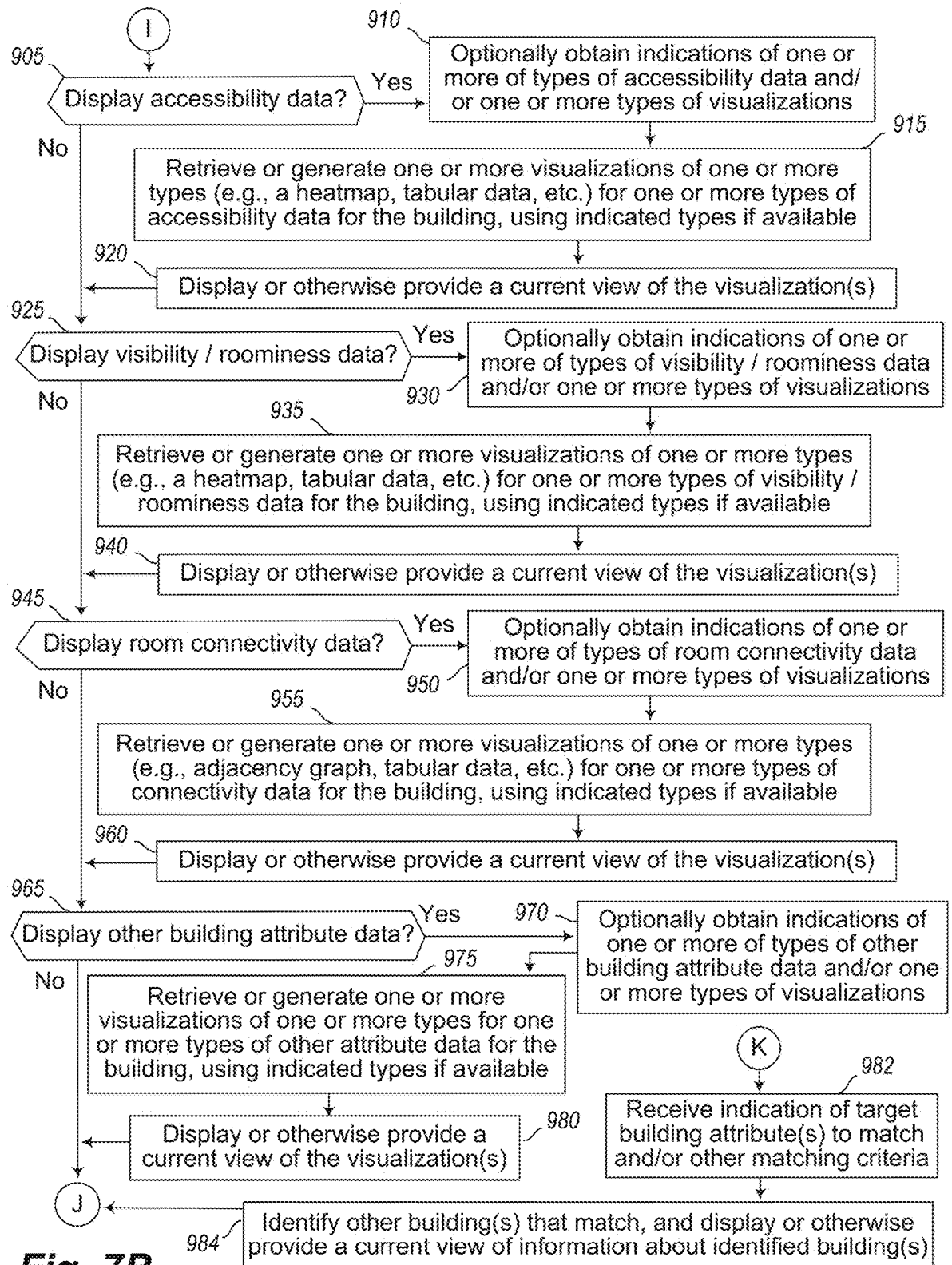

One or more end users (not shown) of one or more building information access client computing devices 175 may further interact over computer networks 170 with the BFPADUM system 140 (and optionally the MIGM system 160 and/or ICA system 160), such as to obtain, display and interact with a generated floor plan (and/or other generated mapping information) and/or determined building structural attribute information and/or associated images, such as by supplying information about one or more indicated buildings of interest and/or other criteria and receiving information about one or more corresponding matching buildings, as discussed in greater detail elsewhere herein, including with respect to FIGS. 7A-7B. In addition, while not illustrated in FIG. 1, a floor plan (or portion of it) may be linked to or otherwise associated with one or more additional types of information, such as one or more associated and linked images or other associated and linked information, including for a two-dimensional ("2D") floor plan of a building to be linked to or otherwise associated with a separate 2.5D model floor plan rendering of the building and/or a 3D model floor plan rendering of the building, etc., and including for a floor plan of a multi-story or otherwise multi-level building to have multiple associated sub-floor plans for different stories or levels that are interlinked (e.g., via connecting stairway passages) or are part of a common 2.5D and/or 3D model. Accordingly, non-exclusive examples of an end user's interactions with a displayed or otherwise generated 2D floor plan of a building may include one or more of the following: to request a display of or other presentation of one or more indicated types of determined building structural attribute information and to optionally interact with such displayed or otherwise presented determined building structural attribute information in various manners; to change between a floor plan view and a view of a particular image at an acquisition location within or near the floor plan; to change between a 2D floor plan view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D coordinate system to which a current user viewing direction is directed, and to render a corresponding planar image that illustrates that portion of the panorama image without the curvature or other distortions present in the original panorama image; etc. Additional details regarding a BIIP (Building Information Integrated Presentation) system and/or an ILTM (Image Locations Transition Manager) system, which are example embodiments of systems to provide or otherwise support at least some functionality of a building information access system and routine as discussed herein, are included in U.S. Non-Provisional patent application Ser. No. 16/681,787, filed Nov. 12, 2019 and entitled "Presenting Integrated Building Information Using Three-Dimensional Building Models," and in U.S. Non-Provisional patent application Ser. No. 15/950,881, filed Apr. 11, 2018 and entitled "Presenting Image Transition Sequences Between Acquisition Locations," each of which is incorporated herein by reference in its entirety. In addition, while not illustrated in FIG. 1, in some embodiments the client computing devices 175 (or other devices, not shown) may receive and use generated floor plans and/or other generated mapping-related information in additional manners, such as to control or assist automated navigation activities by those devices (e.g., by autonomous vehicles or other devices), whether instead of or in addition to display of the generated information.

FIG. 1 further depicts an exemplary building interior environment in which 360° panorama images and/or other images are acquired, such as by the ICA system and for use by the MIGM system (e.g., under control of the BFPADUM system) to generate and provide one or more corresponding building floor plans (e.g., multiple incremental partial building floor plans) and by the BFPADUM system to further use such building information as part of automated building matching determination operations. In particular, FIG. 1 illustrates one story of a multi-story house (or other building) 198 with an interior that was captured at least in part via multiple panorama images, such as by a mobile image acquisition device 185 with image acquisition capabilities and/or one or more associated camera devices 184 as they are moved through the building interior to a sequence of multiple acquisition locations 210 (e.g., starting at acquisition location 210A, moving to acquisition location 210B along travel path 115, etc., and ending at acquisition location 210-O or 210P outside of the building—the path 115 may not include straight-line movement between positions, as illustrated for acquisition locations 210A-210C with respect to direct lines 215-AB, 215-AC and 215-BC). An embodiment of the ICA system may automatically perform or assist in the capturing of the data representing the building interior (as well as to further analyze the captured data to generate 360° panorama images to provide a visual representation of the building interior), and an embodiment of the MIGM system may analyze the visual data of the acquired images to generate one or more building floor plans for the house 198 (e.g., multiple incremental building floor plans). While such a mobile image acquisition device may include various hardware components, such as a camera, one or more sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships between different panorama images and their acquisition locations in such embodiments may be determined in part or in whole based on features in different images but without using any data from any such depth sensors, while in other embodiments such depth data may be used. In addition, while directional indicator 109 is provided in FIG. 1 for reference of the reader relative the example house 198, the mobile device and/or ICA system may not use such absolute directional information and/or absolute locations in at least some embodiments, such as to instead determine relative directions and distances between acquisition locations 210 without regard to actual geographical positions or directions in such embodiments, while in other embodiments such absolute directional information and/or absolute locations may be obtained and used.

In operation, the mobile device 185 and/or camera device (s) 184 arrive at a first acquisition location 210A within a first room of the building interior (in this example, in a living room accessible via an external door 190-1), and captures or acquires a view of a portion of the building interior that is visible from that acquisition location 210A (e.g., some or all of the first room, and optionally small portions of one or more other adjacent or nearby rooms, such as through doorway wall openings, non-doorway wall openings, hallways, stairways or other connecting passages from the first room). The view capture may be performed in various manners as discussed herein, and may include a number of objects or other features (e.g., structural details) that may be visible in images captured from the acquisition location—in the example of FIG. 1, such objects or other features within the building 198 include the doorways 190 (including 190-1 through 190-6, such as with swinging and/or sliding doors), windows 196 (including 196-1 through 196-8), corners or edges 195 (including corner 195-1 in the northwest corner of the building 198, corner 195-2 in the northeast corner of the first room, corner 195-3 in the southwest corner of the first room, corner 195-4 in the southeast corner of the first room, corner 195-5 at the northern edge of the inter-room passage between the first room and a hallway, etc.), furniture 191-193 (e.g., a couch 191; chair 192; table 193; etc.), pictures or paintings or televisions or other hanging objects 194 (such as 194-1 and 194-2) hung on walls, light fixtures (not shown in FIG. 1), various built-in appliances or fixtures or other structural elements (not shown in FIG. 1), etc. The user may also optionally provide a textual or auditory identifier to be associated with an acquisition location and/or a surrounding room, such as "living room" for one of acquisition locations 210A or 210B or for the room including acquisition locations 210A and/or 210B, while in other embodiments the ICA and/or MIGM system may automatically generate such identifiers (e.g., by automatically analyzing images and/or video and/or other recorded information for a building to perform a corresponding automated determination, such as by using machine learning; based at least in part on input from ICA and/or MIGM system operator users; etc.) or the identifiers may not be used.

After the first acquisition location 210A has been captured, the mobile device 185 and/or camera device(s) 184 may move or be moved to a next acquisition location (such as acquisition location 210B), optionally recording images and/or video and/or other data from the hardware components (e.g., from one or more IMUs, from the camera, etc.) during movement between the acquisition locations. At the next acquisition location, the mobile 185 and/or camera device(s) 184 may similarly capture a 360° panorama image and/or other type of image from that acquisition location. This process may repeat for some or all rooms of the building and in some cases external to the building, as illustrated for additional acquisition locations 210C-210P in this example, with the images from acquisition locations 210A to 210-O being captured in a single image acquisition session in this example (e.g., in a substantially continuous manner, such as within a total of 5 minutes or 15 minutes), and with the image from acquisition location 210P optionally being acquired at a different time (e.g., from a street adjacent to the building or front yard of the building). In this example, multiple of the acquisition locations 210K-210P are external to but associated with the building 198, including acquisition locations 210L and 210M in one or more additional structures on the same property (e.g., an ADU 189, or accessory dwelling unit; a garage; a shed; etc.), acquisition location 210K on an external deck or patio 186, and acquisition locations 210N-210P at multiple yard locations on the property 241 (e.g., backyard 187, side yard 188, front yard including acquisition location 210P, etc.). The acquired images for each acquisition location may be further analyzed, including in some embodiments to render or otherwise place each panorama image in an equirectangular format, whether at the time of image acquisition or later, as well as further analyzed by the MIGM and/or BFPADUM systems in the manners described herein.

Various details are provided with respect to FIG. 1, but it will be appreciated that the provided details are non-exclusive examples included for illustrative purposes, and other embodiments may be performed in other manners without some or all such details.

FIGS. 2A-2J illustrate examples of automatically determining information about buildings' structural characteristics and other attributes from analysis of at least building floor plans and of subsequently using the determined building information in one or more automated manners, such as for the building 198 discussed in FIG. 1.

Figure 2A:
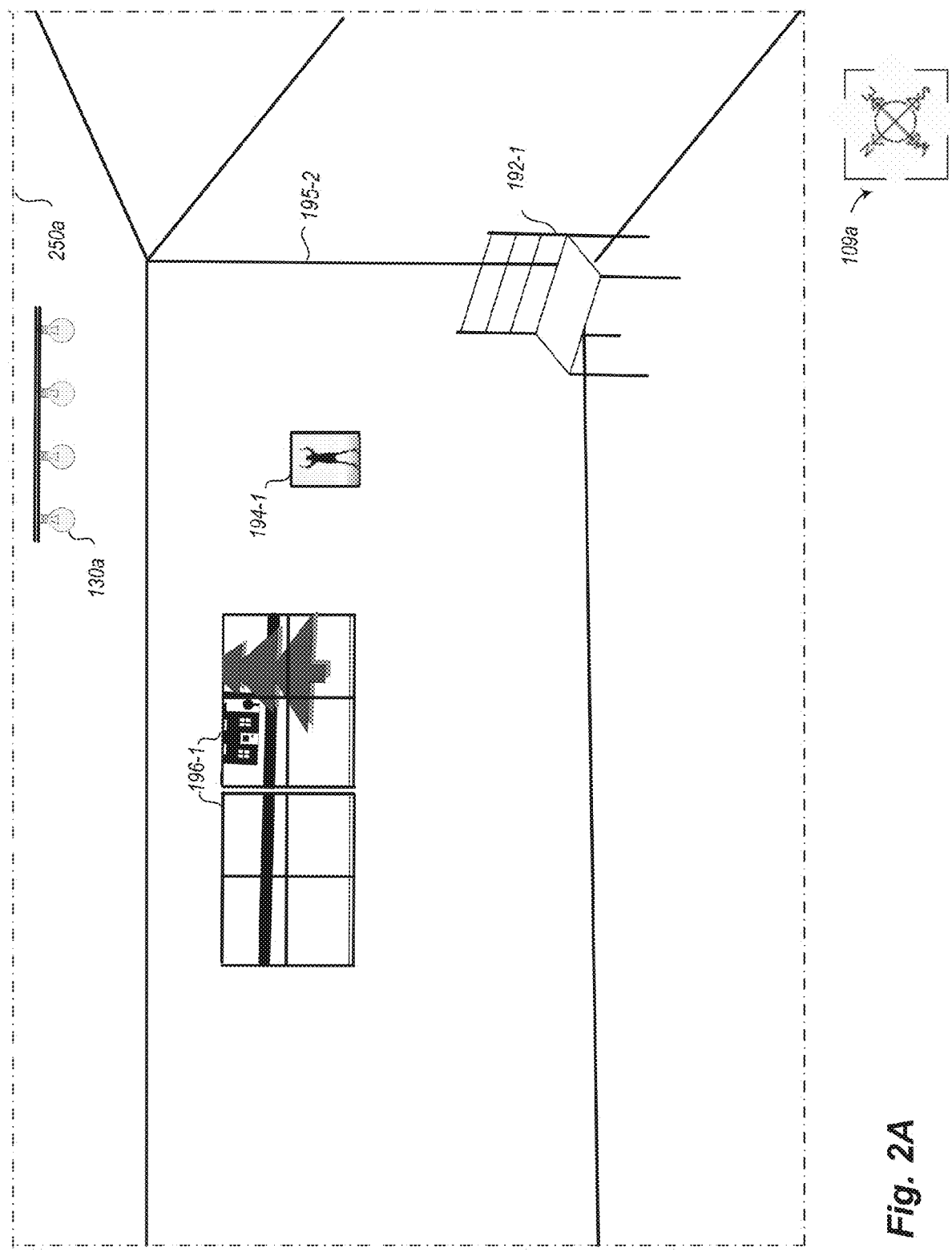
FIGS. 2A-2J illustrate examples of determining information about buildings' structural characteristics and other attributes from analysis of at least building floor plans and of subsequently using the determined building information in one or more automated manners.

In particular, FIG. 2A illustrates an example image 250a, such as a non-panorama perspective image taken in a northeasterly direction from acquisition location 210B in the living room of house 198 of FIG. 1 (or a northeasterly facing subset view of a 360° panorama image taken from that acquisition location and formatted in a rectilinear manner)—the directional indicator 109a is further displayed in this example to illustrate the northeasterly direction in which the image is taken. In the illustrated example, the displayed image includes built-in elements (e.g., light fixture 130a), furniture (e.g., chair 192-1), two windows 196-1, and a picture 194-1 hanging on the north wall of the living room. No inter-room passages into or out of the living room (e.g., doorways or other wall openings) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

Figure 2B:
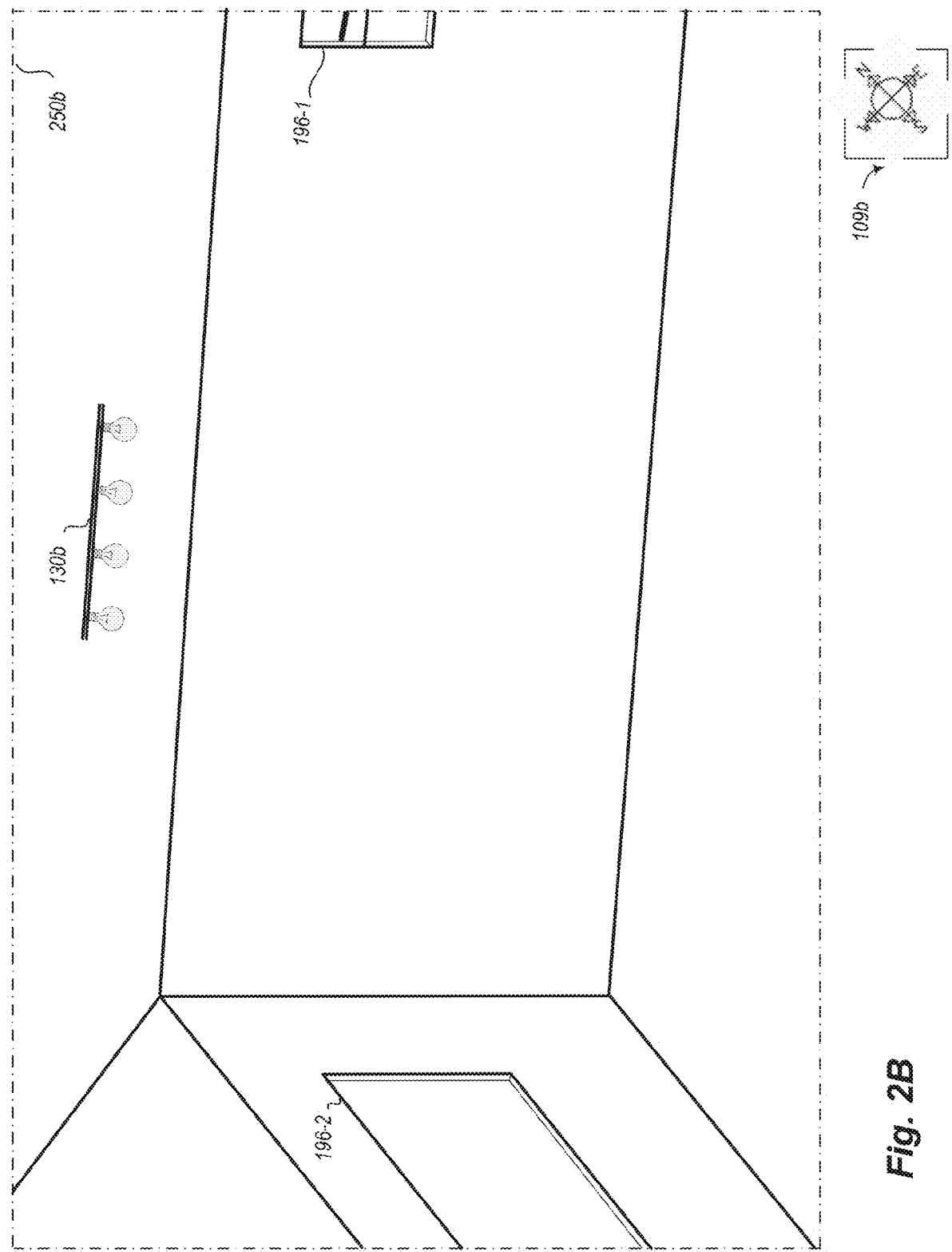

FIG. 2B continues the example of FIG. 2A, and illustrates an additional perspective image 250b taken in a northwesterly direction from acquisition location 210B in the living room of house 198 of FIG. 1 (or a northwesterly facing subset view of the same 360° panorama image taken from that acquisition location and formatted in a rectilinear manner)—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

Figure 2C:
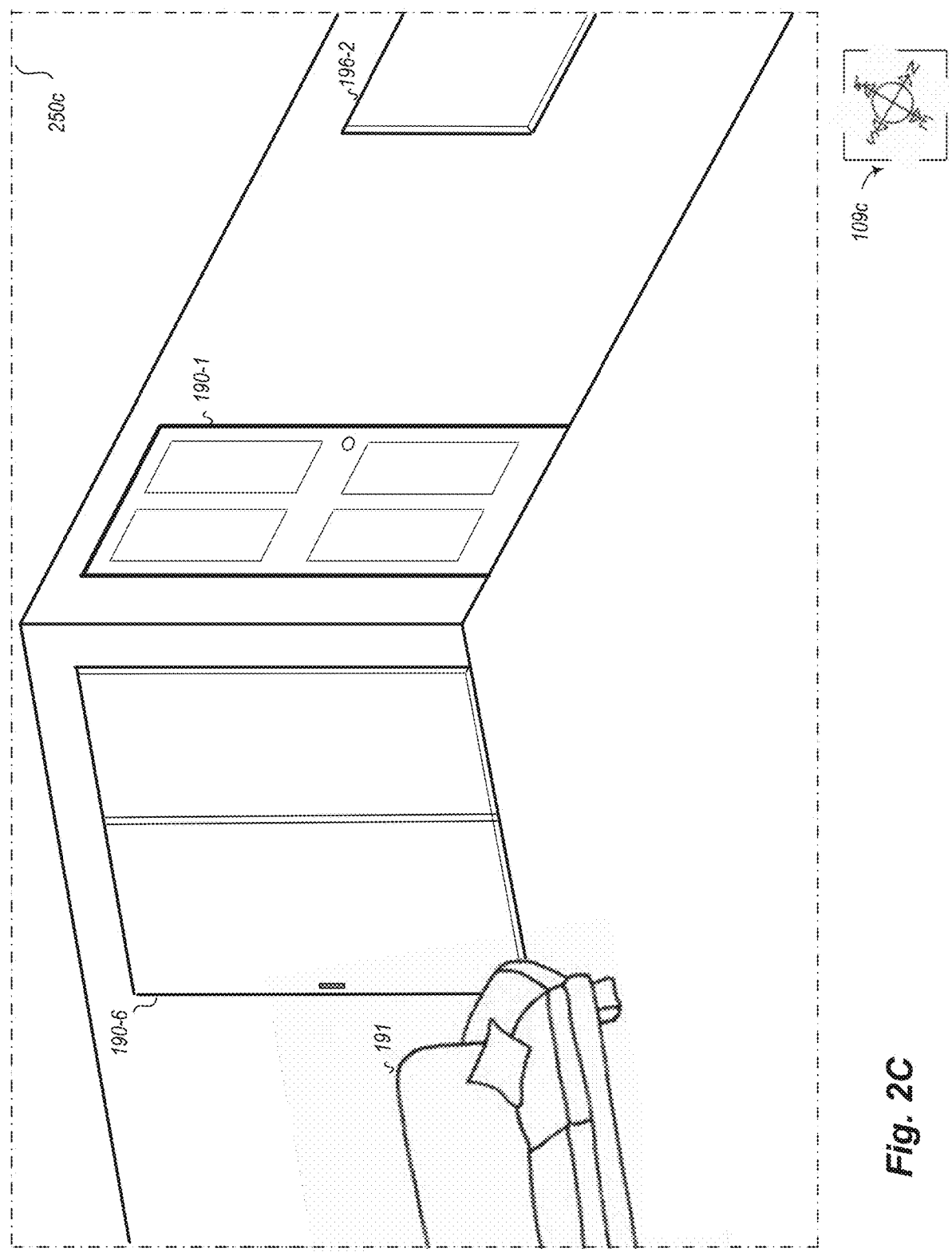

FIG. 2C continues the examples of FIGS. 2A-2B, and illustrates a third perspective image 250c taken in a southwesterly direction in the living room of house 198 of FIG. 1, such as from acquisition location 210B (or a southwesterly facing subset view of the same 360° panorama image taken from that acquisition location and formatted in a rectilinear manner)—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates two inter-room passages for the living room, which in this example include a doorway 190-1 with a swinging door to enter and leave the living room (which FIG. 1 identifies as a door to the exterior of the house, such as the front yard), and a doorway 190-6 with a sliding door to move between the living room and side yard 188—as is shown in the information in FIG. 1, an additional non-doorway wall opening 263a exists in the east wall of the living room to move between the living room and hallway, but is not visible in the images 250a-250c. It will be appreciated that a variety of other perspective images may be taken from acquisition location 210B and/or other acquisition locations and displayed in a similar manner.

Figure 2D:
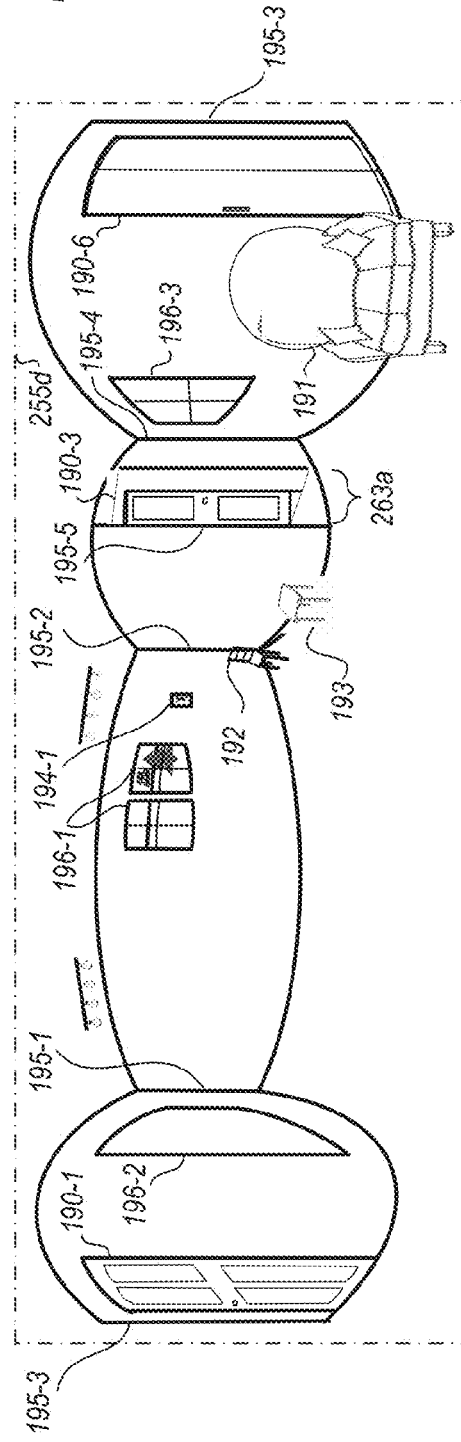
Figure 2D:
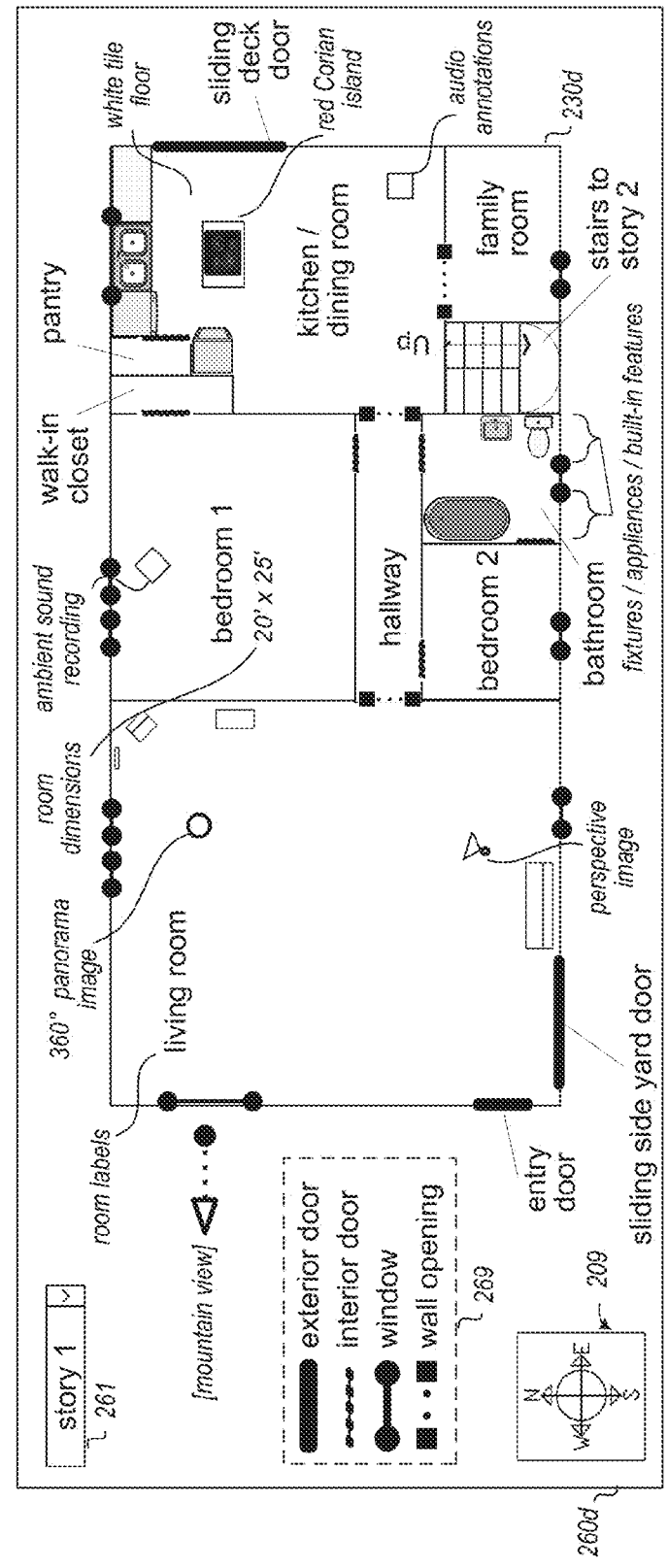

FIG. 2D continues the examples of FIGS. 2A-2C, and illustrates a 360° panorama image 255d (e.g., taken from acquisition location 210B), which displays the entire living room in an equirectangular format-since the panorama image does not have a direction in the same manner as the perspective images of FIGS. 2A-2C, the directional indicator 109 is not displayed in FIG. 2D, although a pose for the panorama image may include one or more associated directions (e.g., a starting and/or ending direction for the panorama image, such as if acquired via rotation). A portion of the visual data of panorama image 255d corresponds to the first perspective image 250a (shown in approximately the center portion of the image 250d), while the left portion of the image 255d and the far-right portion of the image 255d contain visual data corresponding to those of the perspective images 250b and 250c. This example panorama image 255d includes windows 196-1, 196-2 and 196-3, furniture 191-193, doorways 190-1 and 190-6, and non-doorway wall opening 263a to the hallway room (with the opening showing part of a door 190-3 visible in the adjacent hallway). Image 255d further illustrates a variety of room borders in a manner similar to that of the perspective images, but with horizontal borders displayed in an increasingly curved manner the farther they are from a horizontal midline of the image-visible borders include vertical inter-wall borders 195-1 through 195-4, vertical border 195-5 at the north/left side of the hallway opening, vertical borders at the right side of the hallway opening, and horizontal borders between the walls and floor and between the walls and ceiling.

Figure 2E:
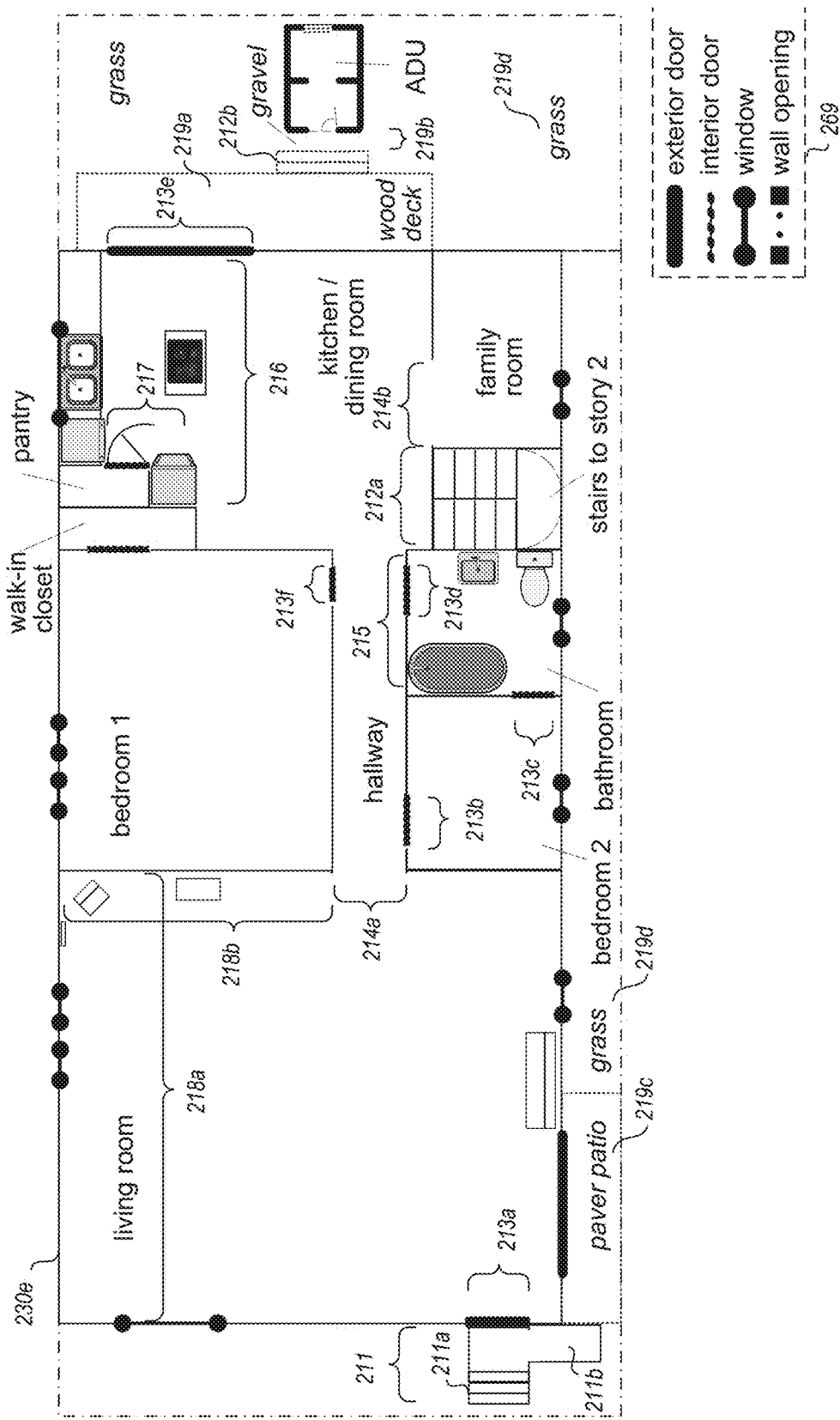
Figure 2F:
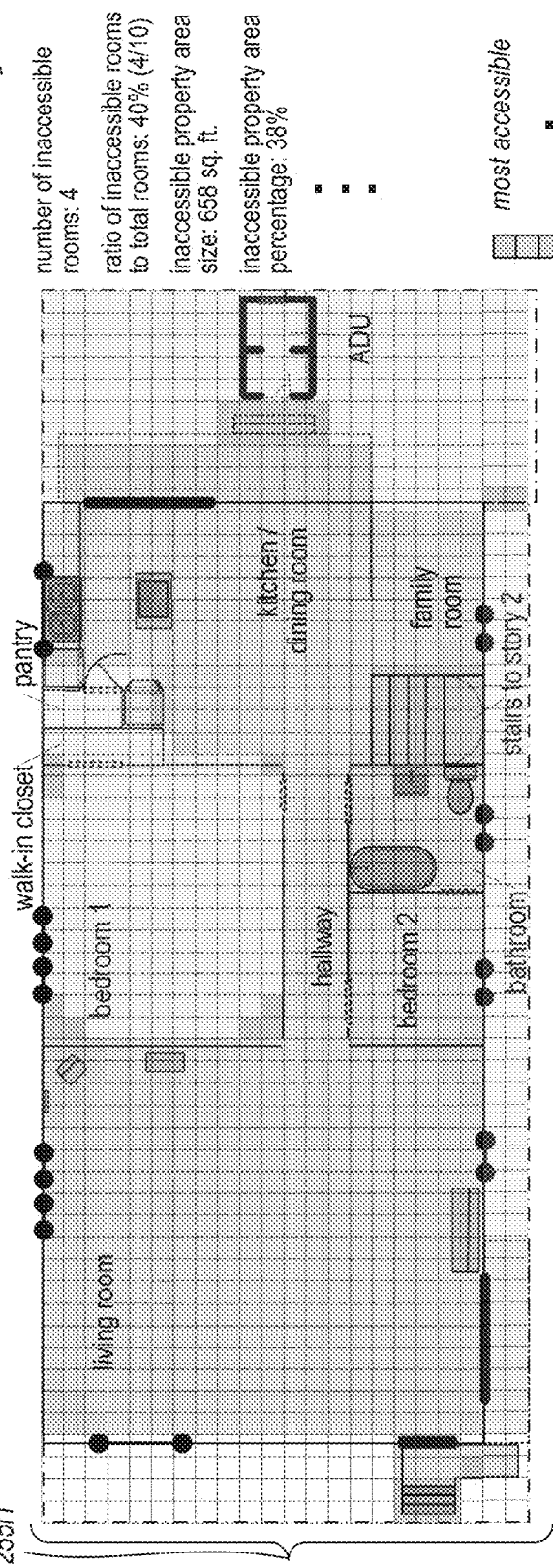
Figure 2F:
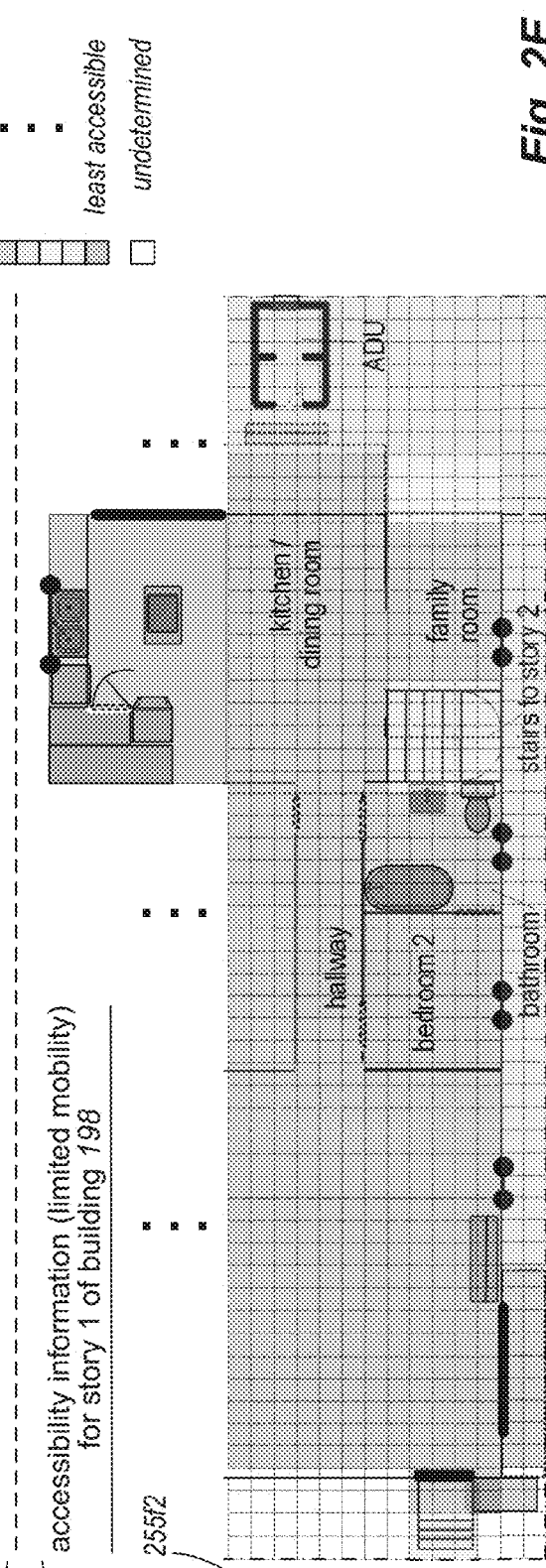
Figure 2G:
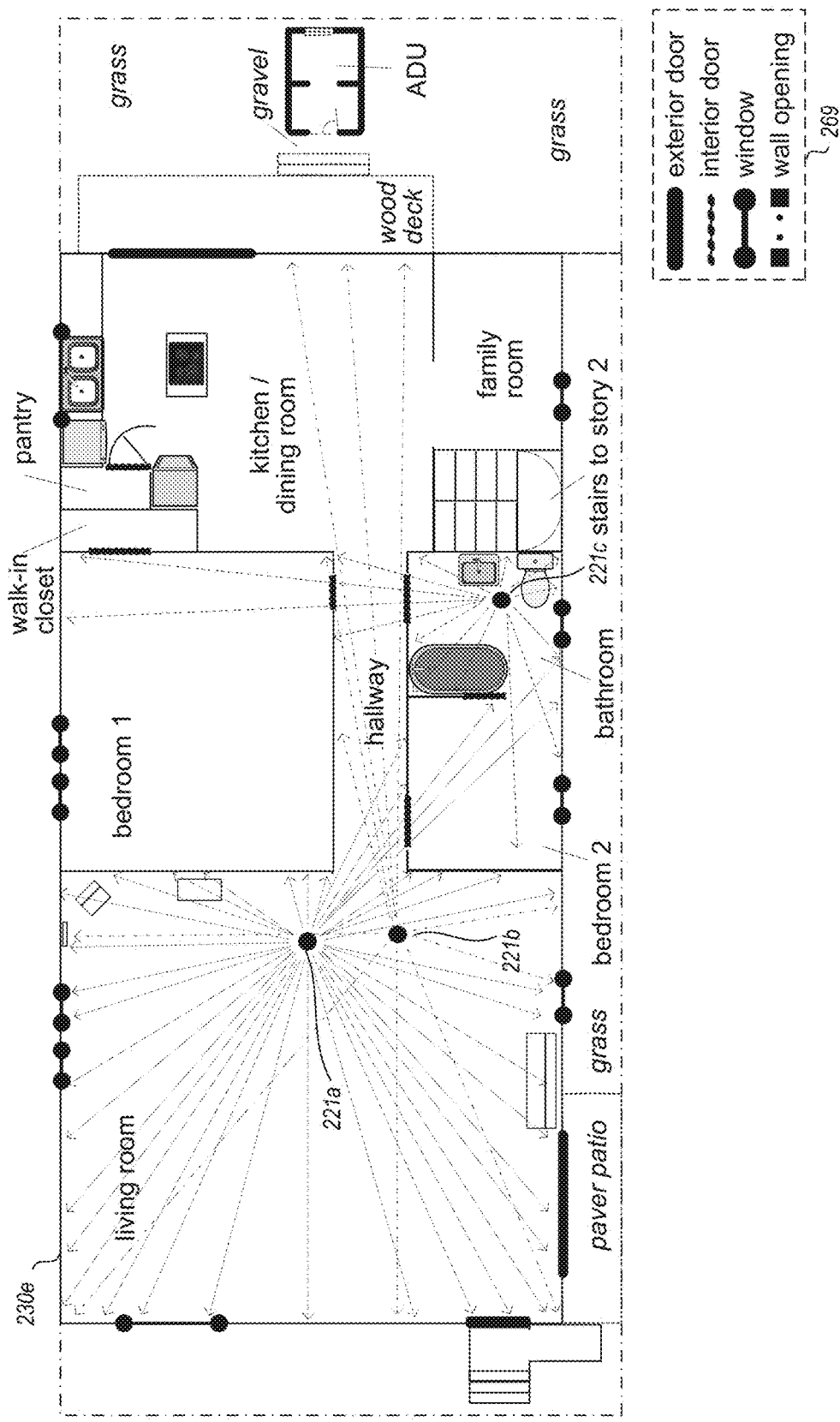
Figure 2H:
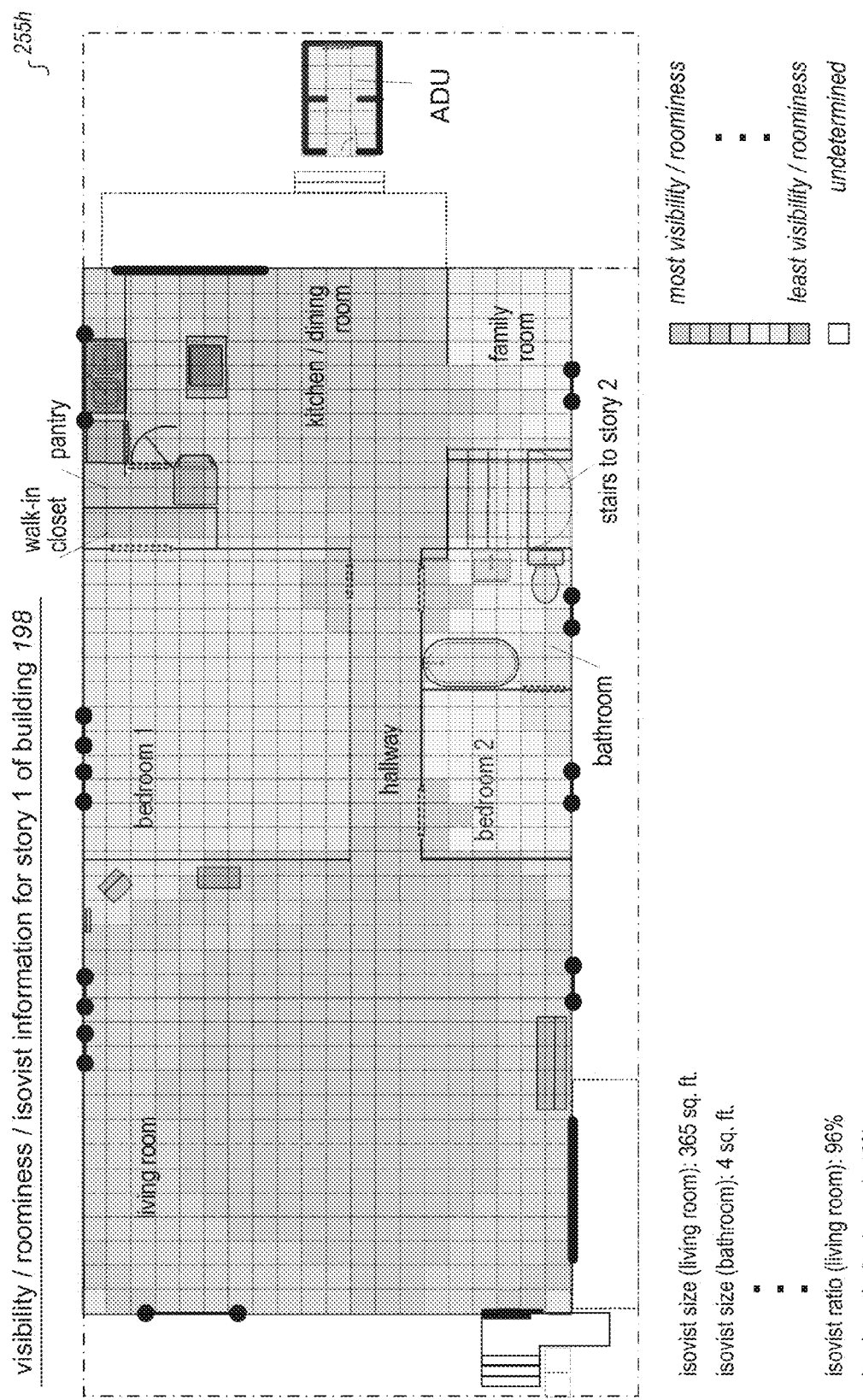
Figure 2I:
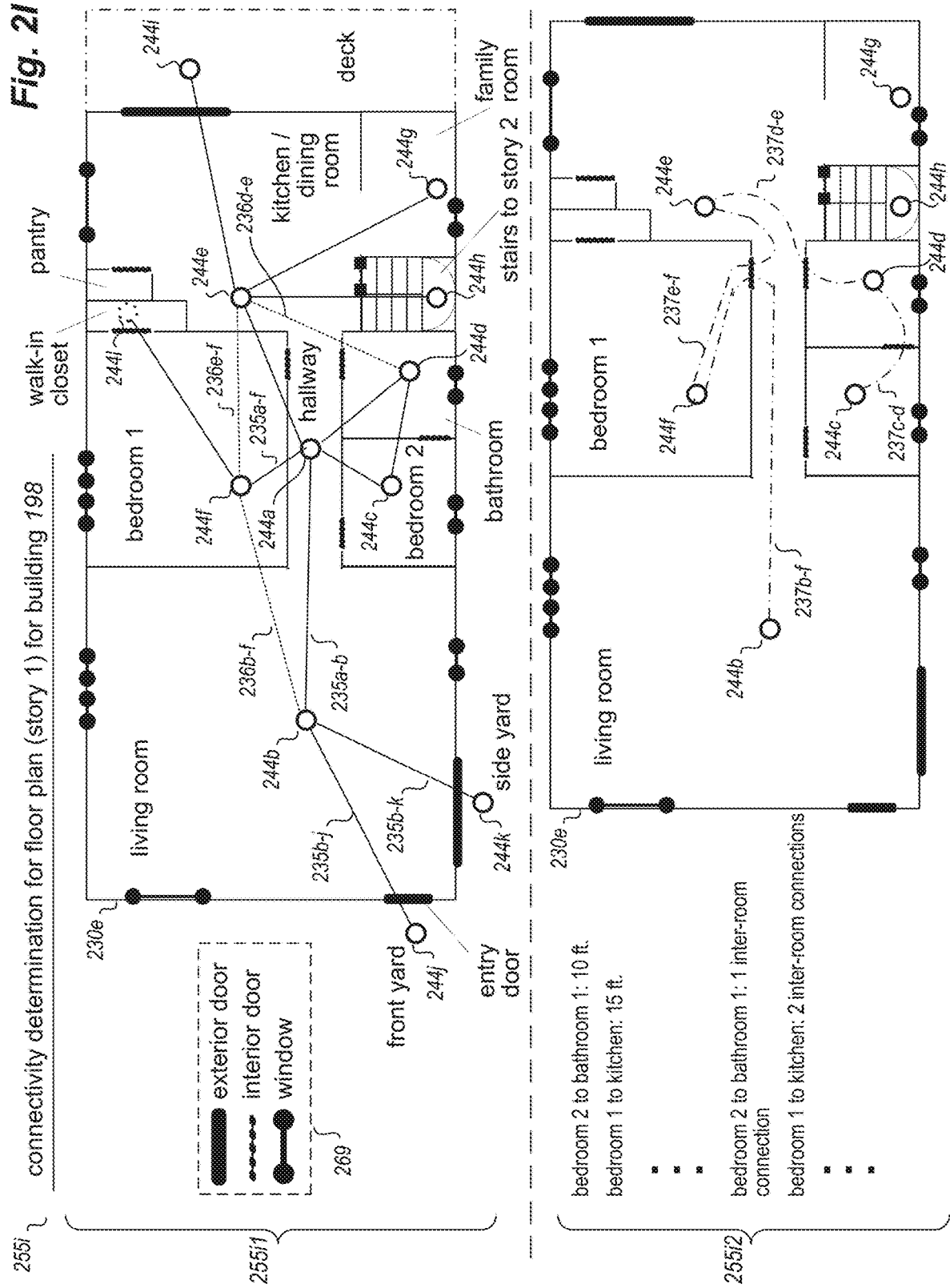
Figure 2J:
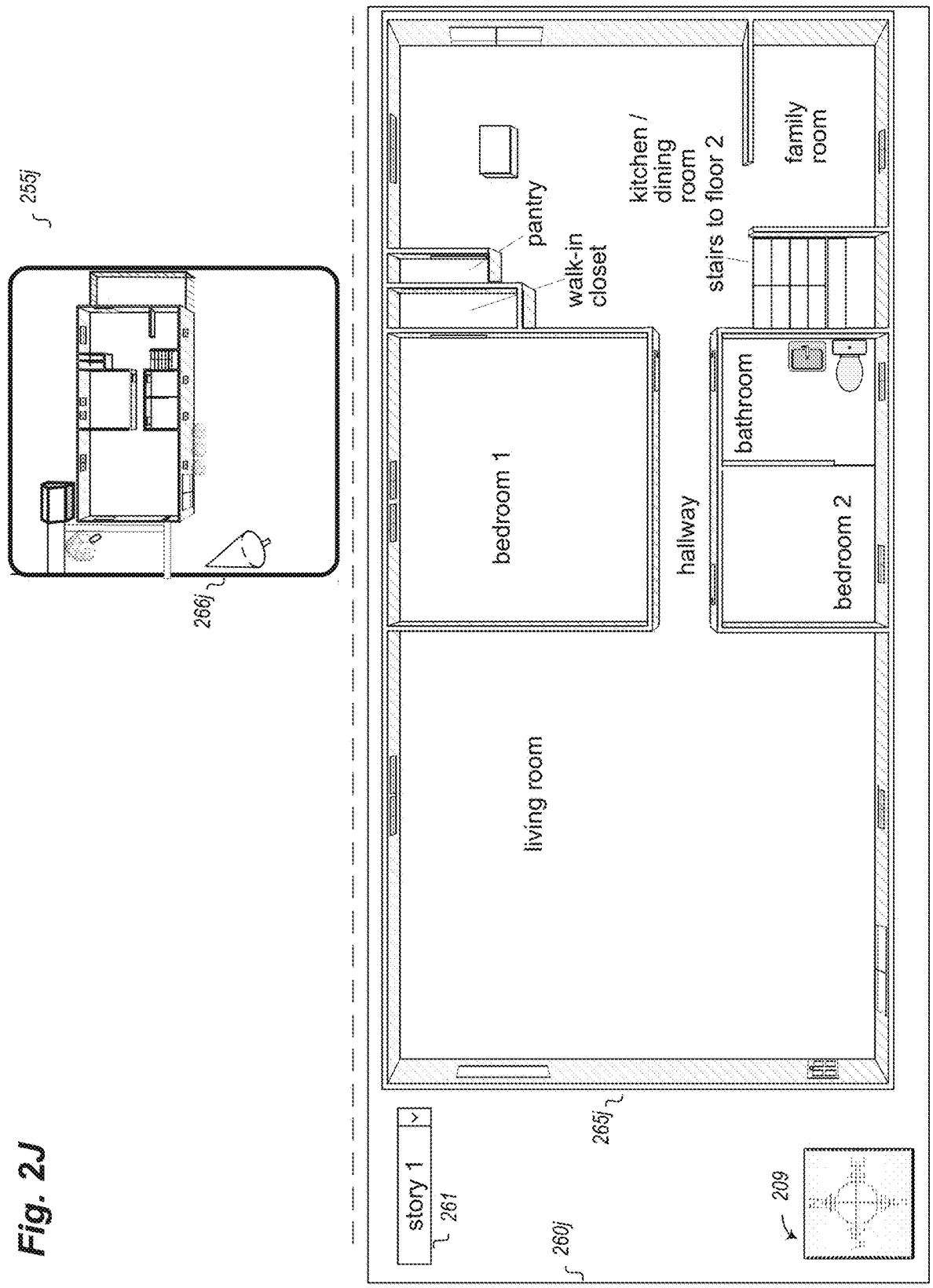

FIG. 2D further illustrates one example 260d of a 2D floor plan for the house 198, such as may be presented to an end-user in a GUI, with the living room being the most westward room of the house (as reflected by directional indicator 209)—it will be appreciated that a 3D or 2.5D floor plan with rendered wall height information may be similarly generated and displayed in some embodiments, whether in addition to or instead of such a 2D floor plan, with one example of such a 3D floor plan illustrated in FIG. 2J. Various types of information are illustrated on the 2D floor plan 260d in this example, such as one or more of the following: room labels added to some or all rooms (e.g., "living room" for the living room); room dimensions added for some or all rooms; visual indications of features such as installed fixtures or appliances (e.g., kitchen appliances, bathroom items, etc.) or other built-in elements (e.g., a kitchen island) added for some or all rooms; visual indications added for some or all rooms of positions of additional types of associated and linked information (e.g., of other panorama images and/or perspective images that an end-user may select for further display, of audio annotations and/or sound recordings that an end-user may select for further presentation, etc.); visual indications added for some or all rooms of structural features such as doors and windows; visual indications of visual appearance information (e.g., color and/or material type and/or texture for installed items such as floor coverings or wall coverings or surface coverings); visual indications of views from particular windows or other building locations and/or of other information external to the building (e.g., a type of an external space; items present in an external space; other associated buildings or structures, such as sheds, garages, pools, decks, patios, walkways, gardens, etc.); a key or legend 269 identifying visual indicators used for one or more types of information; etc. When displayed as part of a GUI, some or all such illustrated information may be user-selectable controls (or be associated with such controls) that allows an end-user to select and display some or all of the associated information (e.g., to select the 360° panorama image indicator for acquisition location 210B to view some or all of that panorama image (e.g., in a manner similar to that of FIGS. 2A-2D). In addition, in this example a user-selectable control 261 is added to indicate a current story that is displayed for the floor plan, and to allow the end-user to select a different story to be displayed—in some embodiments, a change in stories or other levels may also be made directly from the floor plan, such as via selection of a corresponding connecting passage in the illustrated floor plan (e.g., the stairs to story 2). It will be appreciated that a variety of other types of information may be added in some embodiments, that some of the illustrated types of information may not be provided in some embodiments, and that visual indications of and user selections of linked and associated information may be displayed and selected in other manners in other embodiments.

Additional details related to embodiments of a system providing at least some such functionality of an MIGM system or related system for generating floor plans and associated information and/or presenting floor plans and associated information are included in co-pending U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Provisional Patent Application No. 62/927,032, filed Oct. 28, 2019 and entitled "Generating Floor Maps For Buildings From Automated Analysis Of Video Of The Buildings' Interiors" (which includes disclosure of an example Video-To-Floor Map, or BFPADUM, system that is generally directed to automated operations for generating a floor map or other floor plan of a building using video data acquired in and around the building); in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); and in U.S. Non-Provisional patent application Ser. No. 17/013,323, filed Sep. 4, 2020 and entitled "Automated Analysis Of Image Contents To Determine The Acquisition Location Of The Image" (which includes disclosure of an example MIGM system that is generally directed to automated operations for generating a floor map or other floor plan of a building using images acquired in and around the building, and an example ILMM system for determining the acquisition location of an image on a floor plan based at least in part on an analysis of the image's contents); each of which is incorporated herein by reference in its entirety.

FIG. 2E continues the examples of FIGS. 2A-2D, and illustrates information 255e that includes a floor plan 230e for building 198, along with various information about structural aspects of the building floor plan that are analyzed as part of determining one or more accessibility attributes and corresponding accessibility values, such as to assess widths, heights, lengths, elevation gains or losses, and other physical characteristics that are used for the attribute determination. In the illustrated example, types of structural building information that are analyzed include one or more of the following: an entrance area 211 to gain access to the building (which in this example includes stairs 211a and a ramp 211b); stairways 212 (including stairway 212a to the second story, stairway 212b from the wood deck to the backyard area, and stairs 211a); doorway widths 213 (including entrance doorway 213a, doorway 213b from the hallway to bedroom 2, doorway 213c between bedroom 2 and the bathroom, doorway 213d between the bathroom and the hallway, sliding doorway 213e between the kitchen/dining room and exterior wood deck, doorway 213f between the hallway and bedroom 1, etc.); non-doorway wall openings 214 (including opening 214a between the living room and hallway, opening 214b between the kitchen/dining room and family room, etc.); heights and widths and surrounding areas for various appliances and fixtures 215 and 216 (including bathroom items such as the toilet, tub or shower, sink, cupboards and light switches, not shown, etc., and kitchen items such as the island, countertop, oven, stove, refrigerator, dishwasher, sink, cupboards and light switches, not shown, etc.); movement locations and surrounding areas 217 of movable elements (such as where doors swing or slide when opened, where drawers move when opened, etc.); widths and lengths of various structural elements 218 (including walls, such as a width of living room north wall 218a and a width of living room east wall 218b for evaluating accessibility in the northeast corner of the living room, etc.); exterior surfaces 219 over which movement may occur (e.g., wood deck 219a, an area 219b between the deck stairway exit and the entrance to the ADU, a paver patio 219c, other areas 219d of the yard that in this example are illustrated to be grass, etc.); etc.—it will be appreciated that various other structural elements within the building may also be measured or otherwise assessed, including additional elements of the illustrated types that are not explicitly indicated, for other areas of the building (e.g., a second story), etc. As discussed in greater detail elsewhere herein, the various measured data for building structural aspects may be combined to determine accessibility values for one or more accessibility attributes at each of one or more positions in the building, including in some embodiments for each position in a grid that spans some or all of the building and/or of the surrounding property (e.g., as illustrated in FIG. 2F).

FIG. 2F continues the examples of FIGS. 2A-2E, and illustrates non-exclusive examples of types of accessibility attributes and corresponding values that may be determined and displayed based at least in part on the types of building structural information illustrated in FIG. 2E, such as to one or more users in a displayed GUI (not shown). In particular, FIG. 2F includes information 255f that includes visualizations 255f1 of accessibility attributes associated with wheelchair users, including using a grid of positions throughout the building floor plan and surrounding property that is overlaid on a visual representation of the floor plan and property with a heat map displayed on the grid to reflect degrees of accessibility for such a wheelchair user. In this example, the visual attributes for each cell of the grid includes one of 7 enumerated accessibility values ranging from least accessible to most accessible, as well as an additional $8^{th}$ value for areas of the building and/or property for which corresponding accessibility values were not determined. In this example, while the stairways are not accessible to a wheelchair user, a wheelchair user is able to gain entrance to the building via the front ramp, with the living room, hallway, bedroom 2, kitchen/dining room and family room all generally having accessibility values of the second highest accessibility values (other than for corners and other limited areas where the accessibility is lower). In contrast, bedroom 1 has a low accessibility score due to the doorway between the hallway and bedroom 1 being narrow and difficult or impossible to maneuver through in a wheelchair. Similarly, the bathroom has an intermediate accessibility score due to having only small areas for a wheelchair to maneuver around the fixtures and other objects, as well as the lack of grab bars or other accessibility aids installed in the room. Areas in the pantry and its swinging door in the kitchen/dining room are also rated lower in accessibility, such as due to there being limited room for a wheelchair user to maneuver with the door open between the door and the island and the countertop, and with areas near the corners of the rooms being less accessible due to the nearness of multiple walls. On the property outside of the building, the wood deck and paved patio areas are relatively accessible due to sliding doors providing easy access and the exterior surfaces being hard and easily traversable as well as substantially flat with the room level, but the rest of the side yard is relatively inaccessible due to the grass surface and the narrow width, and the backyard is very inaccessible due to there being a lack of easy access to it from either the deck down to the grass (due to the stairway) or from the side yard (due to the grass surface and a gate between the side yard and backyard with a high latching mechanism, not shown). While the interior of the ADU would otherwise be accessible if a wheelchair user was located there, it similarly has a low accessibility score due to being difficult to reach for the same reasons as the back yard, as well as the gravel between the ADU and the deck stairs. In addition to the illustrated heat map, additional accessibility attributes are shown in textual/numeric form, including a quantity of inaccessible rooms, a ratio of the inaccessible rooms to the total rooms, a size in square feet of the inaccessible areas of the property, a percentage of the property that includes inaccessible areas, etc. in this example FIG. 2F further illustrates additional accessibility data 255f2 for additional accessibility attributes that correspond to users who can walk but have limited mobility, with a portion of the building floor plan and property illustrated with a separate heat map corresponding to accessibility values determined for a corresponding accessibility attribute. In this example, most of the floor plan is more accessible for such users than for wheelchair users due to greater maneuverability of such walking users, as well as the back yard and side yard being somewhat accessible.

It will be appreciated that the examples of accessibility data of FIG. 2F may differ in various manners in other embodiments, including to display information for other types of accessibility attributes (whether in addition to or instead of some or all of the illustrated types of accessibility data), to display accessibility data in other manners (e.g., to display accessibility values in a manner other than a heat map or textual/numeric format), to provide accessibility information in response to the user interactions (e.g., for the user to select one or more rooms or other areas and/or to select one or more types of accessibility attributes for which to display accessibility values), etc.

As one non-exclusive example of techniques for determining accessibility attributes' values, the convenience of a house with respect to accessibility may be determined, such as to assess aspects including the house structure and objects that are difficult and/or costly to change/modify-such accessibility determinations may be used in various manners, such as by house owners to improve their house, by buyers to evaluate its convenience (e.g., senior people), by agents for house ads and evaluations, etc. Non-exclusive examples of aspects to assess include the following: inaccessible structures that are too narrow for accessing, such as quantities of inaccessible doorways, corresponding rooms (e.g., closet, bathroom, etc.) of one or more types since the impact may be assessed as being different for rooms of different functions, ratios of accessible door quantities and inaccessible door quantities, measurements such as min and/or max and/or average doorway widths, etc.; inaccessible non-doorway wall openings (e.g., non-doorway boundaries across different rooms, such as the quantity of inaccessible openings, ratios of accessible opening quantities and inaccessible opening quantities, measurements such as min and/or max and/or average opening widths, etc.); hallways (often the most used region in a house while being the most narrow region), such as to measure width and/or length and/or quantities of corners/turns and/or quantities of doorways off the hallway, etc.; particular rooms with important functionality and their objects, such as the location of a tub/shower and/or sinks(s)/vanity (ies) and/or toilet in a bathroom, the location of sink(s) and/or an island and/or countertops and/or appliances in a kitchen, etc.; existence of stairways between stories and/or levels and their features/characteristics, such as whether the house is a split-level and/or has multiple stories, whether stairways have handrails, stairway measurements (e.g., height and/or width and/or slope), etc.; existence of stairways to enter the house; existence of an elevator between stories and/or levels and its features/characteristics (e.g., dimensions); height of various objects, such as windows, door handles, closet shells, countertops, sinks, cooking range, bathtub, switches, dishwashing machine, etc.; connectivity between rooms of the house (e.g., as evaluated via one or more connectivity attributes); etc. Non-exclusive examples of assessments of such aspects include the following: given a position in a room, distances between the position to the rooms' door(s) and/or corner(s) and/or wall(s) and/or stairs and/or any immovable objects (e.g., an air conditioner), such as to lower a position's accessibility value as one or more such distances decrease (e.g., with different rooms having different sensitivities for how much weight to give some or all such factors, such as to increase the impact of small distances with respect to inaccessibility in bathrooms due to their functional importance and high frequency of use and immovable fixtures, and to similarly have increased impact for kitchens and/or other multi-function rooms), and to combine multiple such distances if available (e.g., in a weighted manner to give importance to particular factors); with respect to object heights, differences from one or more defined target heights (e.g., one or more 'convenient' heights, such as with respect to an associated indicated type of user), such as to lower an object's position(s)' accessibility value as such differences increase (e.g., with different objects having different sensitivities for how much weight to give to such differences, such as to increase the impact of such differences with respect to inaccessibility for particular objects due to their functional importance and/or high frequency of use and/or location in kitchens or bathrooms); etc.—in at least some embodiments, to determine an accessibility value of a room or other area or an entire house, accessibility values for each of some or all positions in the room/other area/house are assessed using a combination of the factors and aspects discussed above, and the assessed accessibility values for those some/all positions are combined to determine the aggregated accessibility value for the room/other area/house (e.g., using an average, accumulation, etc.). It will be appreciated that other factors and aspects and determination techniques may be used in other embodiments.

As another non-exclusive example of techniques for determining accessibility attributes' values, such accessibility attributes may include one or more of the following: quantity of inaccessible rooms or other areas or regions (e.g., used as a general indicator for accessibility); ratio of inaccessible rooms/other areas/regions to the total quantity of rooms/other areas/regions (e.g., to normalize for buildings of different sizes); sizes of inaccessible rooms/other areas/ regions (e.g., in square feet, cubic feet, etc.); ratio of inaccessible rooms/other areas/regions' sizes to overall sizes of a floor plan or a same type of room/other area/region (e.g., for bedrooms, living rooms, bathrooms, etc.); etc. Determination of assessed values for such accessibility attributes for a position may include, for example, the following: first assess if there are doorways within a defined distance; if there are no doorways, measure distances of walls to that position, and decrease the accessibility value is distances on opposing sides are less than a defined distance (e.g., for a narrow hallway); if there are doorways, consider both wall distances and doorway widths; decrease accessibility values if there are stairs or other steps to reach the position (e.g., for a position in a sunken living room), such as based on the height and quantity of the steps; etc. It will be appreciated that other factors and aspects and determination techniques may be used in other embodiments.

FIG. 2G continues the examples of FIGS. 2A-2F, and illustrates information 255g that includes the floor plan 230e for the building, along with various information about structural aspects of the building floor plan that are analyzed as part of determining one or more isovist attributes and corresponding isovist values. In this example, the determining of the isovist values includes determining lines of sight in at least two dimensions for each of at least some positions, for use in performing a a determination of an amount of square feet and/or volume of space that is visible from that position—as will be appreciated, if only a two-dimensional floor plan is available without any information about heights of rooms and other areas, the isovist values may be determined to indicate an amount of square feet, while if a three-dimensional floor plan or other building model is available (e.g., as illustrated with respect to FIG. 2J) or other information about heights of rooms and other areas is available (e.g., from analysis of visual data of building images), the isovist values may be determined with respect to square feet and/or volume of space. In other embodiments and situations, other measures of visibility and/or roominess may be used, whether in addition to or instead of the illustrated example using square feet and/or volumes of space that are visible from that position.

In the illustrated example of FIG. 2G, with respect to the position 221a on the eastern side of the living room, the illustrated lines of sight include substantially all of the living room, portions of the hallway, and additional portions of bedroom 2 and the bathroom that are visible through the doorway between the hallway and bedroom 2 and the doorway between bedroom 2 and the bathroom if they are open. In contrast, the lines of sight that are shown from nearby position 221b in the living room include little-to-no visibility into the rooms along the hallway, while again including substantially all of the living room, and further including all of the hallway and portions of the kitchen/dining room through non-doorway wall openings at the east and west ends of the hallway. Accordingly, the isovist values for both of the positions 221a and 221b will be relatively high, given the large amount of square feet and/or volume of the living room as well as the additional areas visible. In contrast, position 221c in the bathroom may have a relatively smaller isovist value, due to the relatively small square footage and/or volume of the bathroom itself, and only limited visibility into other areas such as bedroom 2, bedroom 1 and the hallway via the doorways between the bathroom and either bedroom 2 or the hallway. It will be appreciated that similar isovist values may be analyzed for various positions throughout the building, and that in some embodiments the visibility through windows into external areas may further be included as part of the isovist determination for a given position, and isovist values may similarly be determined for positions on the property external to the building.

FIG. 2H continues the examples of FIGS. 2A-2G, and illustrates non-exclusive examples of types of isovist attributes and corresponding values that may be determined and displayed based at least in part on the types of building structural information illustrated in FIG. 2G, such as to one or more users in a displayed GUI (not shown). In particular, FIG. 2H includes information 255h about visualizations of an isovist attribute using a grid of positions overlaid on a visual representation of the building floor plan, and with a heat map overlaid on the building floor plan visual representation to reflect degrees of isovist-based visibility/roominess from the positions of the grid. In this example, the visual attributes for each cell of the grid includes one of 7 enumerated isovist values from least visibility/roominess to most visibility/roominess, as well as an additional $8^{th}$ value for areas of the building and/or property for which isovist values were not determined. Positions 221a and 221b in the living room illustrated in FIG. 2G are among a variety of positions in the living room and kitchen/dining room that have the most visibility/roominess, while position 221c illustrated in FIG. 2G and other areas of the bathroom and bedroom 2 have lower than average isovist values, with small areas with limited lines of sight such as the pantry and locking closet having the least visibility/roominess. In addition to the illustrated heat map, additional isovist attributes are shown in textual/numeric form, including a size in square feet of areas of the living room and bathroom that have isovist values above a defined threshold (e.g., the top 2 or top 3 of the enumerated isovist values), a percentage of those rooms that have isovist values above a defined threshold, etc.—it will be appreciated that similar information may be determined and displayed for other groups of one or more rooms or other areas.

It will be further appreciated that the examples of isovist data of FIG. 2H may differ in various manners in other embodiments, including to display information for other types of isovist attributes (whether in addition to or instead of some or all of the illustrated types of isovist data), to display isovist data in other manners (e.g., to display isovist data values in a manner other than a heat map), to provide isovist information in response to the user interactions (e.g., for the user to select one or more rooms or other areas and/or to select one or more types of isovist attributes for which to display isovist data), etc.

As one non-exclusive example of techniques for determining and using isovist attributes' values, isovist values may be used to provide information to users about a house's privacy or openness, such as with a house having high isovist values indicating that the house has larger visual overlapped regions that connote roominess, and with a house having low isovist values indicating that the house has more enclosed/private regions-even if two houses have the same total sizes, their total isovist sizes and distribution across different rooms/regions could be significantly different. In addition, different types of isovist values may be expected and/or preferred for different room types, such as to expect/prefer larger isovist sizes/ratios in the living room (e.g., if used for social activities) and smaller isovist sizes/ratios in the bedroom (e.g., to provide privacy). Accordingly, isovist values may be determined for specific room types (e.g., bedroom and dining room), and for both isovist size and isovist ratio. Accordingly, non-exclusive isovist attributes may include the following: isovist sizes for different room types (e.g., bedroom, storage, playroom, kitchen, hallway, balcony, pool, closet, stairway, dining room, garage, etc.); isovist ratio (isovist size/room size) of different room types; isovist ratio distributions; etc. As one non-exclusive example of determining isovist values, an isovist value may be determined for each floor, such as by considering walls as opaque (no visibility) while windows and doorways and non-doorway wall openings as transparent, setting each room's position in its center, and then checking the visibility area on the overall floor plan for at least each room center. It will be appreciated that other factors and aspects and determination techniques may be used in other embodiments.

FIG. 2I continues the examples of FIGS. 2A-2H, and illustrates information 255i that includes the floor plan 230e for the building, along with various information about structural aspects of the building floor plan that are analyzed as part of determining one or more connectivity attributes and corresponding connectivity values, such as shown in information 25511. In this example, the determining of the connectivity values includes generating an adjacency graph that shows information about both direct connections 235 between adjacent rooms with a doorway or other non-doorway wall opening (e.g., direct inter-room connection 235a-b between position 244b near the center of the living room and position 244a near the center of the hallway) and non-directly-connected room adjacencies 236 between adjacent rooms that lack a doorway or other non-doorway wall opening between them (e.g., room adjacency 236b-f between position 244b in the living room and position 244f in bedroom 1, with actual non-direct inter-room connectivity between those positions including intermediate passage through the hallway). In the illustrated example, connections 235 are further displayed between rooms of the building and exterior areas via doorways or other openings, such as connection 235b-j between position 244b in the living room and position 244j outside the front entry door, although such external connections may not be used in some embodiments and situations—in addition, in other embodiments and situations, connectivity may further be determined between other areas, such as between two or more external areas, between locations in the building 198 and one or more outbuildings (e.g., the ADU in the backyard), etc. In addition, in other embodiments and situations, other measures of connectivity may be used, whether in addition to or instead of the illustrated examples using room positioning with respect to direct connections and/or other adjacency.

Information 25512 of FIG. 2I further illustrates non-exclusive examples of types of connectivity attributes and corresponding values that may be determined and displayed based at least in part on the types of building structural information illustrated in FIG. 2I, such as to one or more users in a displayed GUI (not shown). In particular, in this example some of the connectivity attributes with associated connectivity values are shown in textual/numeric form, including distances and/or the number of inter-room connections between two or more positions, with illustrated paths 237 shown to correspond to some of the position pairs (e.g., path 237c-d between bedroom 2 and the bathroom)—it will be appreciated that similar information may be determined and displayed for other groups of two or more positions (including groups of 2 or more rooms, other indications of paths, etc.). In addition, in other embodiments connectivity information may be displayed in other manners, such as to overlay a visual representation of some or all of an adjacency graph that shows direct inter-room connections and/or non-directly-connected room adjacencies (e.g., with a direct line between two locations, such as through one or more walls or other structural barriers, and optionally with an associated value to show the direct line distance), and/or to overlay a heat map in which connectivity values are shown for each of some or all positions on a grid throughout the building (e.g., with respect to connectivity to a determined destination from that position, with respect to relative connectivity from that position to multiple other locations of interest in the building, etc.).

It will be appreciated that the examples of connectivity data of FIG. 2I may differ in various manners in other embodiments, including to display information for other types of connectivity attributes (whether in addition to or instead of some or all of the illustrated types of connectivity data), to display connectivity data in other manners (e.g., to display connectivity data values in a manner other than lines overlaid on a floor plan), to provide connectivity information in response to the user interactions (e.g., for the user to select one or more rooms or other areas and/or to select one or more types of connectivity attributes for which to display connectivity data, or to otherwise select two or more locations and provide information about inter-connectivity of those locations), etc.

As one non-exclusive example of techniques for determining and using connectivity attributes' values, connectivity values may provide an effective convenience indicator when walking across different rooms, especially the connectivities across particular types of rooms (e.g., between bedroom and bathroom, between kitchen and dining room, etc.). Connectivity attributes may include or be based at least in part on various metrics, with non-exclusive examples of such metrics including the following: walking/skeleton distance, to reflect the walk length to move from one specific room (e.g., bedroom) or position to another target room (e.g., bathroom) or position; direct or air-line distance, to reflect the direct distance between two rooms or other positions if there were no structural impediments between them; hop number, to reflect a quantity of rooms crossed when moving from one room (e.g., bedroom) or other position to another target room (e.g., bathroom) or position, not counting the starting room (e.g., if people can walk directly from bedroom to bathroom without crossing one or more other rooms, the hop number is 1, and if one hallway or living room is crossed, the hop number is two); inter-room connection, to reflect a quantity of doorways or non-doorway wall openings through which a person passes when moving from one room (e.g., bedroom) or other position to another target room (e.g., bathroom) or position; etc. Non-exclusive examples of particular connectivity attributes that may be determined and used include the following: bedroom to bathroom; bedroom to living room; living room to bathroom; living room to kitchen; dining room to kitchen; living room to stairs; etc. In addition, multiple such metrics may be aggregated to determine overall connectivity attributes for particular rooms or other areas or particular positions, with non-exclusive examples of such aggregated connectivity attributes including the following: overall bedroom connectivity score; overall living room connectivity score; overall bedroom connectivity score; overall dining room connectivity score; overall entire home connectivity score; etc. As one non-exclusive example of determining connectivity attributes' values, an adjacency graph is determined by, given a floor plan, parsing the floor plan structure and denoting which rooms are connected and how (e.g., by doorways, non-doorway wall openings, windows, etc.). The adjacency graph is then used to determine other information, with non-exclusive examples including the following: determining the hop number and/or inter-room connection value for each room to one or some or all other rooms; determining the walking distances between some or all rooms (e.g., rooms with direct connections) by selecting the center point of the two rooms and calculating the distances between these two points, including determining a path to use in at least some embodiments and situations (e.g., to use a center path of a hallway), and optionally combining direct room connection information in some situations (e.g., determining the walking distance from bedroom 2 to the kitchen/dining room in building 198 by combining the walking distance from bedroom 2 to the hallway and the walking distance from the hallway to the kitchen/dining room) and using the shortest path if multiple are available; etc., It will be appreciated that other factors and aspects and determination techniques may be used in other embodiments.

As part of determining values for one or more accessibility attributes and/or one or more isovist attributes and/or one or more connectivity attributes, information about various other building attributes may be considered and used, with non-exclusive examples of such other building attributes including the following: floor quantity; windows quantity; doors quantity; windows widths and heights; doorway widths and heights; room quantities of different room types (e.g., bedroom, storage, playroom, kitchen, hallway, balcony, pool, closet, stairway, dining room, garage, etc.) and/or locations (e.g., rooms on first story, rooms on other stories, etc.) and/or particular types (e.g., first floor primary bedroom); average room size, such as for all rooms or rooms of a specific type or at a specific location; room size ratio, such as for all rooms or rooms of a specific type or at a specific location, and as compared with the overall size of the building or group of rooms (e.g., rooms of a particular story); toilet to bedroom ratio; windows sizes; sunlight score (e.g., an amount or level of sunlight reaching a given room, such as based on the size of windows, home direction, etc.); presence of the 'kitchen triangle' (e.g., the sink, oven/stove, and refrigerator being within a defined distance of one another and not obstructed by other objects); etc.

FIG. 2J continues the examples of FIGS. 2A-2I, and illustrates alternative floor plan and property representations that may be used in some embodiments as part of the determining of values for accessibility attributes and/or isovist attributes and/or connectivity attributes, such as to be analyzed to determine values for such attributes as discussed in greater detail elsewhere herein. In particular, FIG. 2J illustrates information 255*j* that includes a 3D floor plan model 265*j* of the building 1 (showing only the first story in this example), such as may be displayed in a GUI 260*j* similar to that of FIG. 2D—while not illustrated in FIG. 2J, some or all of the additional types of information shown in FIGS. 2D and/or 2F and/or 2H and/or 2I for a 2D floor plan may be similarly shown in a 3D floor plan model such as is shown in FIG. 2J. While also not illustrated in FIG. 2J, additional information may be added to the displayed walls in some embodiments, such as from images taken during the video capture (e.g., to 'texture map' walls by rendering and illustrating actual paint, wallpaper or other surfaces from the house on the rendered model 265), and/or may otherwise be used to add specified colors, textures or other visual information to walls and/or other surfaces. FIG. 2J further illustrates an additional visual representation 266*j* that shows an alternative 3D floor plan model of the building 198 as well as some or all of the surrounding property 241, such as to provide a 'site plan' view that shows external pathways and surfaces, vegetation, etc. It will be appreciated that other types of floor plan information may be presented and/or analyzed in other embodiments and situations.

Various details have been provided with respect to FIGS. 2A-2J, but it will be appreciated that the provided details are non-exclusive examples included for illustrative purposes, and other embodiments may be performed in other manners without some or all such details.

As noted above, in some embodiments, the described techniques include using machine learning to learn the attributes and/or other characteristics of adjacency graphs to encode in corresponding vector embeddings that are generated, such as the attributes and/or other characteristics that best enable subsequent automated identification of building floor plans having attributes satisfying target criteria, and with the vector embeddings that are used in at least some embodiments to identify target building floor plans being encoded based on such learned attributes or other characteristics. In particular, in at least some such embodiments, graph representation learning is used to search for a mapping function that can map the nodes in a graph to d-dimensional vectors, such that in the learned space similar nodes in the graph have similar embeddings. Unlike traditional methods such as graph kernel methods (see, for example, "Graph Kernels" by S. V. N. Vishwanathan et al., Journal of Machine Learning Research, 11:1201-1242, 2010; and "A Survey On Graph Kernels", Nils M. Kriege et al., arXiv: 1903.11835, 2019), graph neural networks remove the process of hand-engineered features and directly learn the high-level embeddings from the raw features of nodes or the (sub) graph. Various techniques exist for extending and re-defining convolutions in the graph domain, which can be categorized into the spectral approach and the spatial approach. The spectral approach employs the spectral representation of a graph, and are specific to a particular graph structure, such that the models trained on one graph are not applicable to a graph with a different structure (see, for example, "Spectral Networks And Locally Connected Networks On Graphs", Joan Bruna et al., International Conference on Learning Representations 2014, 2014; "Convolutional Neural Networks On Graphs With Fast Localized Spectral Filtering", Michael Defferrard et al., Proceedings of Neural Information Processing Systems 2016, 2016, pp. 3844-3852; and "Semi-Supervised Classification With Graph Convolutional Networks", Thomas N. Kipf et al., International Conference on Learning Representations 2017, 2017). The convolution operation for the spectral approach is defined in the Fourier domain by computing the eigendecomposition of the graph Laplacian, and the filter may be approximated to reduce the expensive eigen-decomposition by Chebyshev expansion of graph Lapacian, generating local filters, with the filters optionally limited to work on neighbors one step away from the current node. With respect to the spatial approach, it includes learning embeddings for a node by recursively aggregating information from its local neighbors. Various amounts of neighboring nodes and corresponding aggregation functions can be handled in various ways. For example, a fixed number of neighbors for each node may be sample, and different aggregation functions such as mean, max and long short term memory networks (LSTM) may be used (see, for example, "Inductive Representation Learning On Large Graphs", Will Hamilton et al., Proceedings of Neural Information Processing Systems 2017, 2017, pp. 1024-1034). Alternatively, each neighboring node may be considered to contribute differently to a central node, with the contribution factors being learnable via self-attention models (see, for example, "Graph Attention Networks", P. Velickovic et al., International Conference on Learning Representations 2018, 2018). Furthermore, each attention head captures feature correlation in a different representation subspace, and may be treated differently, such as by using a convolutional sub-network to weight the importance of each attention head (see, for example, "GaAN: Gated Attention Networks For Learning On Large And Spatiotemporal Graphs", Jiani Zhang et al., Proceedings of Uncertainty in Artificial Intelligence 2018, 2018).

In addition, in some embodiments, the creation of an adjacency graph and/or associated vector embedding for a building may be further based in part on partial information that is provided for the building (e.g., by an operator user of the BFPADUM system, by one or more end users, etc.). Such partial information may include, for example, one or more of the following: some or all room names for rooms of the building being provided, with the connections between the rooms to be automatically determined or otherwise established; some or all inter-room connections between rooms of the building being provided, with likely room names for the rooms to be automatically determined or otherwise established; some room names and inter-room connections being provided, with the other inter-room connections and/or likely room names to be automatically determined or otherwise established. In such embodiments, the automated techniques may include using the partial information as part of completing or otherwise generating a floor plan for the building, with the floor plan subsequently used for creating a corresponding adjacency graph and/or vector embedding.

Figure 3:
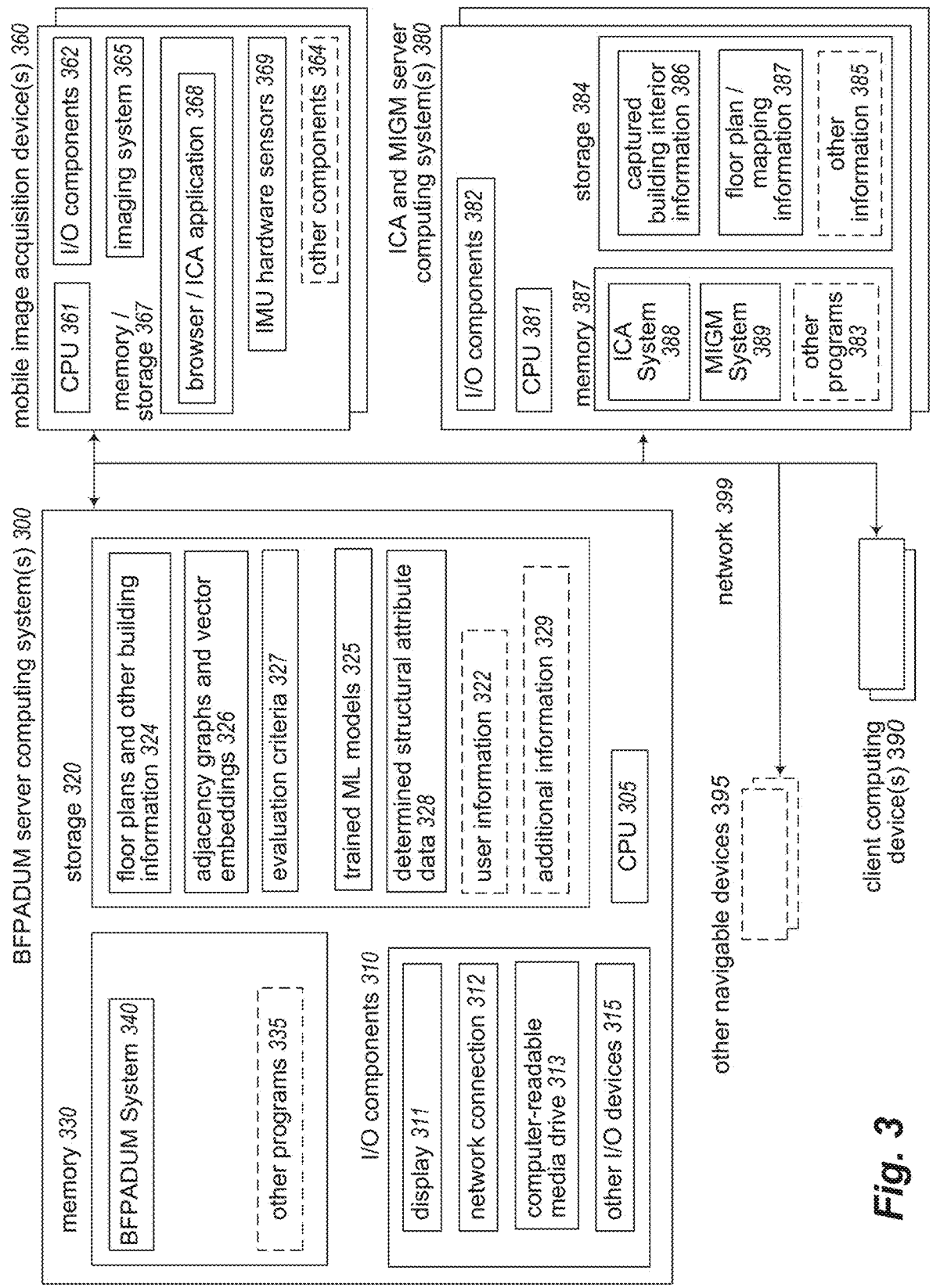
FIG. 3 is a block diagram illustrating computing systems suitable for executing an embodiment of a system that performs at least some of the techniques described in the present disclosure.

FIG. 3 is a block diagram illustrating an embodiment of one or more server computing systems 300 executing an implementation of a BFPADUM system 340, and one or more server computing systems 380 executing an implementation of an ICA system 388 and an MIGM system 389—the server computing system(s) and BFPADUM and/or ICA and/or MIGM systems may be implemented using a plurality of hardware components that form electronic circuits suitable for and configured to, when in combined operation, perform at least some of the techniques described herein. One or more computing systems and devices may also optionally be executing a Building Information Access system (such as server computing system(s) 300) and/or optional other programs 335 and 383 (such as server computing system(s) 300 and 380, respectively, in this example). In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 387, storage 384 and I/O components 382 are illustrated in this example for the sake of brevity.

The server computing system(s) 300 and executing BFPADUM system 340, server computing system(s) 380 and executing ICA and MIGM systems 388-389, and optionally executing Building Information Access system (not shown), may communicate with each other and with other computing systems and devices in this illustrated embodiment, such as via one or more networks 399 (e.g., the Internet, one or more cellular telephone networks, etc.), including to interact with user client computing devices 390 (e.g., used to view floor plans, and optionally associated images and/or other related information, such as by interacting with or executing a copy of the Building Information Access system), and/or mobile image acquisition devices 360 (e.g., used to acquire images and/or other information for buildings or other environments to be modeled), and/or optionally other navigable devices 395 that receive and use floor plans and optionally other generated information for navigation purposes (e.g., for use by semi-autonomous or fully autonomous vehicles or other devices). In other embodiments, some of the described functionality may be combined in less computing systems, such as to combine the BFPADUM system 340 and a Building Information Access system in a single system or device, to combine the BFPADUM system 340 and the image acquisition functionality of device(s) 360 in a single system or device, to combine the ICA and MIGM systems 388-389 and the image acquisition functionality of device(s) 360 in a single system or device, to combine the BFPADUM system 340 and the ICA and MIGM systems 388-389 in a single system or device, to combine the BFPADUM system 340 and the ICA and MIGM systems 388-389 and the image acquisition functionality of device(s) 360 in a single system or device, etc.

In the illustrated embodiment, an embodiment of the BFPADUM system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the BFPADUM system may include one or more components, not shown, to each perform portions of the functionality of the BFPADUM system, such as in a manner discussed elsewhere herein, and the memory may further optionally execute one or more other programs 335—as one specific example, a copy of the ICA and/or MIGM systems may execute as one of the other programs 335 in at least some embodiments, such as instead of or in addition to the ICA and/or MIGM systems 388-389 on the server computing system(s) 380, and/or a copy of a Building Information Access system may execute as one of the other programs 335. The BFPADUM system 340 may further, during its operation, store and/or retrieve various types of data on storage 320 (e.g., in one or more databases or other data structures), such as floor plans and other associated building information 324 (e.g., generated and saved 2.5D and/or 3D models, building and room dimensions for use with associated floor plans, additional images and/or annotation information, etc.), determined structural attribute data 328 (e.g., attribute values for particular positions, associated visualizations, etc.), optionally one or more trained machine learning (ML) models 325, optionally generated floor plan adjacency graph data structures and/or associated vector embedding data structures 326, evaluation criteria 327 for use in determining building structural attribute values and/or visualizations, various types of user information 322, and/or various types of optional additional information 329 (e.g., various analytical information related to presentation or other use of one or more building interiors or other environments).

In addition, embodiments of the ICA and MIGM systems 388-389 execute in memory 387 of the server computing system(s) 380 in the illustrated embodiment in order to perform techniques related to generating panorama images and floor plans for buildings, such as by using the processor(s) 381 to execute software instructions of the systems 388 and/or 389 in a manner that configures the processor(s) 381 and computing system(s) 380 to perform automated operations that implement those techniques. The illustrated embodiment of the ICA and MIGM systems may include one or more components, not shown, to each perform portions of the functionality of the ICA and MIGM systems, respectively, and the memory may further optionally execute one or more other programs 383. The ICA and/or MIGM systems 388-389 may further, during operation, store and/or retrieve various types of data on storage 384 (e.g., in one or more databases or other data structures), such as video and/or image information 386 acquired for one or more buildings (e.g., 360° video or images for analysis to generate floor plans, to provide to users of client computing devices 390 for display, etc.), floor plans and/or other generated mapping information 387, and optionally other information 385 (e.g., additional images and/or annotation information for use with associated floor plans, building and room dimensions for use with associated floor plans, various analytical information related to presentation or other use of one or more building interiors or other environments, etc.)— while not illustrated in FIG. 3, the ICA and/or MIGM systems may further store and use additional types of information, such as about other types of building information to be analyzed and/or provided to the BFPADUM system, about ICA and/or MIGM system operator users and/or end-users, etc.

Some or all of the user client computing devices 390 (e.g., mobile devices), mobile image acquisition devices 360, optional other navigable devices 395 and other computing systems (not shown) may similarly include some or all of the same types of components illustrated for server computing system 300. As one non-limiting example, the mobile image acquisition devices 360 are each shown to include one or more hardware CPU(s) 361, I/O components 362, memory and/or storage 367, one or more imaging systems 365, IMU hardware sensors 369 (e.g., for use in acquisition of video and/or images, associated device movement data, etc.), and optionally other components 364. In the illustrated example, one or both of a browser and one or more client applications 368 (e.g., an application specific to the BFPADUM system and/or to ICA system and/or to the MIGM system) are executing in memory 367, such as to participate in communication with the BFPADUM system 340, ICA system 388, MIGM system 389 and/or other computing systems. While particular components are not illustrated for the other navigable devices 395 or other computing devices/systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated BFPADUM system 340 may in some embodiments be distributed in various components, some of the described functionality of the BFPADUM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the BFPADUM system 340 executing on server computing systems 300, by a Building Information Access system executing on server computing systems 300 or other computing systems/devices, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
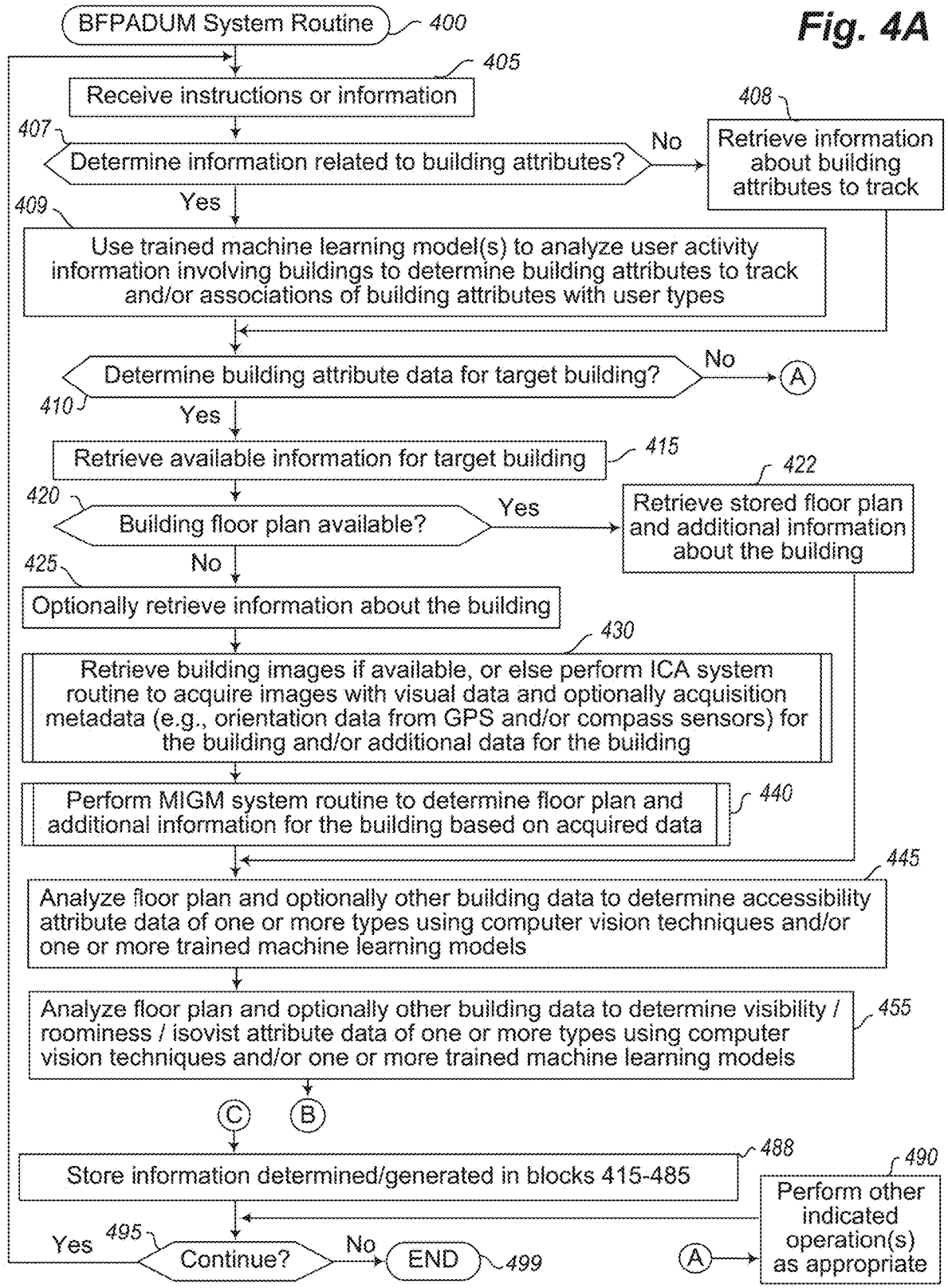
FIGS. 4A-4B illustrate an example embodiment of a flow diagram for a Building Floor Plan Attribute Determination/ Usage Manager (BFPADUM) system routine in accordance with an embodiment of the present disclosure.
Figure 4B:
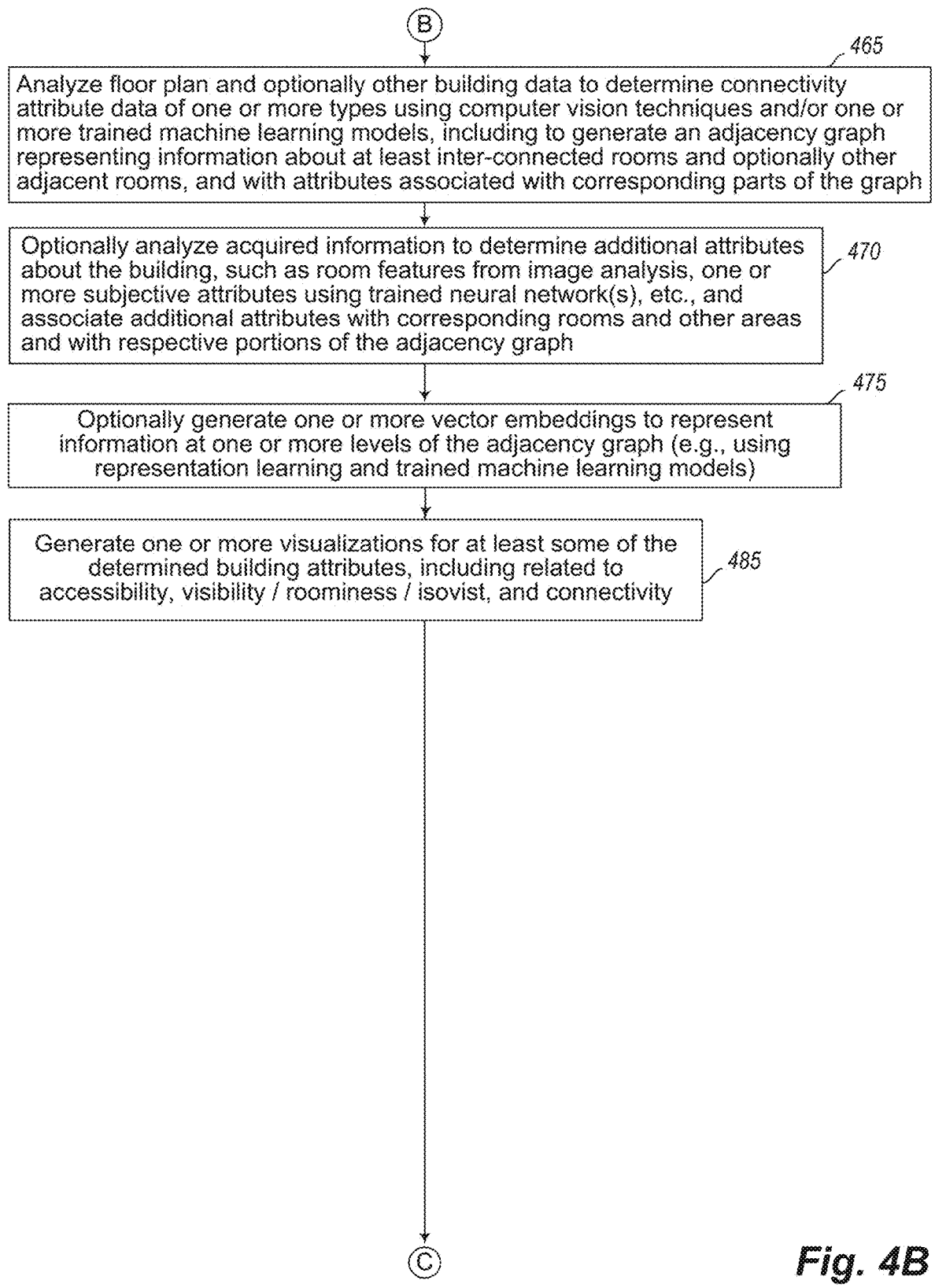

FIGS. 4A-4B illustrate an example embodiment of a flow diagram for a Building Floor Plan Attribute Determination/Usage Manager (BFPADUM) System routine 400. The routine may be performed by, for example, execution of the BFPADUM system 140 of FIG. 1, the BFPADUM system 340 of FIG. 3, and/or an BFPADUM system as described with respect to FIGS. 2E-2J and elsewhere herein, such as to perform automated operations related to determining information about a target building's structural characteristics and other attributes from analysis of existing building information, and for using the determined building information in various manners. In the example embodiment of FIGS. 4A-4B, the floor plans are for houses or other buildings, but in other embodiments, other types of data structures and analyses may be used for other types of structures or for non-structure locations, and the identified buildings and/or their floor plans may be used in other manners than those discussed with respect to routine 400, as discussed elsewhere herein. In addition, while the example embodiment of the routine may use adjacency graphs and/or vector embeddings and/or other specified criteria (e.g., search terms) as part of determining building structural attribute information (e.g., for one or more connectivity attributes) and/or to identify buildings that match or otherwise are similar to that information, other embodiments of the routine may use only one such type of information and/or may use other additional types of information and analyses (e.g., to identify matching properties).

The illustrated embodiment of the routine begins at block 405, where information or instructions are received. The routine continues to block 407 to determine whether the instructions or other information received in block 405 indicate to determine information related to building attributes, such as which attributes to track and/or which attributes to associate with particular types of users, and if not continues to block 408 to retrieve information about building attributes to track. Otherwise, the routine continues to block 409 to use one or more trained machine learning models to analyze user activity information involving buildings to determine one or more building attributes to track and/or to determine associations a particular building attributes with particular user types based on those activities. In at least some embodiments and situations, the information retrieved or otherwise determined in blocks 408 or 409 may be specific to a particular user and/or user type (e.g., as indicated in block 405), such as if the information being subsequently determined in the routine is for such a user or a user of such a user type.

After blocks 408 or 409, the routine continues to block 410, where determines if the instructions or other information received in block 405 are to determine building attribute data for a target building, and if not proceeds to block 490. Otherwise the routine continues to block 415 to retrieve available information about the target building. In block 420, the routine determines if a building floor plan is available for the target building, and if so continues to block 422 to retrieve the stored floor plan and any additional information about the building (e.g., building features determined from analysis of images captured at the building, information about the building from public data sources, etc.), and then continues to block 445. If it is instead determined in block 420 that a building floor plan is not available for the target building, the routine instead continues to perform blocks 425-440, including in block 425 to optionally retrieve any other existing building information (e.g., building images, from public sources, etc.), and then in block 430 to retrieve building images for the target building if available or if not to perform the ICA routine to acquire such images, with FIG. 5 providing one example of such a routine. After block 430, the routine performs the MIGM routine to determine a floor plan and additional information about the target building from the images, with FIGS. 6A-6B providing one example of such a routine.

After blocks 422 or 440, the routine continues to block 445 to analyze the floor plan and optionally other building data (e.g., one or more building images, such as to determine height information for particular rooms or other areas) to determine accessibility attribute values for one or more accessibility attributes (e.g. as determined in blocks 408 or 409) for each of one or more positions in the target building (e.g., for each position in a grid covering some or all of the building and optionally the surrounding property), such as by using one or more trained machine learning models and/or computer vision techniques, and as described in greater detail elsewhere herein. After block 445, the routine continues to block 455, where it analyzes the floor plan and optionally other building data (e.g., one or more building images) to determine isovist values for one or more isovist attributes (e.g. as determined in blocks 408 or 409) for each of one or more positions in the target building (e.g., for each position in a grid covering some or all of the building and optionally the surrounding property), such as by using one or more trained machine learning models and/or computer vision techniques, and as described in greater detail elsewhere herein. After block 455, the routine continues to block 465, where it analyzes the floor plan and optionally other building data (e.g., one or more building images) to determine connectivity values for one or more connectivity attributes (e.g. as determined in blocks 408 or 409) for each of one or more positions in the target building (e.g., for each position in a grid covering some or all of the building and optionally the surrounding property), such as by using one or more trained machine learning models and/or computer vision techniques, and as described in greater detail elsewhere herein—in at least some embodiments and situations, the determinations in block 465 include generating an adjacency graph for the building that represents information about at least inter-connected rooms and optionally other adjacent rooms, with the determination of at least some of the connectivity values being based at least in part on analysis or other use of the generated adjacency graph.

After block 465, the routine continues to block 470 two optionally analyze acquired building information to determine one or more additional building attributes and associated values about the building, such as to determine room features from image analysis, to identify objects and other structural elements, to determine one or more subjective attributes using one or more corresponding trained neural networks, and to associate any such additional attributes with the corresponding rooms or other areas and with respect to portions of the adjacency graph. After block 470, the routine continues to block 475 two optionally generate one or more spectrum beddings to represent information for at least some of the adjacency graph (e.g., using representation learning and one or more trained machine learning models), such as for subsequent use in comparing buildings and their attribute information—while not illustrated in the example embodiment, the routine may further determine other similar buildings to the current target building based at least in part on comparing their respective spectrum beddings and determining other buildings with a smallest distance or other difference. After block 475, the routine continues to block 485 where it generates one or more visualizations or other visual representations for at least some of the determine building attributes, such as a heat map for each of one or more accessibility attributes and/or isovist attributes and/or connectivity attributes, textual/numeric visual representations, etc. After block 485, the routine continues to block 488, where it stores some or all of the information determined and generated in blocks 409-485.

If it is instead determined in block 410 that the information or instructions received in block 405 are not to determine building attribute data for a target building, the routine continues instead to block 490 to perform one or more other indicated operations as appropriate. Such other operations may include, for example, receiving and responding to requests for previously identified building information (e.g., requests for such information for display on one or more client devices, requests for such information to provide it to one or more other devices for use in automated navigation, etc.), training one or more neural networks or other machine learning models to perform the types of operations described herein, using machine learning techniques to learn the attributes and/or other characteristics of adjacency graphs to encode in corresponding vector embeddings that are generated (e.g., the best attributes and/or other characteristics to allow subsequent automated identification of building floor plans that have attributes satisfying target criteria), obtaining and storing information about users of the routine (e.g., search and/or selection preferences of a current user, a user's role and/or user type and/or associated criteria to use in determining building modifications), generating and storing representative information for buildings (e.g., floor plans, adjacency graphs, vector embeddings, attribute value visualizations, etc.) for later use, etc.

After blocks 488 or 490, the routine continues to block 495 to determine whether to continue, such as until an explicit indication to terminate is received, or instead only if an explicit indication to continue is received. If it is determined to continue, the routine returns to block 405 to wait for and receive additional instructions or information, and otherwise continues to block 499 and ends.

Figure 5:
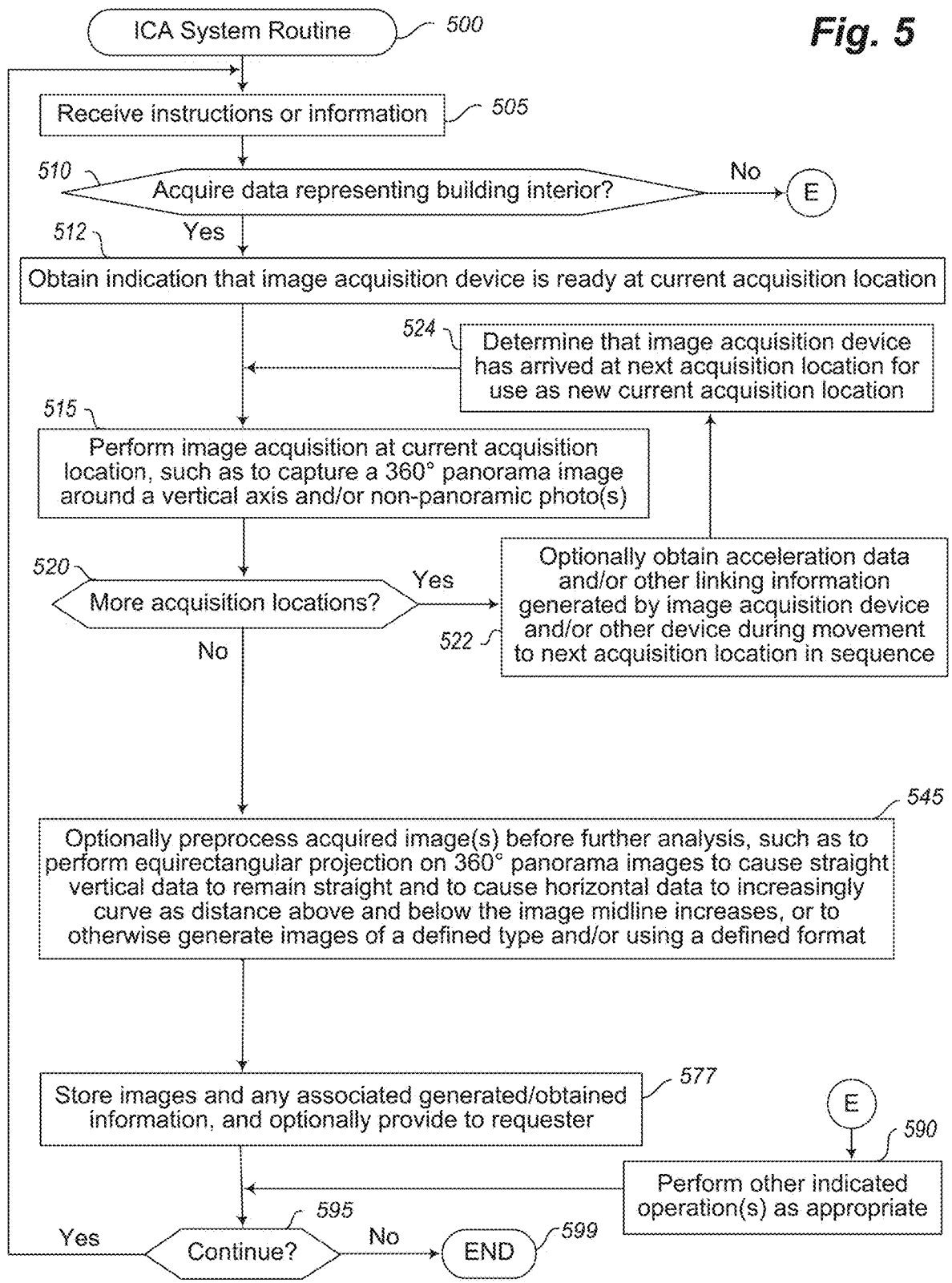
FIG. 5 illustrates an example embodiment of a flow diagram for an Image Capture and Analysis (ICA) system routine in accordance with an embodiment of the present disclosure.

FIG. 5 illustrates an example flow diagram of an embodiment of an ICA (Image Capture & Analysis) system routine 500. The routine may be performed by, for example, the ICA system 160 of FIG. 1, the ICA system 388 of FIG. 3, and/or an ICA system as described with respect to FIGS. 2A-2J and elsewhere herein, such as to acquire 360° panorama images and/or other images at acquisition locations within buildings or other structures, such as for use in subsequent generation of related floor plans and/or other mapping information. While portions of the example routine 500 are discussed with respect to acquiring particular types of images at particular acquisition locations, it will be appreciated that this or a similar routine may be used to acquire video (with video frame images) and/or other data (e.g., audio), whether instead of or in addition to such panorama images or other perspective images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device. In at least some embodiments, the routine 500 may be invoked from block 430 of routine 400 of FIGS. 4A-4B, with corresponding information from routine 500 provided to routine 400 as part of implementation of that block 430, and with processing control returned to routine 400 after blocks 577 and/or 599 in such situations—in other embodiments, the routine 400 may proceed with additional operations in an asynchronous manner without waiting for such processing control to be returned (e.g., to proceed with other processing activities while waiting for the corresponding information from the routine 500 to be provided to routine 400).

The illustrated embodiment of the routine begins at block 505, where instructions or information are received. At block 510, the routine determines whether the received instructions or information indicate to acquire visual data and/or other data representing a building interior (optionally in accordance with supplied information about one or more additional acquisition locations and/or other guidance acquisition instructions), and if not continues to block 590. Otherwise, the routine proceeds to block 512 to receive an indication to begin the image acquisition process at a first acquisition location (e.g., from a user of a mobile image acquisition device that will perform the acquisition process). After block 512, the routine proceeds to block 515 in order to perform acquisition location image acquisition activities for acquiring a 360° panorama image for the acquisition location in the interior of the target building of interest, such as via one or more fisheye lenses and/or non-fisheye rectilinear lenses on the mobile device and to provide horizontal coverage of at least 360° around a vertical axis, although in other embodiments other types of images and/or other types of data may be acquired. As one non-exclusive example, the mobile image acquisition device may be a rotating (scanning) panorama camera equipped with a fisheye lens (e.g., with 180° degrees of horizontal coverage) and/or other lens (e.g., with less than 180° degrees of horizontal coverage, such as a regular lens or wide-angle lens or ultrawide lens). The routine may also optionally obtain annotation and/or other information from the user regarding the acquisition location and/or the surrounding environment, such as for later use in presentation of information regarding that acquisition location and/or surrounding environment.

After block 515 is completed, the routine continues to block 520 to determine if there are more acquisition locations at which to acquire images, such as based on corresponding information provided by the user of the mobile device and/or received in block 505—in some embodiments, the ICA routine will acquire only a single image and then proceed to block 577 to provide that image and corresponding information (e.g., to return the image and corresponding information to the BFPADUM system and/or MIGM system for further use before receiving additional instructions or information to acquire one or more next images at one or more next acquisition locations). If there are more acquisition locations at which to acquire additional images at the current time, the routine continues to block 522 to optionally initiate the capture of linking information (e.g., acceleration data) during movement of the mobile device along a travel path away from the current acquisition location and towards a next acquisition location within the building interior. The captured linking information may include additional sensor data (e.g., from one or more IMU, or inertial measurement units, on the mobile device or otherwise carried by the user) and/or additional visual information (e.g., images, video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues (e.g., to the user) regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 524, the routine determines that the mobile device has arrived at the next acquisition location (e.g., based on an indication from the user, based on the forward movement of the mobile device stopping for at least a predefined amount of time, etc.), for use as the new current acquisition location, and returns to block 515 in order to perform the acquisition location image acquisition activities for the new current acquisition location.

Figure 6A:
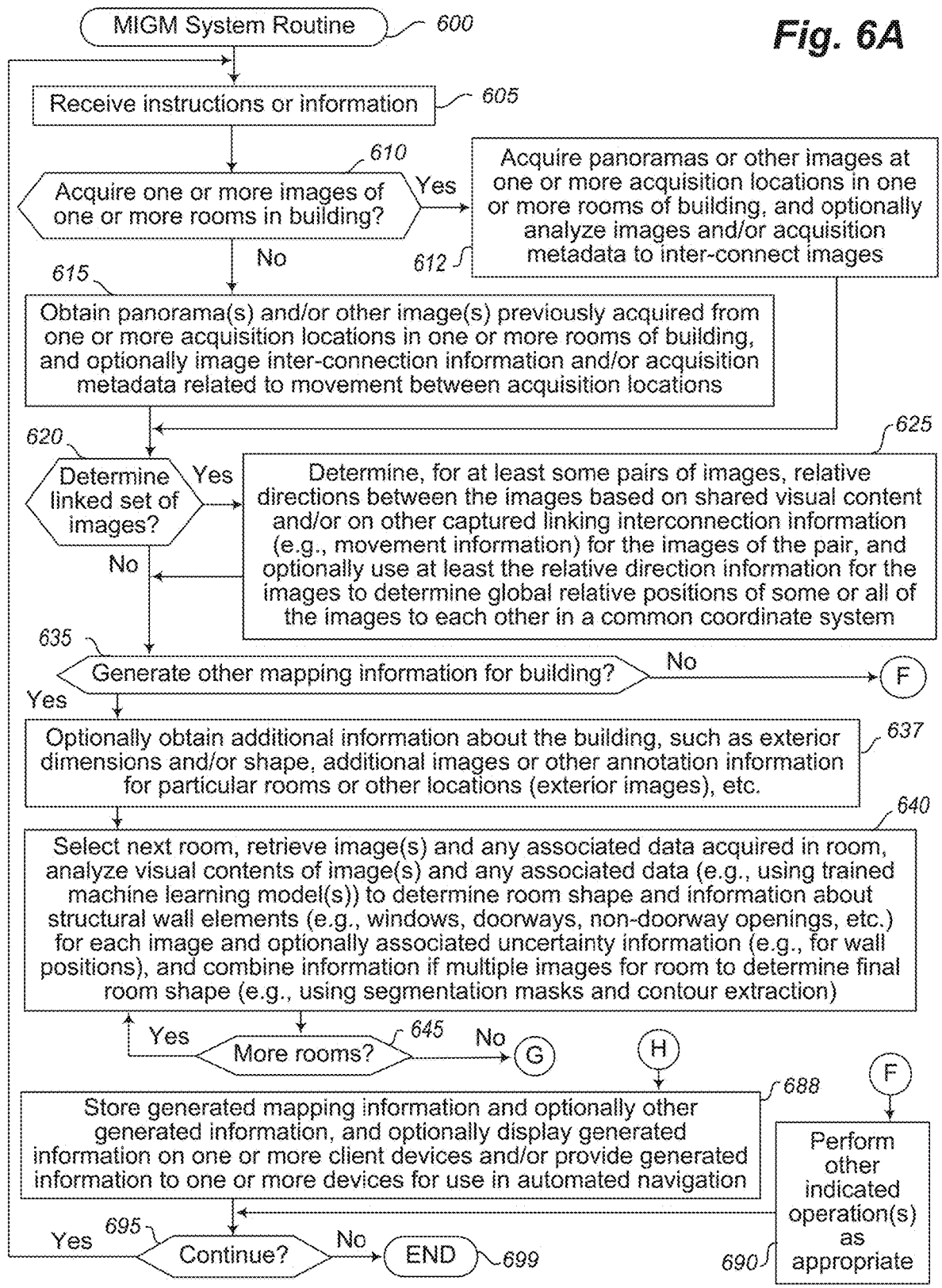
FIGS. 6A-6B illustrate an example embodiment of a flow diagram for a Mapping Information Generation Manager (MIGM) system routine in accordance with an embodiment of the present disclosure.
Figure 6B:
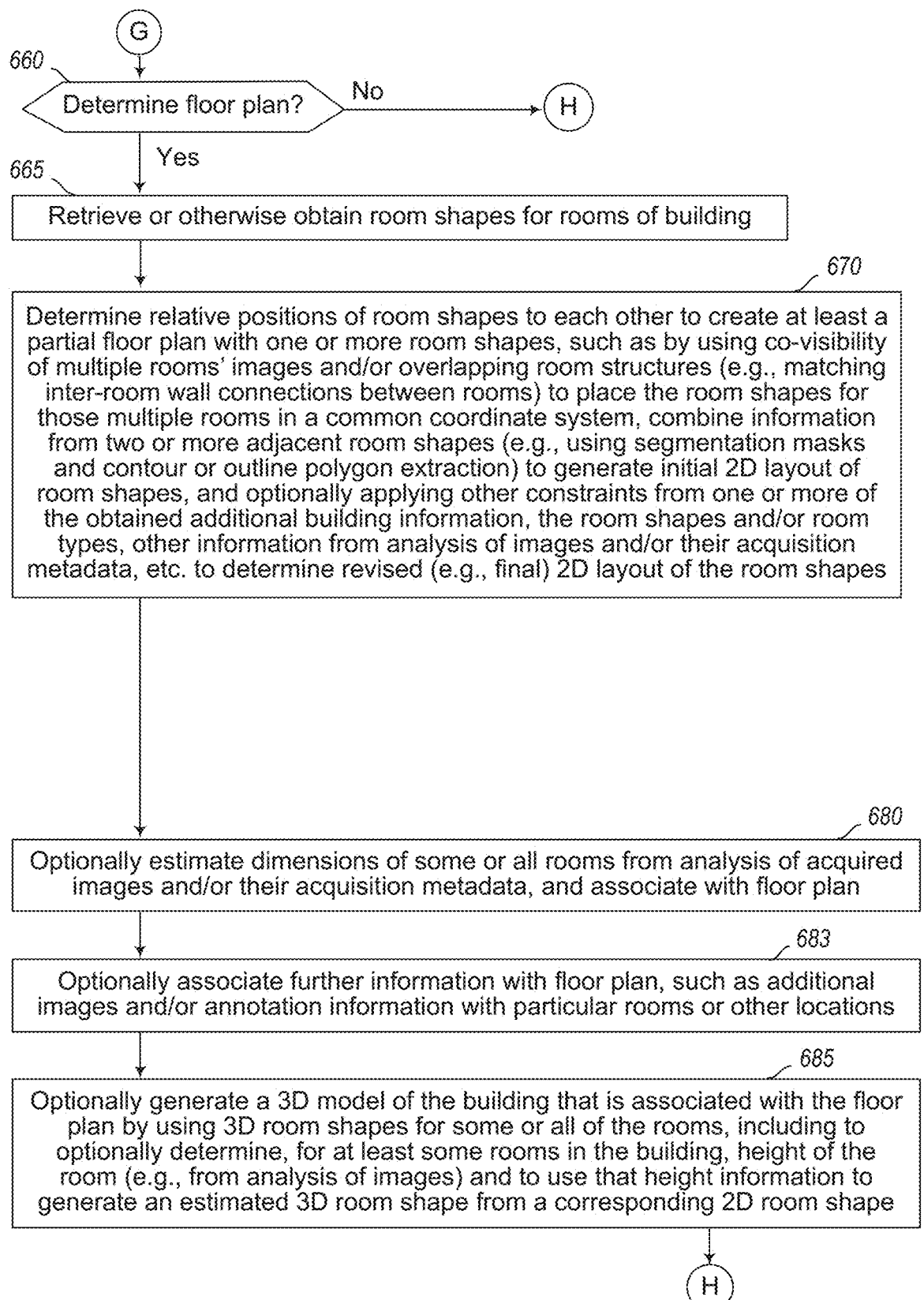

If it is instead determined in block 520 that there are not any more acquisition locations at which to acquire image information for the current building or other structure at the current time, the routine proceeds to block 545 to optionally preprocess the acquired 360° panorama images before their subsequent use (e.g., for generating related mapping information, for providing information about features of rooms or other enclosing areas, etc.), such as to produce images of a particular type and/or in a particular format (e.g., to perform an equirectangular projection for each such image, with straight vertical data such as the sides of a typical rectangular door frame or a typical border between 2 adjacent walls remaining straight, and with straight horizontal data such as the top of a typical rectangular door frame or a border between a wall and a floor remaining straight at a horizontal midline of the image but being increasingly curved in the equirectangular projection image in a convex manner relative to the horizontal midline as the distance increases in the image from the horizontal midline). In block 577, the images and any associated generated or obtained information is stored for later use, and optionally provided to one or more recipients (e.g., to block 430 of routine 400 if invoked from that block). FIGS. 6A-6B illustrate one example of a routine for generating a floor plan representation of a building interior from the generated panorama information.

If it is instead determined in block 510 that the instructions or other information received in block 505 are not to acquire images and other data representing a building interior, the routine continues instead to block 590 to perform any other indicated operations as appropriate, such as to configure parameters to be used in various operations of the system (e.g., based at least in part on information specified by a user of the system, such as a user of a mobile device who captures one or more building interiors, an operator user of the ICA system, etc.), to respond to requests for generated and stored information (e.g., to identify one or more groups of inter-connected linked panorama images each representing a building or part of a building that match one or more specified search criteria, one or more panorama images that match one or more specified search criteria, etc.), to generate and store inter-panorama image connections between panorama images for a building or other structure (e.g., for each panorama image, to determine directions within that panorama image toward one or more other acquisition locations of one or more other panorama images, such as to enable later display of an arrow or other visual representation with a panorama image for each such determined direction from the panorama image to enable an end-user to select one of the displayed visual representations to switch to a display of the other panorama image at the other acquisition location to which the selected visual representation corresponds), to obtain and store other information about users of the system, to perform any housekeeping tasks, etc.

Following blocks 577 or 590, the routine proceeds to block 595 to determine whether to continue, such as until an explicit indication to terminate is received, or instead only if an explicit indication to continue is received. If it is determined to continue, the routine returns to block 505 to await additional instructions or information, and if not proceeds to step 599 and ends.

FIGS. 6A-6B illustrate an example embodiment of a flow diagram for a MIGM (Mapping Information Generation Manager) system routine 600. The routine may be performed by, for example, execution of the MIGM system 160 of FIG. 1, the MIGM system 389 of FIG. 3, and/or a MIGM system as described with respect to FIGS. 2A-2J and elsewhere herein, such as to determine a room shape for a room (or other defined area) by analyzing information from one or more images acquired in the room (e.g., one or more 360° panorama images), to generate a partial or complete floor plan for a building or other defined area based at least in part on one or more images of the area and optionally additional data captured by a mobile computing device, and/or to generate other mapping information for a building or other defined area based at least in part on one or more images of the area and optionally additional data captured by a mobile computing device. In the example of FIGS. 6A-6B, the determined room shape for a room may be a 2D room shape to represent the locations of the walls of the room or a 3D fully closed combination of planar surfaces to represent the locations of walls and ceiling and floor of the room, and the generated mapping information for a building (e.g., a house) may include a 2D floor plan and/or 3D computer model floor plan, but in other embodiments, other types of room shapes and/or mapping information may be generated and used in other manners, including for other types of structures and defined areas, as discussed elsewhere herein. In at least some embodiments, the routine 600 may be invoked from block 440 of routine 400 of FIGS. 4A-4B, with corresponding information from routine 600 provided to routine 400 as part of implementation of that block 440, and with processing control returned to routine 400 after blocks 688 and/or 699 in such situations—in other embodiments, the routine 400 may proceed with additional operations in an asynchronous manner without waiting for such processing control to be returned (e.g., to proceed to block 445 once the corresponding information from routine 600 is provided to routine 400, to proceed with other processing activities while waiting for the corresponding information from the routine 600 to be provided to routine 400, etc.).

The illustrated embodiment of the routine begins at block 605, where information or instructions are received. The routine continues to block 610 to determine whether image information is already available to be analyzed for one or more rooms (e.g., for some or all of an indicated building, such as based on one or more such images received in block 605 as previously generated by the ICA routine), or if such image information instead is to be currently acquired. If it is determined in block 610 to currently acquire some or all of the image information, the routine continues to block 612 to acquire such information, optionally waiting for one or more users or devices to move throughout one or more rooms of a building and acquire panoramas or other images at one or more acquisition locations in one or more of the rooms (e.g., at multiple acquisition locations in each room of the building), optionally along with metadata information regarding the acquisition and/or interconnection information related to movement between acquisition locations, as discussed in greater detail elsewhere herein-implementation of block 612 may, for example, include invoking an ICA system routine to perform such activities, with FIG. 5 providing one example embodiment of an ICA system routine for performing such image acquisition. If it is instead determined in block 610 not to currently acquire the images, the routine continues instead to block 615 to obtain one or more existing panoramas or other images from one or more acquisition locations in one or more rooms (e.g., multiple images acquired at multiple acquisition locations that include at least one image and acquisition location in each room of a building), optionally along with metadata information regarding the acquisition and/or interconnection information related to movement between the acquisition locations, such as may in some situations have been supplied in block 605 along with the corresponding instructions.

After blocks 612 or 615, the routine continues to block 620, where it determines whether to generate mapping information that includes a linked set of target panorama images (or other images) for a building or other group of rooms (referred to at times as a 'virtual tour', such as to enable an end user to move from any one of the images of the linked set to one or more other images to which that starting current image is linked, including in some embodiments via selection of a user-selectable control for each such other linked image that is displayed along with a current image, optionally by overlaying visual representations of such user-selectable controls and corresponding inter-image directions on the visual data of the current image, and to similarly move from that next image to one or more additional images to which that next image is linked, etc.), and if so continues to block 625. The routine in block 625 selects pairs of at least some of the images (e.g., based on the images of a pair having overlapping visual content), and determines, for each pair, relative directions between the images of the pair based on shared visual content and/or on other captured linking interconnection information (e.g., movement information) related to the images of the pair (whether movement directly from the acquisition location for one image of a pair to the acquisition location of another image of the pair, or instead movement between those starting and ending acquisition locations via one or more other intermediary acquisition locations of other images). The routine in block 625 may further optionally use at least the relative direction information for the pairs of images to determine global relative positions of some or all of the images to each other in a common coordinate system, and/or generate the inter-image links and corresponding user-selectable controls as noted above. Additional details are included elsewhere herein regarding creating such a linked set of images.

After block 625, or if it is instead determined in block 620 that the instructions or other information received in block 605 are not to determine a linked set of images, the routine continues to block 635 to determine whether the instructions received in block 605 indicate to generate other mapping information for an indicated building (e.g., a floor plan), and if so the routine continues to perform some or all of blocks 637-685 to do so, and otherwise continues to block 690. In block 637, the routine optionally obtains additional information about the building, such as from activities performed during acquisition and optionally analysis of the images, and/or from one or more external sources (e.g., online databases, information provided by one or more end users, etc.)—such additional information may include, for example, exterior dimensions and/or shape of the building, additional images and/or annotation information acquired corresponding to particular locations external to the building (e.g., surrounding the building and/or for other structures on the same property, from one or more overhead locations, etc.), additional images and/or annotation information acquired corresponding to particular locations within the building (optionally for locations different from acquisition locations of the acquired panorama images or other images), etc.

After block 637, the routine continues to block 640 to select the next room (beginning with the first) for which one or more images (e.g., 360° panorama images) acquired in the room are available, and to analyze the visual data of the image(s) for the room to determine a room shape (e.g., by determining at least wall locations), optionally along with determining uncertainty information about walls and/or other parts of the room shape, and optionally including identifying other wall and floor and ceiling elements (e.g., wall structural elements/features, such as windows, doorways and stairways and other inter-room wall openings and connecting passages, wall borders between a wall and another wall and/or ceiling and/or floor, etc.) and their positions within the determined room shape of the room. In some embodiments, the room shape determination may include using boundaries of the walls with each other and at least one of the floor or ceiling to determine a 2D room shape (e.g., using one or trained machine learning models), while in other embodiments the room shape determination may be performed in other manners (e.g., by generating a 3D point cloud of some or all of the room walls and optionally the ceiling and/or floor, such as by analyzing at least visual data of the panorama image and optionally additional data captured by an image acquisition device or associated mobile computing device, optionally using one or more of SfM (Structure from Motion) or SLAM (Simultaneous Location And Mapping) or MVS (Multi-View Stereo) analysis). In addition, the activities of block 645 may further optionally determine and use initial pose information for each of those panorama images (e.g., as supplied with acquisition metadata for the panorama image), and/or obtain and use additional metadata for each panorama image (e.g., acquisition height information of the camera device or other image acquisition device used to acquire a panorama image relative to the floor and/or the ceiling). Additional details are included elsewhere herein regarding determining room shapes and identifying additional information for the rooms. After block 640, the routine continues to block 645, where it determines whether there are more rooms for which to determine room shapes based on images acquired in those rooms, and if so returns to block 640 to select the next such room for which to determine a room shape.

If it is instead determined in block 645 that there are not more rooms for which to generate room shapes, the routine continues to block 660 to determine whether to further generate at least a partial floor plan for the building (e.g., based at least in part on the determined room shape(s) from block 640, and optionally further information regarding how to position the determined room shapes relative to each other). If not, such as when determining only one or more room shapes without generating further mapping information for a building (e.g., to determine the room shape for a single room based on one or more images acquired in the room by the ICA system), the routine continues to block 688. Otherwise, the routine continues to block 665 to retrieve one or more room shapes (e.g., room shapes generated in block 645) or otherwise obtain one or more room shapes (e.g., based on human-supplied input) for rooms of the building, whether 2D or 3D room shapes, and then continues to block 670. In block 670, the routine uses the one or more room shapes to create an initial floor plan (e.g., an initial 2D floor plan using 2D room shapes and/or an initial 3D floor plan using 3D room shapes), such as a partial floor plan that includes one or more room shapes but less than all room shapes for the building, or a complete floor plan that includes all room shapes for the building. If there are multiple room shapes, the routine in block 670 further determines positioning of the room shapes relative to each other, such as by using visual overlap between images from multiple acquisition locations to determine relative positions of those acquisition locations and of the room shapes surrounding those acquisition locations, and/or by using other types of information (e.g., using connecting inter-room passages between rooms, optionally applying one or more constraints or optimizations, etc.). In at least some embodiments, the routine in block 670 further refines some or all of the room shapes by generating a binary segmentation mask that covers the relatively positioned room shape(s), extracting a polygon representing the outline or contour of the segmentation mask, and separating the polygon into the refined room shape(s). Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further optionally associates positions of the doors, wall openings and other identified wall elements on the floor plan.

After block 670, the routine optionally performs one or more steps 680-685 to determine and associate additional information with the floor plan. In block 680, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blueprints, etc. may be generated from the floor plan. After block 680, the routine continues to block 683 to optionally associate further information with the floor plan (e.g., with particular rooms or other locations within the building), such as additional existing images with specified positions and/or annotation information. In block 685, if the room shapes from block 645 are not 3D room shapes, the routine further optionally estimates heights of walls in some or all rooms, such as from analysis of images and optionally sizes of known objects in the images, as well as height information about a camera when the images were acquired, and uses that height information to generate 3D room shapes for the rooms. The routine further optionally uses the 3D room shapes (whether from block 640 or block 685) to generate a 3D computer model floor plan of the building, with the 2D and 3D floor plans being associated with each other—in other embodiments, only a 3D computer model floor plan may be generated and used (including to provide a visual representation of a 2D floor plan if so desired by using a horizontal slice of the 3D computer model floor plan).

After block 685, or if it is instead determined in block 660 not to determine a floor plan, the routine continues to block 688 to store the determined room shape(s) and/or generated mapping information and/or other generated information, to optionally provide some or all of that information to one or more recipients (e.g., to block 440 of routine 400 if invoked from that block), and to optionally further use some or all of the determined and generated information, such as to provide the generated 2D floor plan and/or 3D computer model floor plan for display on one or more client devices and/or to one or more other devices for use in automating navigation of those devices and/or associated vehicles or other entities, to similarly provide and use information about determined room shapes and/or a linked set of panorama images and/or about additional information determined about contents of rooms and/or passages between rooms, etc.

If it is instead determined in block 635 that the information or instructions received in block 605 are not to generate mapping information for an indicated building, the routine continues instead to block 690 to perform one or more other indicated operations as appropriate. Such other operations may include, for example, receiving and responding to requests for previously generated floor plans and/or previously determined room shapes and/or other generated information (e.g., requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

While not illustrated with respect to the automated operations shown in the example embodiment of FIGS. 6A-6B, in some embodiments human users may further assist in facilitating some of the operations of the MIGM system, such as for operator users and/or end users of the MIGM system to provide input of one or more types that is further used in subsequent automated operations. As non-exclusive examples, such human users may provide input of one or more types as follows: to provide input to assist with the linking of a set of images, such as to provide input in block 625 that is used as part of the automated operations for that block (e.g., to specify or adjust initial automatically determined directions between one or more pairs of images, to specify or adjust initial automatically determined final global positions of some or all of the images relative to each other, etc.); to provide input in block 637 that is used as part of subsequent automated operations, such as one or more of the illustrated types of information about the building; to provide input with respect to block 640 that is used as part of subsequent automated operations, such as to specify or adjust initial automatically determined element locations and/or estimated room shapes and/or to manually combine information from multiple estimated room shapes for a room (e.g., separate room shape estimates from different images acquired in the room) to create a final room shape for the room and/or to specify or adjust initial automatically determined information about a final room shape, etc.; to provide input with respect to block 670, that is used as part of subsequent operations, such as to specify or adjust initial automatically determined positions of room shapes within a floor plan being generated and/or to specify or adjust initial automatically determined room shapes themselves within such a floor plan; to provide input with respect to one or more of blocks 680 and 683 and 685 that is used as part of subsequent operations, such as to specify or adjust initial automatically determined information of one or more types discussed with respect to those blocks; and/or to specify or adjust initial automatically determined pose information (whether initial pose information or subsequent updated pose information) for one or more of the panorama images; etc. Additional details are included elsewhere herein regarding embodiments in which one or more human users provide input that is further used in additional automated operations of the BFPADUM system.

FIGS. 7A-7B illustrate an example embodiment of a flow diagram for a Building Information Access system routine 700. The routine may be performed by, for example, execution of a building information access client computing device 175 and its software system(s) (not shown) of FIG. 1, a client computing device 390 of FIG. 3, and/or a building information access viewer or presentation system as described elsewhere herein, such as to receive and display information about one or more building structural attributes and their values for one or more positions in a building (e.g., to overlay information about such attribute values on a displayed floor plan of a building and/or a displayed visual representation of a property on which the building is located, such as for one or some or all positions on the displayed floor plan and/or property visual representation), to receive and display generated floor plans and/or other mapping information (e.g., determined room structural layouts/shapes, etc.) for a defined area that optionally includes visual indications of one or more determined image acquisition locations, to obtain and display information about images matching one or more indicated target images, to display additional information (e.g., images) associated with particular acquisition locations in the mapping information, to obtain and display guidance acquisition instructions provided by the BFPADUM system and/or other sources (e.g., with respect to other images acquired during that acquisition session and/or for an associated building, such as part of a displayed GUI), to obtain and display explanations or other descriptions of matching between two or more buildings or properties, etc. In the example of FIGS. 7A-7B, the presented mapping information is for a building (such as an interior of a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information in block 705 are to display determined information for a target building and if so continues to block 715. The routine in block 715 determines whether the received instructions or information in block 705 are to select a target building using specified criteria (e.g., based at least in part on an indicated building), and if not continues to block 725 to obtain an indication of a target building to use from the user (e.g., based on a current user selection, such as from a displayed list or other user selection mechanism; based on information received in block 705; etc.). Otherwise, if it is determined in block 715 to select a target building from specified criteria (e.g., based at least in part on an indicated building), the routine continues instead to block 720, where it obtains indications of one or more search criteria to use, such as from current user selections or as indicated in the information or instructions received in block 705, and then searches stored information about buildings to determine one or more of the buildings that satisfy the search criteria or otherwise obtains indications of one or more such matching buildings, such as information that is currently or previously generated by the BFPADUM system (with one example of operations of such a system being further discussed with respect to FIGS. 4A-4B, and with the BFPADUM system optionally invoked in block 720 to obtain such information). In the illustrated embodiment, the routine then further selects a best match target building from the one or more returned buildings (e.g., the returned other building with the highest similarity or other matching rating for the specified criteria, or using another selection technique indicated in the instructions or other information received in block 705), while in other embodiments the routine may instead present multiple candidate buildings that satisfy the search criteria (e.g., in a ranked order based on degree of match) and receive a user selection of the target building from the multiple candidates.

After blocks 720 or 725, the routine continues to block 730 to retrieve building information for the target building that includes a floor plan and/or other generated mapping information for the building (e.g., one or more determined building structural attributes with associated values for one or more building or property positions and optionally associated generated visualizations or other visual representations, a group of inter-linked images for use as part of a virtual tour), and optionally indications of associated linked information for the building interior and/or a surrounding location external to the building, and/or information about one or more generated explanations or other descriptions of why the target building is selected as matching specified criteria (e.g., based in part or in whole on one or more other indicated buildings). In block 732, the routine then determines whether to display visualizations and/or other information about one or more determined building structural attributes (e.g., based on input received in block 705), and if not continues to block 735 to select an initial view of the building information retrieved in block 730 (e.g., a view of the floor plan, a particular room shape, a particular image, etc., optionally along with generated explanations or other descriptions of why the target building is selected to be matching if such information is available, and/or optionally with information about possible building modifications). After block 735, the routine continues to block 740 to display or otherwise present the current view of the retrieved information, and waits in block 745 for a user selection. After a user selection in block 745, if it is determined in block 750 that the user selection corresponds to adjusting the current view for the current target building (e.g., to change one or more aspects of the current view), the routine continues to block 755 to update the current view in accordance with the user selection, and then returns to block 740 to update the displayed or otherwise presented information accordingly. The user selection and corresponding updating of the current view may include, for example, changing information displayed for one or more building structural attributes, and/or displaying or otherwise presenting a piece of associated linked information that the user selects (e.g., a particular image associated with a displayed visual indication of a determined acquisition location, such as to overlay the associated linked information over at least some of the previous display; a particular other image linked to a current image and selected from the current image using a user-selectable control overlaid on the current image to represent that other image; etc.), and/or changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.). If it is instead determined in block 750 that the user selection is not to display further information for the current target building (e.g., to display information for another building, to end the current display operations, etc.), the routine continues instead to block 795, and returns to block 705 to perform operations for the user selection if the user selection involves such further operations.

If it is instead determined in block 710 that the instructions or other information received in block 705 are not to present information representing a building, the routine continues instead to block 782 to determine whether the instructions or other information received in block 705 are to perform a search of one or more matching buildings, such as based on building structural attribute information and/or other building attributes (e.g., on an indication to use building structural attribute information and/or other building attributes of an indicated building), and if so continues to block 982 to receive an indication of one or more target building attributes and/or other matching criteria (e.g., based on information received in block 705). In block 984, the routine then identifies one or more buildings that match the specified criteria, and displays or otherwise provides information about the identified building(s). After block 984, the routine continues to block 745. If it is instead determined in block 782 that the instructions or other information received in block 705 are not to perform a search of one or more matching buildings, the routine continues instead to block 760 to determine whether the instructions or other information received in block 705 correspond to identifying other images (if any) corresponding to one or more indicated target images, and if so continues to blocks 765-770 to perform such activities. In particular, the routine in block 765 receives the indications of the one or more target images for the matching (such as from information received in block 705 or based on one or more current interactions with a user) along with one or more matching criteria (e.g., an amount of visual overlap), and in block 770 identifies one or more other images (if any) that match the indicated target image(s), such as by interacting with the ICA and/or MIGM systems to obtain the other image(s). The routine then displays or otherwise provides information in block 770 about the identified other image(s), such as to provide information about them as part of search results, to display one or more of the identified other image(s), etc. If it is instead determined in block 760 that the instructions or other information received in block 705 are not to identify other images corresponding to one or more indicated target images, the routine continues instead to block 775 to determine whether the instructions or other information received in block 705 correspond to obtaining and providing guidance acquisition instructions during an image acquisition session with respect to one or more indicated target images (e.g., a most recently acquired image), and if so continues to block 780, and otherwise continues to block 790. In block 780, the routine obtains information about guidance acquisition instructions of one or more types, such as by interacting with the ICA system, and displays or otherwise provides information in block 780 about the guidance acquisition instructions, such as by overlaying the guidance acquisition instructions on a partial floor plan and/or recently acquired image in manners discussed in greater detail elsewhere herein.

If it is instead determined in block 732 to display visualizations and/or other information about one or more determined building structural attributes, the routine continues to perform blocks 905-984. In particular, the routine in block 905 determines whether the instructions or other information received in block 705 indicate to display data for one or more accessibility attributes, to provide information about at least one type of accessibility for the building (e.g., for at least one indicated type of user), and if so the routine continues to block 910 to optionally obtain indications of one or more types of accessibility data (e.g., one or more accessibility attributes if multiple accessibility attributes are available) and/or of one or more types of visualizations or other presentation techniques, and otherwise selects one or more available or default accessibility attributes and visualization types. In block 915, the routine then retrieves or generates one or more visualizations of one or more types as indicated or otherwise selected (e.g., a heat map, textual and/or numerical data, tabular data, etc.) for one or more accessibility attributes as indicated or otherwise selected. In block 920, the routine then displays or otherwise provides the current view of the one or more visualizations for the one or more accessibility attributes, optionally by overlaying or otherwise displaying the information on or near a displayed visual representation of the building floor plan and/or the property in which the building is located.

After block 920, or if it is instead determined in block 905 that the instructions or other information received in block 705 are not to display data for one or more accessibility attributes, the routine continues to block 925 to determine if the instructions or other information received in block 705 are to display data for one or more isovist attributes, to provide information about at least one of visibility or roominess for the building, and if so continues to block 930 to optionally obtain indications of one or more types of isovist data (e.g., one or more isovist attributes if multiple isovist attributes are available) and/or of one or more types of visualizations or other presentation techniques, and otherwise selects one or more available or default isovist attributes and visualization types. In block 935, the routine then retrieves or generates one or more visualizations of one or more types as indicated or otherwise selected (e.g., a heat map, textual and/or numerical data, tabular data, etc.) for one or more isovist attributes as indicated or otherwise selected. In block 940, the routine then displays or otherwise provides the current view of the one or more visualizations for the one or more isovist attributes, optionally by overlaying or otherwise displaying the information on or near a displayed visual representation of the building floor plan and/or the property in which the building is located, and optionally concurrently with data related to one or more accessibility attributes if so performed in block 920.

After block 940, or if it is instead determined in block 925 that the instructions or other information received in block 705 are not to display data for one or more isovist attributes, the routine continues to block 945 to determine if the instructions or other information received in block 705 are to display data for one or more connectivity attributes, to provide information about inter-room connectedness and optionally other adjacency information for rooms of the building, and if so continues to block 950 to optionally obtain indications of one or more types of connectivity data (e.g., one or more connectivity attributes if multiple connectivity attributes are available) and/or of one or more types of visualizations or other presentation techniques, and otherwise selects one or more available or default connectivity attributes and visualization types. In block 955, the routine then retrieves or generates one or more visualizations of one or more types as indicated or otherwise selected (e.g., a heat map, an adjacency graph, visual indications of paths and/or direct lines between two or more locations, textual and/or numerical data, tabular data, etc.) for one or more connectivity attributes as indicated or otherwise selected. In block 960, the routine then displays or otherwise provides the current view of the one or more visualizations for the one or more connectivity attributes, optionally by overlaying or otherwise displaying the information on or near a displayed visual representation of the building floor plan and/or the property in which the building is located, and optionally concurrently with displayed data related to one or more accessibility attributes if so performed in block 920 and/or concurrently with displayed data related to one or more isovist attributes if so performed in block 940.

After block 960, or if it is instead determined in block 945 that the instructions or other information received in block 705 are not to display data for one or more connectivity attributes, the routine continues to block 965 to determine if the instructions or other information received in block 705 are to display data for one or more other building attributes, and if so continues to block 970 to optionally obtain indications of one or more other types of building attribute data and/or of one or more types of visualizations or other presentation techniques, and otherwise selects one or more available or default building attributes and visualization types. In block 975, the routine then retrieves or generates one or more visualizations of one or more types as indicated or otherwise selected (e.g., a heat map, textual and/or numerical data, tabular data, etc.) for one or more other building attributes as indicated or otherwise selected. In block 980, the routine then displays or otherwise provides the current view of the one or more visualizations for the one or more other building attributes, optionally by overlaying or otherwise displaying the information on or near a displayed visual representation of the building floor plan and/or the property in which the building is located, and optionally concurrently with displayed data related to one or more accessibility attributes if so performed in block 920 and/or concurrently with displayed data related to one or more isovist attributes if so performed in block 940 and/or concurrently with displayed data related to one or more connectivity attributes if so performed in block 960.

After block 980, or if it is instead determined in block 965 that the instructions or other information received in block 705 are not to display data for one or more other building attributes, the routine continues to block 745 to wait for one or more user selections with respect to the information displayed in one or more of blocks 920, 940, 960 and 980.

In block 790, the routine continues instead to perform other indicated operations as appropriate, such as to configure parameters to be used in various operations of the system (e.g., based at least in part on information specified by a user of the system, such as a user of a mobile device who acquires one or more building interiors, an operator user of the BFPADUM and/or MIGM systems, etc., including for use in personalizing information display for a particular user in accordance with his/her preferences), to obtain and store other information about users of the system, to respond to requests for generated and stored information, to perform any housekeeping tasks, etc.

Following blocks 770 or 780 or 790, or if it is determined in block 750 that the user selection does not correspond to the current building, the routine proceeds to block 795 to determine whether to continue, such as until an explicit indication to terminate is received, or instead only if an explicit indication to continue is received. If it is determined to continue (including if the user made a selection in block 745 related to a new building to present), the routine returns to block 705 to await additional instructions or information (or to continue directly on to block 730 if the user made a selection in block 745 related to a new building to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
    obtaining, by one or more computing devices, information about a house with multiple rooms, including a floor plan for the house having information about the multiple rooms that includes at least two-dimensional room shapes and relative positions of the multiple rooms, and including a plurality of house images acquired at a plurality of locations at the house;
    analyzing, by the one or more computing devices, the floor plan and the house images to determine, for each of a plurality of positions at the house, an associated first value for that position for an accessibility attribute to represent one or more accessibility characteristics for an indicated type of user located at that position;

analyzing, by the one or more computing devices, the floor plan and the house images to determine, for each of the plurality of positions, an associated second value for that position for an isovist attribute to represent one or more visibility characteristics from that position that include an amount of the multiple rooms visible from that position;

analyzing, by the one or more computing devices, the floor plan and the house images to determine, for each of multiple positions, an associated third value for that position for a connectivity attribute to represent one or more inter-room connectivity characteristics from that position;

generating, by the one or more computing devices, a first visualization for the accessibility attribute of the associated first values for the plurality of positions, and a second visualization for the isovist attribute of the associated second values for the plurality of positions, and a third visualization for the connectivity attribute of the associated third values for the multiple positions;

presenting, by the one or more computing devices, the generated first visualization for the accessibility attribute overlaid on a first visual representation of the floor plan of the house;

presenting, by the one or more computing devices, the generated second visualization for the isovist attribute overlaid on a second visual representation of the floor plan of the house; and presenting, by the one or more computing devices, the generated third visualization for the connectivity attribute overlaid on a third visual representation of the floor plan of the house.

2. The computer-implemented method of claim 1 wherein the obtaining of the information about the house includes generating, by the one or more computing devices, the floor plan by analyzing visual data of the house images to determine the at least two-dimensional room shapes and the relative positions of the multiple rooms, and determining additional building attributes for the house.

3. The computer-implemented method of claim 2 further comprising:
generating, by the one or more computing devices and using the information about the house, an adjacency graph that represents the house and stores information about the associated first values for the accessibility attribute and the associated second values for the isovist attribute and the associated third values for the connectivity attribute and about a plurality of the additional building attributes, the adjacency graph having multiple nodes each associated with one of the multiple rooms and storing information about one or more of the attributes that correspond to the associated room, and the adjacency graph further having multiple edges that are each between two of the multiple nodes and represents an adjacency in the house of the associated rooms for those two nodes;

generating, by the one or more computing devices and using representation learning, a vector embedding for the house that represents information from the adjacency graph and that encodes information in a vector format including at least some of the plurality of attributes of the house;

determining, by the one or more computing devices, multiple other houses that match the house by comparing the vector embedding for the house to additional vector embeddings for the multiple other houses that encode information in the vector format including at least some additional attributes of the multiple other houses, and measuring a distance between the vector embedding for the house and each of the additional vector embeddings for the multiple other houses that is based at least in part on the amount of structural differences between the house and that other house; and providing, by the one or more computing devices, information about one or more of the determined multiple other houses.

4. The computer-implemented method of claim 2 further comprising:
receiving, by the one or more computing devices, one or more specified criteria;

determining, by the one or more computing devices, that the house matches the one or more specified criteria based at least in part on the associated first values for the accessibility attribute and the associated second values for the isovist attribute and the associated third values for the connectivity attribute and one or more of the additional building attributes; and providing, by the one or more computing devices, information about the house in response to the received one or more specified criteria.

5. The computer-implemented method of claim 2 wherein determining of the first values for the accessibility attribute and the second values for the isovist attribute and the third values for the connectivity attribute includes using one or more trained machine learning models to analyze at least the floor plan.

6. A computer-implemented method comprising:
obtaining, by one or more computing devices, information about an existing building with multiple rooms, including a floor plan for the existing building having information about the multiple rooms that includes at least two-dimensional room shapes and relative positions of the multiple rooms;

analyzing, by the one or more computing devices, the floor plan to determine, for each of a plurality of positions at the existing building, an associated value for that position for an accessibility attribute to represent one or more accessibility characteristics for an indicated type of user located at that position;

generating, by the one or more computing devices, a visualization for the accessibility attribute of the associated values for the plurality of positions; and presenting, by the one or more computing devices, the generated visualization for the accessibility attribute in association with the plurality of positions on a visual representation of the floor plan of the existing building.

7. The computer-implemented method of claim 6 wherein the plurality of positions include at least one position in each of the multiple rooms, wherein the indicated type of user includes at least one of a user in a wheelchair or a user with limited mobility, and wherein determining of the associated value for the accessibility attribute for each of the plurality of positions includes multiple of assessing any structural impediments of the building to travel between an entrance of the existing building and that position, assessing at least one of lengths or heights of multiple structural elements of the building in a defined area around that position, and measuring distances and elevation changes from that position to multiple other building locations.

8. The computer-implemented method of claim 6 further comprising generating a grid of positions across the floor plan, wherein the plurality of positions include the positions of the grid, wherein the generated visualization is a heatmap using one of multiple visual attributes for each of the positions of the grid to represent the associated value of the accessibility attribute for that position, and wherein the presenting of the generated visualization for the accessibility attribute includes overlaying the generated visualization on the visual representation of the floor plan.

9. The computer-implemented method of claim 6 further comprising:
generating, by the one or more computing devices and based at least in part on analyzing the floor plan, an associated additional value for each of the plurality of positions for an isovist attribute to represent one or more visibility characteristics from that position that include an amount of the multiple rooms visible from that position, and an additional visualization for the isovist attribute of the associated additional values for the plurality of positions;
generating, by the one or more computing devices and based at least in part on analyzing the floor plan, further values for each of multiple positions for a connectivity attribute to represent one or more inter-room connectivity characteristics from that position, and a further visualization for the connectivity attribute of the further values for the multiple positions; and
presenting, by the one or more computing devices, the additional visualization for the isovist attribute in association with the plurality of positions, and the further visualization for the connectivity attribute in association with the multiple positions.

10. A non-transitory computer-readable medium having stored contents that cause one or more computing devices to perform automated operations, the automated operations including at least:
obtaining, by the one or more computing devices, information about an existing building with multiple rooms, including a floor plan for the existing building having information about the multiple rooms that includes at least two-dimensional room shapes and relative positions of the multiple rooms;
generating, by the one or more computing devices, a grid across the floor plan having a plurality of positions;
analyzing, by the one or more computing devices, the floor plan to determine, for each of the plurality of positions at the existing building, an associated value of an accessibility attribute for that position to represent one or more user accessibility characteristics at that position, wherein the associated values of the accessibility attribute to represent the one or more user accessibility characteristics are determined with respect to an indicated type of user;
generating, by the one or more computing devices and for the accessibility attribute, one or more visual representations of the associated values for the plurality of positions, wherein the generated one or more visual representations include a heatmap using one of multiple visual attributes for each of the plurality of positions of the grid to represent the associated value of the accessibility attribute for that position; and
providing, by the one or more computing devices, the one or more visual representations for the accessibility attribute in association with the plurality of positions, including overlaying the heatmap on an additional displayed visual representation of the floor plan.

11. The non-transitory computer-readable medium of claim 10 wherein the plurality of positions include at least one position in each of the multiple rooms, wherein the indicated type of user includes at least one of a user in a wheelchair or a user with limited mobility, and wherein determining of the associated value for the accessibility attribute for each of the plurality of positions includes assessing any structural impediments of the existing building to travel between an entrance of the existing building and that position and assessing at least one of lengths or heights of multiple structural elements of the existing building in a defined area around that position.

12. The non-transitory computer-readable medium of claim 10 wherein the plurality of positions include at least one position in each of the multiple rooms, and wherein determining of the associated value for the accessibility attribute for each of the plurality of positions includes measuring distances and elevation changes from that position to multiple other building locations.

13. The non-transitory computer-readable medium of claim 10 wherein the automated operations further include:
determining, by the one or more computing devices and based at least in part on further analyzing the floor plan, an associated additional value for each of the plurality of positions for an isovist attribute to represent one or more visibility characteristics from that position that include an amount of the multiple rooms visible from that position;
generating, by the one or more computing devices and for the isovist attribute, an additional visual representation of the associated additional values for the plurality of positions; and
presenting, by the one or more computing devices, the additional visual representation for the isovist attribute in association with the plurality of positions.

14. The non-transitory computer-readable medium of claim 13 wherein the plurality of positions include at least one position in each of the multiple rooms, wherein determining of associated additional values for the plurality of positions includes at least one of performing the further analyzing of the floor plan by using a machine learning model trained to determine values for the isovist attribute, or performing the further analyzing of the floor plan by using computer vision techniques to determine lines of sight from each of the plurality of positions in multiple directions from that position, and wherein the additional visual representation is an additional heatmap using one of a plurality of visual attributes for each of the plurality of positions to represent the associated additional value of the isovist attribute for that position.

15. The non-transitory computer-readable medium of claim 10 wherein the automated operations further include:
determining, by the one or more computing devices and based at least in part on further analyzing the floor plan, an associated additional value for each of multiple positions for a connectivity attribute to represent one or more inter-room connectivity characteristics from that position;
generating, by the one or more computing devices and for the connectivity attribute, an additional visual representation of the associated additional values for the multiple positions; and
presenting, by the one or more computing devices, the additional visual representation for the connectivity attribute in association with the multiple positions.

16. The non-transitory computer-readable medium of claim 10 wherein the plurality of positions include at least one position in each of the multiple rooms, and wherein determining of associated values for the plurality of positions includes at least one of performing the analyzing of the floor plan by using a machine learning model trained to determine values for the accessibility attribute, or performing the analyzing of the floor plan by using computer vision techniques to determine structural impediments visible from each of the plurality of positions.

17. The non-transitory computer-readable medium of claim 10 wherein the automated operations further include determining, by the one or more computing devices and before the analyzing of the floor plan, associations between multiple user types and multiple accessibility attributes using a trained machine learning model that assesses data about a plurality of interactions involving a plurality of users of the multiple types and a plurality of buildings, wherein the plurality of interactions include at least one of acquisition interactions by at least some of the plurality of users of at least some of the plurality of buildings, or remodeling interactions by at least some of the plurality of users involving at least some of the plurality of buildings, or browsing interactions by at least some of the plurality of users with online information about at least some of the plurality of buildings,
and wherein determining of the associated value of the accessibility attribute is performed for each of the multiple accessibility attributes,
wherein the providing of the one or more visual representations includes presenting the one or more visual representations to an indicated user, and
wherein the generating of the one or more visual representations and the providing is performed for one of the multiple accessibility attributes that is associated with one of the multiple user types selected for the indicated user.

18. The non-transitory computer-readable medium of claim 10 wherein determining of the associated value of the accessibility attribute is performed for each of multiple accessibility attributes, wherein the generating of the one or more visual representations is performed for one of the multiple accessibility attributes, wherein the automated operations further include generating one or more additional visual representations for one or more additional accessibility attributes of the multiple accessibility attributes that include one or more textual representations of at least one of one or more areas of the existing building or one or more amounts of space within the existing building or one or more ratios of the amounts of space to total space within the existing building, and wherein the providing of the one or more visual representations includes presenting the heat map overlaid on the additional displayed visual representation of the floor plan and presenting the one or more textual representations simultaneously with the presenting of the heat map.

19. The non-transitory computer-readable medium of claim 10 wherein the automated operations further include identifying the existing building as matching one or more specified search criteria that are based at least in part on the associated values of the accessibility attribute for the plurality of positions, and wherein the providing of the one or more visual representations is performed in response to receipt of the one or more specified search criteria.

20. The non-transitory computer-readable medium of claim 19 wherein the one or more specified search criteria include one or more additional building attributes that the existing building is determined to include.

21. The non-transitory computer-readable medium of claim 10 wherein the providing of the one or more visual representations further includes performing at least one of an evaluation of the existing building with respect to one or more defined evaluation criteria based at least in part on the associated values of the accessibility attribute for the plurality of positions, or a recommendation of the existing building based at least in part on the associated values of the accessibility attribute for the plurality of positions, or a determination of user-specific information that includes the existing building based at least in part on the associated values of the accessibility attribute for the plurality of positions, or a generation of summary information about the existing building based at least in part on the associated values of the accessibility attribute for the plurality of positions.

22. A non-transitory computer-readable medium having stored contents that cause one or more computing devices to perform automated operations, the automated operations including at least:
obtaining, by the one or more computing devices, information about an existing building with multiple rooms, including a floor plan for the existing building having information about the multiple rooms that includes at least two-dimensional room shapes and relative positions of the multiple rooms;
analyzing, by the one or more computing devices, the floor plan to determine, for each of a plurality of positions at the existing building, an associated value of an accessibility attribute for that position to represent one or more user accessibility characteristics at that position;
generating, by the one or more computing devices and for the accessibility attribute, one or more visual representations of the associated values for the plurality of positions;
providing, by the one or more computing devices, the one or more visual representations for the accessibility attribute in association with the plurality of positions;
determining, by the one or more computing devices and based at least in part on further analyzing the floor plan, an associated additional value for each of multiple positions for a connectivity attribute to represent one or more inter-room connectivity characteristics from that position, wherein the multiple positions include a position in each of the multiple rooms, and wherein determining of associated additional values for the multiple positions includes at least one of performing the further analyzing of the floor plan by using a machine learning model trained to determine values for the connectivity attribute, or performing the further analyzing of the floor plan by using computer vision techniques to identify walls separating the multiple rooms and to identify openings between the multiple rooms, and by determining for each of the multiple positions at least one additional room that is adjacent to a room in which that position is located and is separated from that room by at least one of the identified walls or openings;
generating, by the one or more computing devices and for the connectivity attribute, an additional visual representation of the associated additional values for the multiple positions, and wherein the additional visual representation is an adjacency graph that is overlaid on the floor plan and includes a node for each of the multiple rooms and includes edges for at least inter-room connections between two rooms via at least one identified opening; and presenting, by the one or more computing devices, the additional visual representation for the connectivity attribute in association with the multiple positions.

23. A system comprising:

one or more hardware processors of one or more computing devices; and one or more memories with stored instructions that, when executed by at least one of the one or more hardware processors, cause at least one computing device of the one or more computing devices to perform automated operations including at least:

obtaining information about an existing building with multiple rooms, including a floor plan for the existing building having information about the multiple rooms that includes at least two-dimensional room shapes and relative positions of the multiple rooms;

analyzing the floor plan to determine, for each of a plurality of positions at the existing building, an associated value of an isovist attribute for that position to represent one or more visibility characteristics from that position including an amount of the multiple rooms visible from that position;

generating a visual representation for the isovist attribute of the associated values for the plurality of positions; and presenting the generated visual representation for the isovist attribute in association with the plurality of positions on the floor plan of the existing building.

24. The system of claim 23 wherein the stored instructions include software instructions that, when executed by the at least one hardware processor, cause the at least one computing device to perform further automated operations including:

further analyzing the floor plan to determine, for each of the plurality of positions at the existing building, an additional associated value of an accessibility attribute for that position to represent one or more user accessibility characteristics at that position;

generating, for the accessibility attribute, one or more additional visual representations of the additional associated values for the plurality of positions; and providing the one or more additional visual representations for the accessibility attribute in association with the plurality of positions.

25. The system of claim 23 wherein the plurality of positions include positions of a grid that covers the floor plan, wherein the generated visualization is a heatmap using one of multiple visual attributes for each of the positions of the grid to represent the associated value of the isovist attribute for that position, and wherein the presenting of the generated visual representation includes overlaying the heatmap on a displayed visual representation of the floor plan.

26. The system of claim 23 wherein the plurality of positions include at least one position in each of the multiple rooms, and wherein determining of associated values for the plurality of positions includes at least one of performing the analyzing of the floor plan by using a machine learning model trained to determine values for the isovist attribute, or performing the analyzing of the floor plan by using computer vision techniques to determine lines of sight from each of the plurality of positions in multiple directions from that position.

* * * * *